US010474320B2

(12) United States Patent
Garand et al.

(10) Patent No.: US 10,474,320 B2
(45) Date of Patent: Nov. 12, 2019

(54) DOCUMENT CHANNEL SELECTION FOR DOCUMENT VIEWING APPLICATION

(71) Applicant: Apple Inc., Cupertino, CA (US)

(72) Inventors: Genevieve Garand, San Francisco, CA (US); Imran Chaudhri, San Francisco, CA (US); Anton Davydov, Gilroy, CA (US); Michel Elings, Palo Alto, CA (US); Mark A. Gingrich, San Jose, CA (US); Alden M. Haley, Campbell, CA (US); Dominic J. Hughes, Cupertino, CA (US); Vincent Lane, San Francisco, CA (US); Aimee Machado, San Francisco, CA (US); Alexander C. MacLean, San Jose, CA (US); Steve E. Marmon, Mountain View, CA (US); Charles J. Migos, Millbrae, CA (US); Jonathan M. Penn, San Jose, CA (US); Jip van der Velde, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 835 days.

(21) Appl. No.: 14/872,057

(22) Filed: Sep. 30, 2015

(65) Prior Publication Data

US 2016/0357365 A1 Dec. 8, 2016

Related U.S. Application Data

(60) Provisional application No. 62/172,175, filed on Jun. 7, 2015.

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0488* (2013.01); *G06F 3/04817* (2013.01);
(Continued)

(58) Field of Classification Search
CPC ... G06F 3/0482; G06F 3/04842; G06F 17/212
(Continued)

(56) References Cited

U.S. PATENT DOCUMENTS

| 7,451,135 B2 | 11/2008 | Goldman et al. |
| 7,487,443 B2 * | 2/2009 | Guido .................. G06F 16/954 715/246 |

(Continued)

*Primary Examiner* — Daeho D Song
(74) *Attorney, Agent, or Firm* — Fletcher Yoder PC

(57) ABSTRACT

Some embodiments provide a document viewing application with first and second document channel browsing modes. The first mode displays selectable items corresponding to document channels. Selection of an item causes the application to add the corresponding document channel to a set of selected document channels from which to retrieve documents for presentation within the application and dynamically add items corresponding to document channels related to the selected document channel to the selectable items for display in the first mode. The second mode displays a first set of selectable items corresponding to sources of documents and a second set of selectable items corresponding to document topics. Selection of an item in the second browsing mode causes the application to add the corresponding document channel to the set of selected document channels and modify the selectable items presented in the second mode a next time the second mode is entered.

13 Claims, 42 Drawing Sheets

(51) Int. Cl.
*G06T 13/80* (2011.01)
*G06F 17/21* (2006.01)
*G06F 3/0488* (2013.01)
*G06T 13/00* (2011.01)
*G06F 3/0481* (2013.01)

(52) U.S. Cl.
CPC ........ *G06F 3/04842* (2013.01); *G06F 17/211* (2013.01); *G06F 17/212* (2013.01); *G06T 13/00* (2013.01); *G06T 13/80* (2013.01); *G06T 2200/24* (2013.01)

(58) Field of Classification Search
USPC ........................................................ 715/738
See application file for complete search history.

(56) References Cited

U.S. PATENT DOCUMENTS

| | | | |
|---|---|---|---|
| 7,496,567 B1 | 2/2009 | Steichen | |
| 7,788,579 B2 | 8/2010 | Berkner et al. | |
| 8,327,262 B2 | 12/2012 | Tarumi | |
| 8,332,392 B2* | 12/2012 | Brzozowski | G06F 16/9535 707/722 |
| 8,665,294 B2 | 3/2014 | Hirooka | |
| 8,881,052 B2* | 11/2014 | Strauss | G06F 9/451 715/802 |
| 8,931,003 B2* | 1/2015 | Kim | G06F 3/0346 725/38 |
| 8,943,136 B2* | 1/2015 | Faller | H04L 65/403 709/204 |
| 9,152,292 B2 | 10/2015 | Xiao et al. | |
| 9,396,167 B2 | 7/2016 | Doll et al. | |
| 9,495,339 B2* | 11/2016 | Cheng | G06F 17/2235 |
| 9,633,400 B2* | 4/2017 | Kyoun | H04N 21/4316 |
| 2002/0144289 A1* | 10/2002 | Taguchi | H04N 7/17318 725/112 |
| 2005/0033657 A1* | 2/2005 | Herrington | G06Q 30/02 705/26.7 |
| 2005/0246336 A1* | 11/2005 | Stauder | G06F 16/58 |
| 2007/0078857 A1* | 4/2007 | Punaganti | G06F 3/0481 |
| 2007/0083894 A1* | 4/2007 | Gonsalves | G06F 16/958 725/46 |
| 2007/0130538 A1* | 6/2007 | Chiu | G06F 16/958 715/792 |
| 2008/0052742 A1* | 2/2008 | Kopf | H04N 5/44591 725/34 |
| 2008/0083003 A1* | 4/2008 | Biniak | G11B 27/28 725/110 |
| 2008/0140523 A1* | 6/2008 | Mahoney | G06Q 30/0256 705/14.54 |
| 2008/0209339 A1 | 8/2008 | Macadaan et al. | |
| 2009/0006371 A1* | 1/2009 | Denoue | G06F 16/9535 |
| 2009/0260035 A1* | 10/2009 | Yang | H04N 5/44582 725/44 |
| 2011/0099508 A1* | 4/2011 | Liu | G06F 9/451 715/781 |
| 2011/0119712 A1* | 5/2011 | Choi | H04N 5/4401 725/46 |
| 2011/0179020 A1* | 7/2011 | Ozzie | G06F 16/958 707/723 |
| 2011/0202868 A1* | 8/2011 | Yang | G06F 3/0481 715/781 |
| 2011/0202883 A1* | 8/2011 | Oh | G06F 3/0481 715/846 |
| 2011/0276924 A1* | 11/2011 | Voonna | H04M 1/274508 715/853 |
| 2012/0117471 A1* | 5/2012 | Amidon | H04N 5/76 715/716 |
| 2012/0210367 A1* | 8/2012 | Lee | H04N 21/4316 725/56 |
| 2012/0215846 A1* | 8/2012 | Howes | G06Q 10/10 709/204 |
| 2012/0278725 A1* | 11/2012 | Gordon | H04N 21/2665 715/738 |
| 2012/0311501 A1* | 12/2012 | Nonez | G06F 3/04817 715/838 |
| 2012/0324507 A1* | 12/2012 | Weber | H04H 20/38 725/37 |
| 2013/0055129 A1* | 2/2013 | Lee | H04N 21/4312 715/769 |
| 2013/0311903 A1* | 11/2013 | Zadeh | G06F 3/0482 715/753 |
| 2014/0068451 A1* | 3/2014 | Ngo | H04M 1/72572 715/738 |
| 2014/0149376 A1* | 5/2014 | Kutaragi | G06K 9/4676 707/706 |
| 2014/0282166 A1 | 9/2014 | Temkin et al. | |
| 2014/0337436 A1* | 11/2014 | Hoagland | H04L 51/16 709/204 |
| 2015/0066913 A1* | 3/2015 | Funk | G06F 16/48 707/722 |
| 2015/0127167 A1* | 5/2015 | Quam | F24F 11/63 700/276 |
| 2015/0154205 A1* | 6/2015 | Grano | G06F 16/447 705/14.16 |
| 2016/0066054 A1* | 3/2016 | Lorrain | H04N 21/482 725/38 |
| 2016/0162454 A1* | 6/2016 | Bargagni | G06F 16/00 715/745 |
| 2016/0179808 A1* | 6/2016 | De Napoli Ferreira | G06F 16/958 707/725 |
| 2016/0232240 A1* | 8/2016 | Lyndersay | G06F 3/0482 |

* cited by examiner

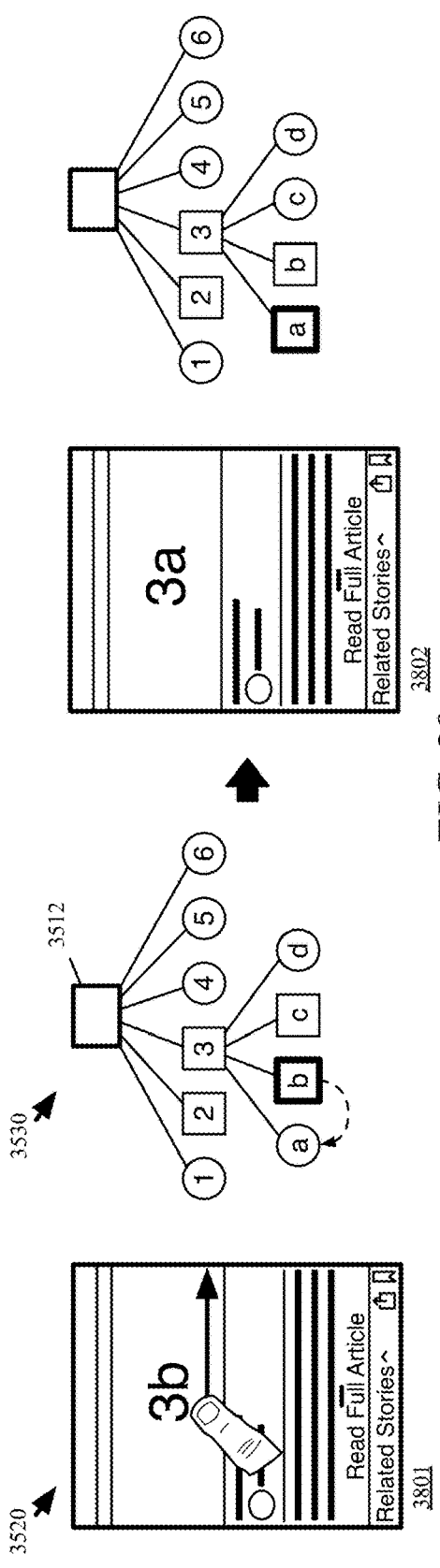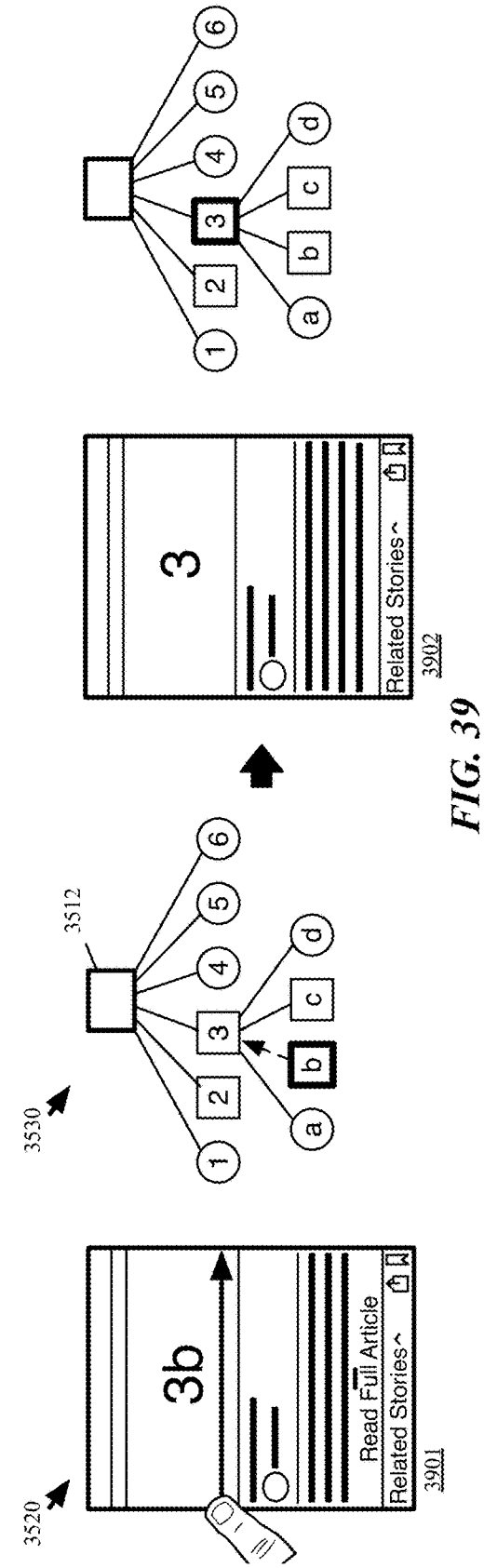

DOCUMENT CHANNEL SELECTION FOR DOCUMENT VIEWING APPLICATION

BACKGROUND

Document readers are often used for viewing electronic documents, such as electronic articles or webpages, on a device. The electronic articles are often from various sources or publishers, and related to a variety of different topics. Users often navigate between various groupings of articles (e.g., articles from a particular source, articles related to a particular topic, etc.), however, as documents often lead to other documents (e.g., through various links and other relationships), it is often difficult for a user to go back to view interesting documents that were displayed in previous groupings.

BRIEF SUMMARY

Some embodiments provide a document reader application (also referred to as a document viewing application) for viewing and navigating between various documents. The document reader of some embodiments collects documents (e.g., magazine articles, web blog posts, word processing documents, slides of a presentation, etc.) from a variety of different sources (e.g., websites, magazine publishers, newspapers, etc.). In this application, many of the examples are described with reference to articles, but it should be clear to one skilled in the art that the articles may refer to any type of document. In some embodiments, the document reader provides both native content (i.e., formatted content received directly from a publisher) and web content (i.e., content retrieved from a website) for display in the application.

In some embodiments, the document reader provides a graphical user interface (GUI) for onboarding (i.e., adding) channels for a user of the document reader. The document reader displays a set of channel selection items in a display area of the GUI. The channel selection items of some embodiments include both sources (e.g., websites, magazine publishers, etc.) and topics. The topics may include different subjects, such as people, places, categories, products, companies, etc.

Based on the selection of a channel selection item, the document reader of some embodiments provides additional channel selection items for additional sources and topics that are related to the selected channel selection item. In some embodiments, when the additional channel selection items cannot be displayed in the display area of the GUI, the document reader provides a visual effect (e.g., rippling) to indicate that new channel selection items have been added, but are not yet visible in the display area.

Once channels have been selected and added to the user's collection (e.g., a favorites collection), the document reader retrieves documents published by the selected sources and related to the selected topics to be displayed in the GUI of the document reader. The document reader of some embodiments then provides different feeds, or groupings, of the identified documents (e.g., a channel feed with documents from a specific channel, a topic feed with documents related to a particular topic, etc.). The document reader of some embodiments also provides a feed for a set of documents that a user of the document reader has marked, or saved, for future viewing.

In some embodiments, the document reader provides an aggregated feed of the identified documents published by all of the selected sources and related to all of the different topics. The document reader of some embodiments provides different views of the aggregated feed throughout the day. In some embodiments, the document reader provides a morning view of the aggregated feed with a featured article of the day that is presented in a different manner than any of the other documents in the aggregated feed. The featured article of some embodiments is only presented at certain times (e.g., when the application is opened for the first time in a given day or at various points throughout the day). At any other time, the document reader provides the aggregated feed based on the user's previous viewing of documents in the feed.

In some embodiments, the document reader provides a GUI for adding additional channels for a user based on the user's individual reading preferences, selected channels, global user preferences (e.g., hot or trending channels), etc. In some embodiments, the document reader provides a first interface for adding channels during an initial onboarding process and a second different interface for adding additional channels. The interface for adding additional channels in some embodiments provides recommendations for different channels (sources and topics), as well as a taxonomy view and search tool for discovering new channels.

In order to display a particular feed in the GUI, the document reader of some embodiments generates a layout for the documents of the feed by generating and arranging document panes that provide summary information (e.g., title, image, excerpt, etc.) for each document of the feed. The document panes are arranged within a display area so that a user can view and interact with the various documents. The document reader of some embodiments provides different visual styles for the document panes based on whether the user of the application has seen (or scrolled past) a document or clicked through to read a document.

In some embodiments, the document reader provides a document marking menu for performing various operations on the document of a particular document pane. For example, in some embodiments the document marking menu provides several selectable UI items for performing different operations (e.g., like, dislike, share, save, etc.) on the particular document. The document marking menu of some embodiments is only displayed while a user holds down a location (e.g., a specific button, or any location in the document pane). In such embodiments, the user selects the different operations by sliding along the document marking menu to select a UI item. In some embodiments, the UI items are placed on the document marking menu such that opposing actions (e.g., like and dislike) are performed by sliding along the document marking menu in opposing directions.

Once a user has selected a document (e.g., by selecting a document pane from a feed), the document reader of some embodiments displays a document view of the selected document for viewing by the user. In some embodiments, the view that is presented to the user is different for native content and web content. The document reader provides a full article view for native articles, while providing an excerpt view for web articles. The excerpt view of some embodiments provides a short excerpt or summary of the web article, as well as a link to a full version of the document. In some embodiments, rather than a link to the full version, the user of the document reader uses gestures (e.g., swiping up) to reach the full version of the document.

In addition to loading the selected document, the document reader of some embodiments preloads additional documents related to the loaded document. For example, the document reader of some embodiments preloads neighboring documents (i.e., a previous document and a next document) for a document selected from a feed. When the displayed view is an excerpt view of a web document, the document reader of some embodiments also preloads the full web document.

In some embodiments, the document reader provides an end-of-document display region for displaying document panes for additional documents related to the document. The end-of-document display region of some embodiments provides a first scrollable region for displaying documents from the same source as the displayed document and a second scrollable region for displaying documents that are related to a topic of the displayed document. In some embodiments, the document reader also includes a section of related document panes embedded within the body of the article itself.

Some embodiments provide a method for navigating through a hierarchy of documents. In some embodiments, new levels of the hierarchy are defined as a user navigates between different groups or feeds of the document reader (e.g., when a user selects a related article from the end-of-document display region). The document reader of some embodiments detects a first type of input (e.g., swipes within the display area, key entries, etc.) for navigating through the documents of a feed at a single level of the hierarchy, and a second type of input for navigating through pivot points identified in a history of documents that the user has viewed across multiple levels of the hierarchy.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 38 and 39 illustrate different examples of navigating back from a particular document.

DETAILED DESCRIPTION

Figure 1A:
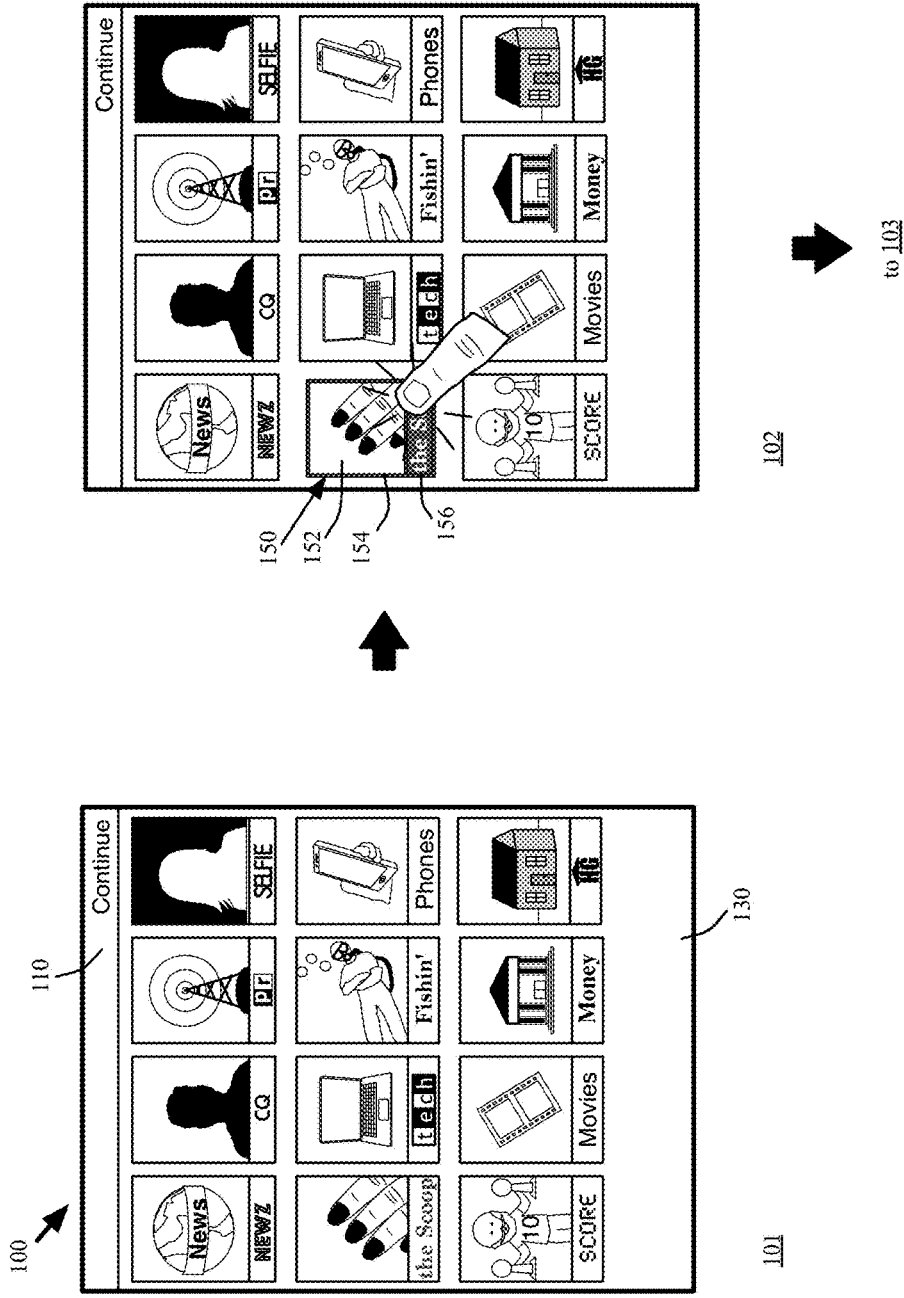
FIGS. 1a-b illustrate an example of an initial interface for onboarding channels in a document reader.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a document reader application for viewing and navigating between various documents. The document reader of some embodiments collects documents (e.g., magazine articles, web blog posts, word processing documents, slides of a presentation, etc.) from a variety of different sources (e.g., websites, magazine publishers, newspapers, etc.). In this application, many of the examples are described with reference to articles, but it should be clear to one skilled in the art that the articles may refer to any type of document. In some embodiments, the document reader provides both native content (i.e., formatted content received directly from a publisher) and web content (i.e., content retrieved from a website) for display in the application.

In some embodiments, the document reader provides a graphical user interface (GUI) for onboarding (i.e., adding) channels for a user of the document reader. The document reader displays a set of channel selection items in a display area of the GUI. The channel selection items of some embodiments include both sources (e.g., websites, magazine publishers, etc.) and topics. The topics may include different subjects, such as people, places, categories, products, companies, etc.

Based on the selection of a channel selection item, the document reader of some embodiments provides additional channel selection items for additional sources and topics that are related to the selected channel selection item. In some embodiments, when the additional channel selection items cannot be displayed in the display area of the GUI, the document reader provides a visual effect (e.g., rippling) to indicate that new channel selection items have been added, but are not yet visible in the display area.

Once channels have been selected and added to the user's collection (e.g., a favorites collection), the document reader retrieves documents published by the selected sources and related to the selected topics to be displayed in the GUI of the document reader. The document reader of some embodiments then provides different feeds, or groupings, of the identified documents (e.g., a channel feed with documents from a specific channel, a topic feed with documents related to a particular topic, etc.). The document reader of some embodiments also provides a feed for a set of documents that a user of the document reader has marked, or saved, for future viewing.

In some embodiments, the document reader provides an aggregated feed of the identified documents published by all of the selected sources and related to all of the different topics. The document reader of some embodiments provides different views of the aggregated feed throughout the day. In some embodiments, the document reader provides a morning view of the aggregated feed with a featured article of the day that is presented in a different manner than any of the other documents in the aggregated feed. The featured article of some embodiments is only presented at certain times (e.g., when the application is opened for the first time in a given day). At other times, the document reader provides the aggregated feed based on the user's previous viewing of documents in the feed.

In some embodiments, the document reader provides a GUI for adding additional channels for a user based on the user's individual reading preferences, selected channels, global user preferences (e.g., hot or trending channels), etc. In some embodiments, the document reader provides a first interface for adding channels during an initial onboarding process and a second different interface for adding additional channels. The interface for adding additional channels in some embodiments provides recommendations for different channels (sources and topics), as well as a taxonomy view and search tool for discovering new channels.

In order to display a particular feed in the GUI, the document reader of some embodiments generates a layout for the documents of the feed by generating and arranging document panes that provide summary information (e.g., title, image, excerpt, etc.) for each document of the feed. The document panes are arranged within a display area so that a user can view and interact with the various documents. The document reader of some embodiments provides different visual styles for the document panes based on whether the user of the application has seen (or scrolled past) a document or clicked through to read a document.

In some embodiments, the document reader provides a document marking menu for performing various operations on the document of a particular document pane. For example, in some embodiments the document marking menu provides several selectable UI items for performing different operations (e.g., like, dislike, share, save, etc.) on the particular document. The document marking menu of some embodiments is only displayed while a user holds down a location (e.g., a specific button, or any location in the document pane). In such embodiments, the user selects the different operations by sliding along the document marking menu to select a UI item. In some embodiments, the UI items are placed on the document marking menu such that opposing actions (e.g., like and dislike) are performed by sliding along the document marking menu in opposing directions.

Once a user has selected a document (e.g., by selecting a document pane from a feed), the document reader of some embodiments displays a document view of the selected document for viewing by the user. In some embodiments, the view that is presented to the user is different for native content and web content. The document reader provides a full article view for native articles, while providing an excerpt view for web articles. The excerpt view of some embodiments provides a short excerpt or summary of the web article, as well as a link to a full version of the document. In some embodiments, rather than a link to the full version, the user of the document reader uses gestures (e.g., swiping up) to reach the full version of the document.

In addition to loading the selected document, the document reader of some embodiments preloads additional documents related to the loaded document. For example, the document reader of some embodiments preloads neighboring documents (i.e., a previous document and a next document) for a document selected from a feed. When the displayed view is an excerpt view of a web document, the document reader of some embodiments also preloads the full web document.

In some embodiments, the document reader provides an end-of-document display region for displaying document panes for additional documents related to the document. The end-of-document display region of some embodiments provides a first scrollable region for displaying documents from the same source as the displayed document and a second scrollable region for displaying documents that are related to a topic of the displayed document. In some embodiments, the document reader also includes a section of related document panes embedded within the body of the article itself.

Some embodiments provide a method for navigating through a hierarchy of documents. In some embodiments, new levels of the hierarchy are defined as a user navigates between different groups or feeds of the document reader (e.g., when a user selects a related article from the end-of-document display region). The document reader of some embodiments detects a first type of input (e.g., swipes within the display area, key entries, etc.) for navigating through the documents of a feed at a single level of the hierarchy, and a second type of input for navigating through pivot points identified in a history of documents that the user has viewed across multiple levels of the hierarchy.

Many examples of a document reader application are described below. Section I describes examples for adding channels (i.e., topics and sources) to a user's collection in the document reader application. Section II then describes different feed views for viewing document feeds. This section also describes an interface for interacting with the documents of a feed from the different feed views. Section III describes animations and document views for different types of documents. This section also describes preloading and an end of article region for the different document views. Section IV describes navigation between documents at different levels of a hierarchy within the document reader application. Finally, Section V describes several example electronic systems that implement some embodiments described herein.

I. Onboarding

A. Adding Channels

In some embodiments, the document reader is for viewing articles and other content that is provided by a variety of sources regarding a variety of different topics. The user selects various different sources and topics to add to their favorites collection based on their interests. The document reader then retrieves content from the various sources and content related to the various topics, and presents different views (e.g., feed views, article views, etc.) of the content to the user.

Figure 1B:
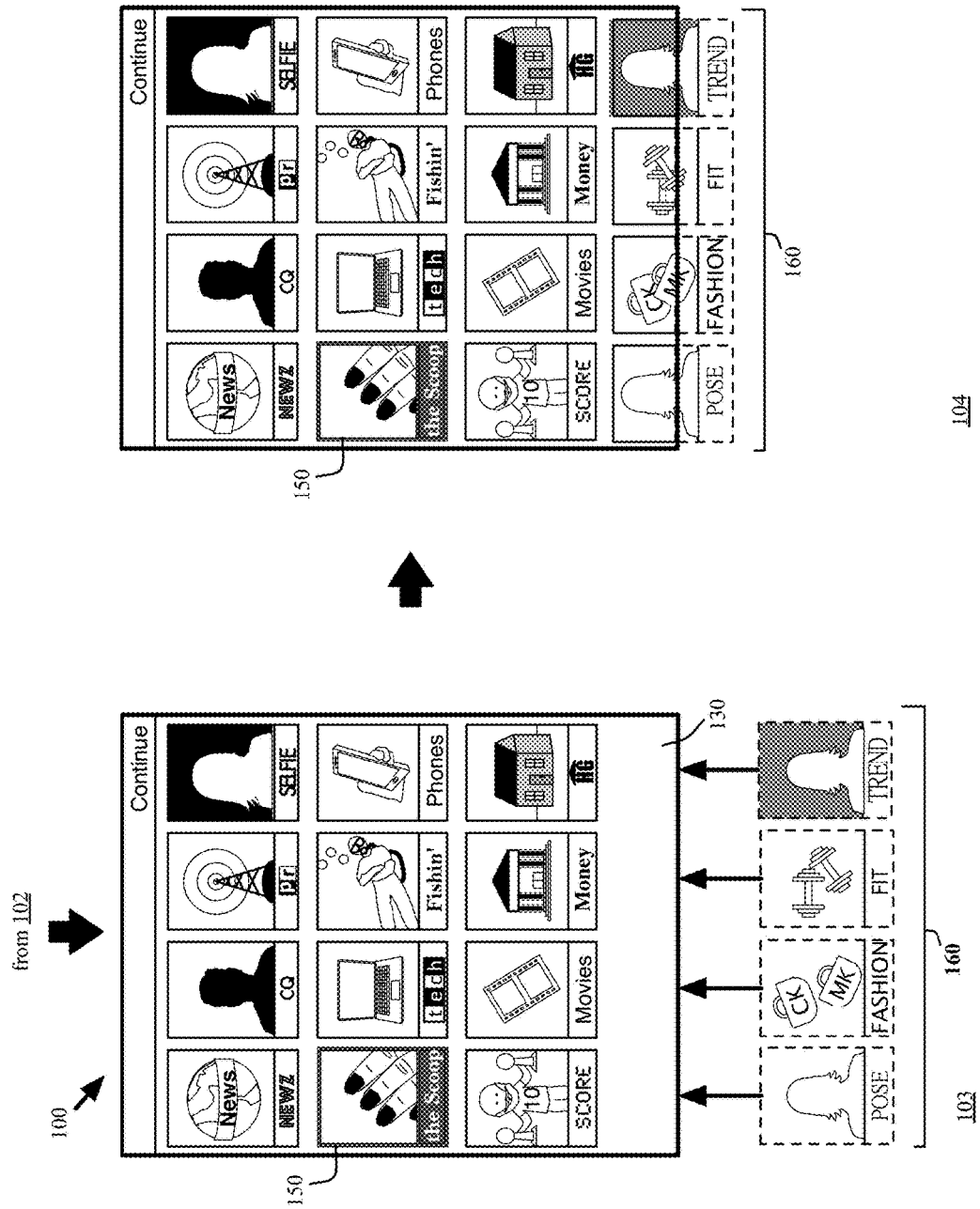

FIGS. 1a-b illustrate an example of an initial interface for onboarding (or subscribing to) channels in a document reader in four stages 101-104. In some embodiments, the initial interface is presented when a user first opens a document reader, allowing the user to select channels of interest to the user.

The first stage 101 shows a graphical user interface (GUI) 100 that includes a status bar 110 and a channel selection region 130 with several channel selection items. The channel selection items 110 represent different sources and topics for documents. Source channel selection items represent various different providers of content, such as magazine publishers, newspaper publishers, websites, etc. Topic channel selection items represent topics or categories that the user may be interested in. Topic channel selection items do not represent any particular source, but rather may include documents related to the topic from a variety of different sources. In some embodiments, the source channel selection items are presented differently (i.e., different shapes, colors, styles, etc.) from the topic channel selection items.

In some embodiments, the document reader application is meant to provide the feel of a magazine so the channel selection items are presented with the familiar aspect ratios of a magazine. As the images for the various sources and topics may vary widely, the document reader of some embodiments performs various operations for creating images with the familiar magazine aspect ratio. In some embodiments, the document reader application provides different shapes and sizes (e.g., circular items, etc.) for the channel selection items.

Many of the images identified from the various channels are provided in a landscape aspect ratio. In order to create a portrait image, the document reader of some embodiments stretches the bottom third of the image and applies a blurring effect to give the appearance of a portrait image while maintaining the detail of the original image.

In the second stage 102, a user selects a source channel selection item 150 for a source, the Scoop, a fashion magazine. The second stage 102 shows that channel selection item 150 has been selected. Channel selection item 150 includes an image 152, and a logo region 156.

The logo regions in some embodiments provide different appearances, or styles for selected and unselected channel selection items. In some embodiments, the logo regions for unselected channel selection items are desaturated or presented in grayscale, while selected channel selection items are presented with a colored background. In some embodiments, the background colors for different sources or brands are associated with a brand color.

The brand color is a color that is associated with the brand. In this example, the logo region 156 and selection ring 154 for channel selection item 150 are presented in a brand color associated with the particular source (i.e., "Score"). In some embodiments, topic channel selection items are also assigned a brand color to be associated with the particular topic.

The second stage 102 also shows that the size of the channel selection item 150 is made smaller to indicate that it is being selected. In addition to becoming smaller, the image 152 for channel selection item 150 is zoomed out, exposing more of the image 152. In this example, the image 152 shows more of the little finger in the image than the same image in the first stage 101.

The third stage 103 shows that, upon selection of channel selection item 150, new channel selection items 160 are added to the channel selection region 130. In this example, channel selection items 160 include channel selection items for new sources (i.e., other fashion magazines) as well as for new topics (i.e., fashion) that are related to the selected channel selection item 150. A process for generating and displaying the new channel selection items is described with reference to FIG. 3 below.

In the fourth stage 104, the new channel selection items 160 have risen into the group of channel selection region 130. When there are too many channel selection items to be displayed in the channel selection region 130 of the GUI 100, some of the channel selection items, like channel selection items 160, are only partially displayed in the GUI 100. When the channel selection region 130 is full, new channel selection items may not be displayed at all, until a user scrolls down through the channel selection region 130.

Figure 2:
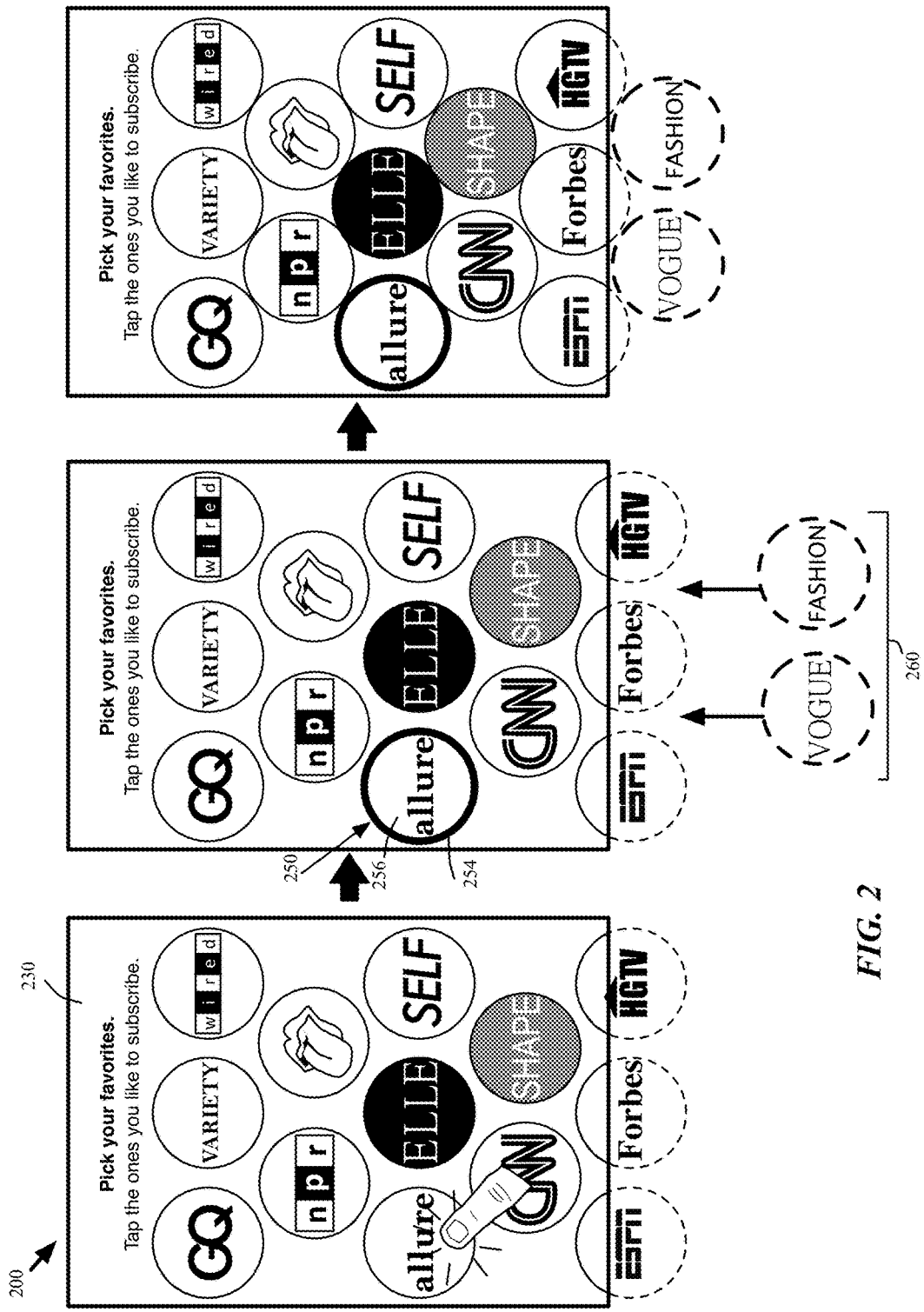
FIG. 2 illustrates another example of an initial interface for onboarding channels in a document reader.

In the example of FIGS. 1a-b, the channel selection items are displayed as rectangular tiles, with proportions similar to magazines or other periodicals. In some embodiments, the document reader provides channel selection items with different appearances and layouts to provide a pleasing interface for a user of the application. FIG. 2 illustrates another example of an initial interface for onboarding (or subscribing to) channels in a document reader in three stages 201-203.

The first stage 201 shows a graphical user interface (GUI) 200 with a channel selection region 230 with several round channel selection items. Much like the channel selection items of FIGS. 1a-b, the channel selection items of this example represent different sources and topics for documents. The first stage 201 also shows that a user selects a source channel selection item 250 for a source, Allure, a fashion magazine.

The second stage 202 shows that channel selection item 250 has been selected. Channel selection item 250 includes a selection ring 254 and a logo region 256. In different embodiments, the logo region 256 shows images or other descriptors for the source or topic associated with each channel selection item. The second stage 202 also shows that, upon selection of channel selection item 250, new channel selection items 160 for other sources and topics are added to the channel selection region 230.

In the third stage 203, the new channel selection items 260 have risen to the group of channel selection items in the channel selection region 230. As the channel selection region 230 is full of channel selection items, the newly added channel selection items are not yet visible to the user. In some embodiments, the interface provides an animation (e.g., a ripple animation, etc.) to indicate the addition of the new off-screen channel selection items.

Figure 3:
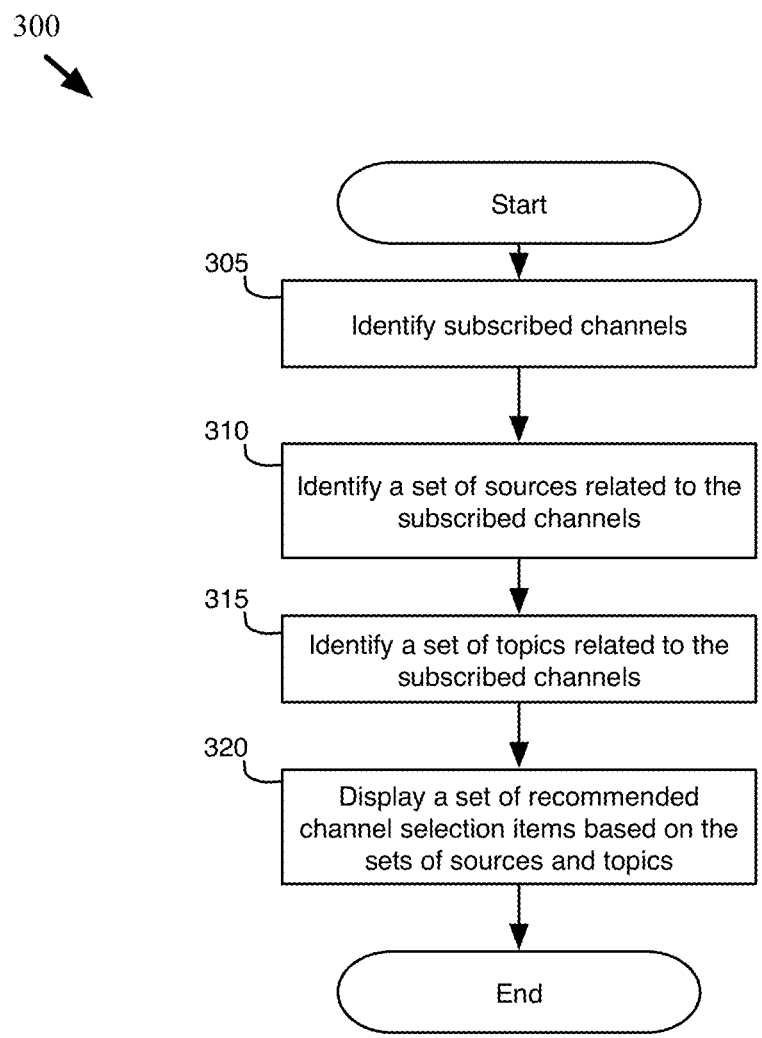
FIG. 3 conceptually illustrates a process for generating channel selection items.

FIG. 3 conceptually illustrates a process for generating channel selection items. The process 300 of some embodiments is performed by the document reader application to provide additional suggested channels for a user. The process 300 identifies (at 305) the channels to which the user has subscribed.

Based on the subscribed channels, the process 300 identifies (at 310) a set of sources related to the subscribed channels. In some embodiments, the document reader application maintains a set of categories, or tags, for each source and topic. Based on the categories for the subscribed channels, the process 300 of some embodiments identifies other sources and topics that fall within the same categories. The process 300 similarly identifies (at 315) a set of topics related to the subscribed channels. The process 300 then displays (at 320) a set of recommended channel selection items based on the identified sets of sources and topics.

In some embodiments, new channels can be added to a user's collection after the initial onboarding process. The interface for adding additional channels in some embodiments provides recommendations for different channels (sources and topics), as well as a taxonomy view and search tool for discovering new channels.

Figure 4:
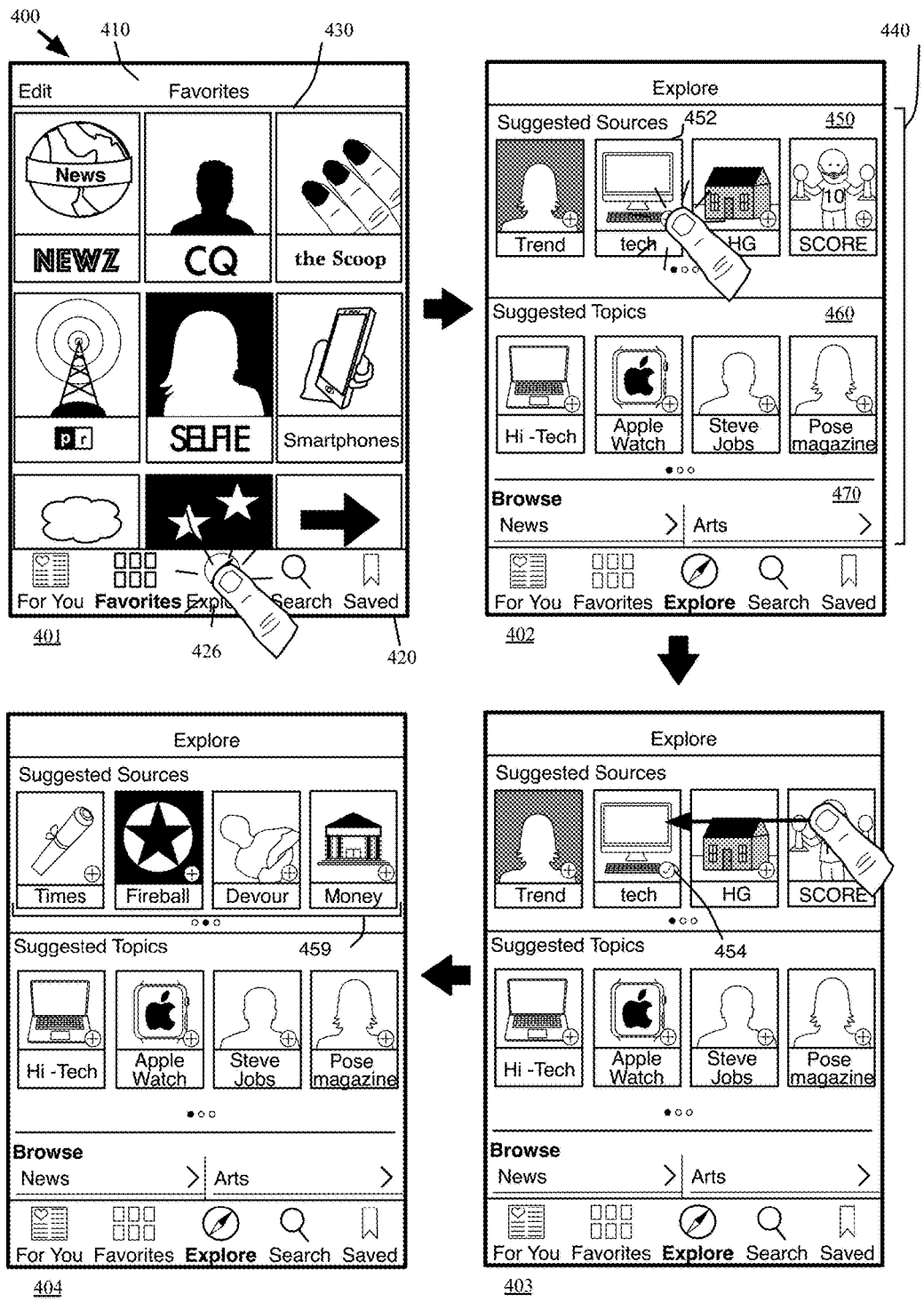
FIG. 4 illustrates an example of adding a new source channel for a document reader.
Figure 5:
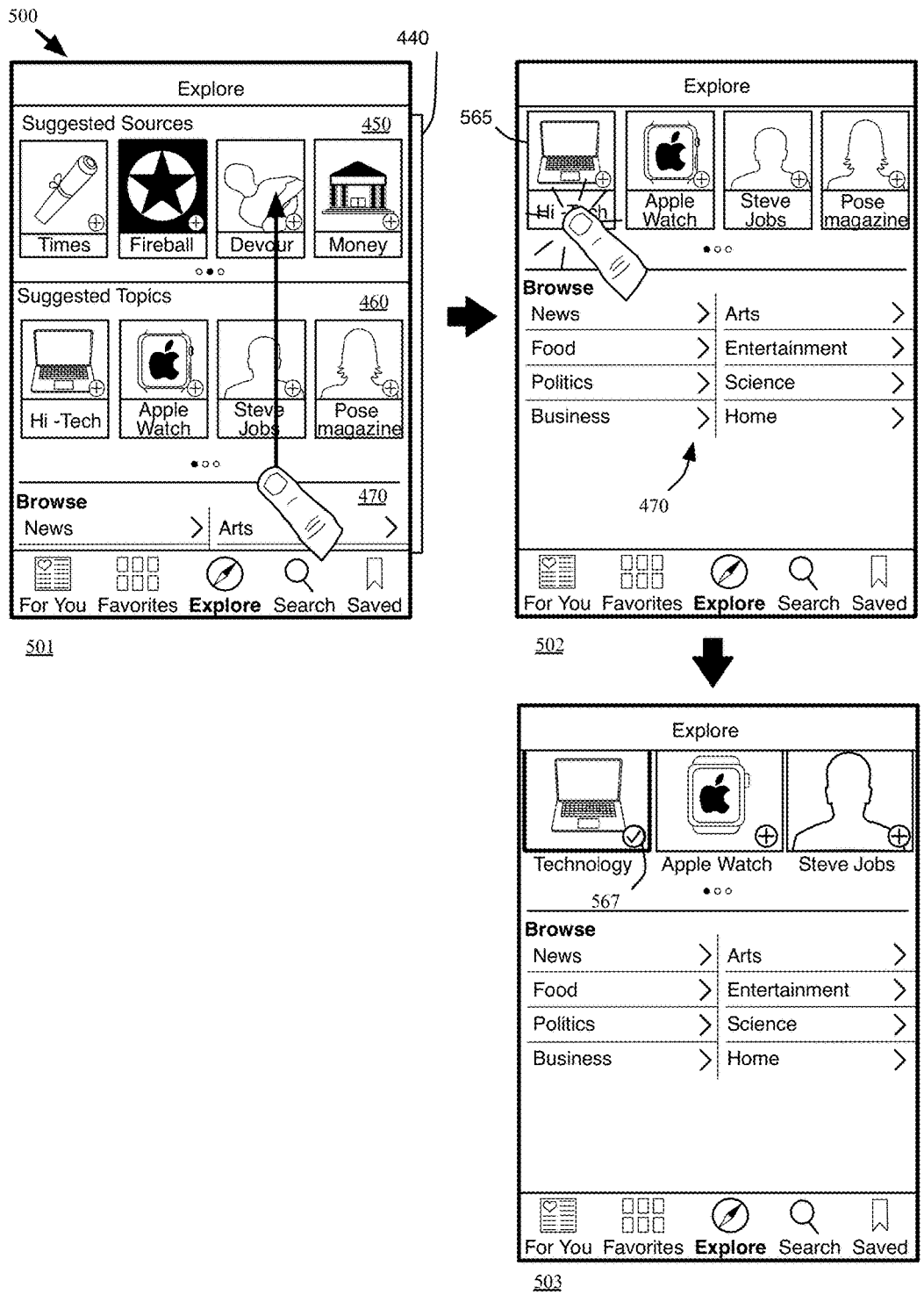
FIG. 5 illustrates another example of adding a new topic channel for a document reader.

FIGS. 4 and 5 illustrate examples of adding new channels for the document reader. FIG. 4 illustrates an example of a GUI 400 for adding a new source channel for a document reader in four stages 401-404. The first stage 401 shows a GUI 400 for a document reader that includes a status bar 410, a channel view 430, and a toolbar 420. The channel view 430 is just one of the different views that the document reader displays for a user. The toolbar 420 includes icons for performing various operations in the document reader application, such as viewing different feeds and articles, as well as adding new channels.

The first stage 401 shows that the user selects an explore icon 426 from the toolbar 420. The selection causes the GUI 400 to show an explore view 440, that includes a suggested sources region 450, a suggested topics region 460, and a browse region 470, as illustrated in the second stage 402.

The explore view 440 includes various regions for finding new content that can be added to the favorite channels list of a user. The explore view 440 of the second stage 402 shows that suggestions for different sources and topics may be provided in separate regions (i.e., suggested sources region 450 and suggested topics region 460), but as shown in the onboarding interface of FIGS. 1a-b above, in some embodiments, the sources and topics are intermixed. In some embodiments, sources are displayed differently from topics. For example, the channel selection items for sources in the suggested sources region 450 in some embodiments are presented as circular channel selection items, like those described above with reference to FIG. 2, while topics are displayed as rectangular channel selection items, as shown in suggested topics region 460. The different appearances allow a user to quickly distinguish between channel selection items for sources and topics.

This is particularly useful when, in some embodiments, sources can also serve as topics. In this example, Pose Magazine is listed as a topic, rather than as a source. Selection of the channel selection item for Pose Magazine would provide a feed of articles about Pose Magazine, and not necessarily from Pose Magazine. In some embodiments, a source selection item for the source Pose Magazine would be presented as a circular channel selection item, while a topic channel selection item for articles about Pose Magazine would be presented as a rectangular channel selection item. The browse region 470 is described below with reference to FIG. 5.

The document reader provides the different suggested channels and topics based on a variety of different factors. In some embodiments, the document reader provides suggestions based on the channels that the user has subscribed to or based on properties of the articles that the user reads in the application. In some embodiments, the articles are tagged with different topics or categories and the document reader makes suggestions for topics and/or sources based on the tags. Alternatively, or conjunctively, the document reader of some embodiments suggests different channels and topics that are popular or trending with other users of the application.

The second stage 402 also shows that the user selects channel selection item 452 from suggested sources region 450. In response to the selection of channel selection item 452, the third stage 403 shows that channel selection item 452 has been selected, as indicated by a checkmark 454 on channel selection item 452. If the user selects the checkmark 454 (or channel selection item 452) again, the channel selection item 452 would be unselected and return to showing a plus sign.

The suggested sources region 450 of some embodiments is provided as a region that is scrollable to reveal additional sources. The third stage 403 shows that the user scrolls through suggested sources region 450 to display new source selection items 459 as shown in the fourth stage 404.

FIG. 5 illustrates another example of adding a new topic channel for a document reader in three stages 501-503. The first stage 501 shows GUI 400 with explore view 440 as described above with reference to FIG. 4. In the first stage 501, the user scrolls down through the explore view 440. The scrolling in the first stage 501 reveals more detail of the browse region 470, as illustrated in the second stage 502. The browse region 470 shows a taxonomy of different topics and sources, organized into several different categories. A user of the document reader can browse the browse region 470 to add additional channels to their favorites list.

In the second stage 502, the user selects the topic channel selection item 565. Channel selection item 565 adds a channel with articles related to technology from a variety of different sources. In some embodiments, a topic channel only includes articles from sources that the user has added to their collection, while in other embodiments, topic channels include articles from other sources as well. In response to the selection of topic channel selection item 565, the third stage 503 shows a checkmark 567 in the topic channel selection item 565.

Figure 6:
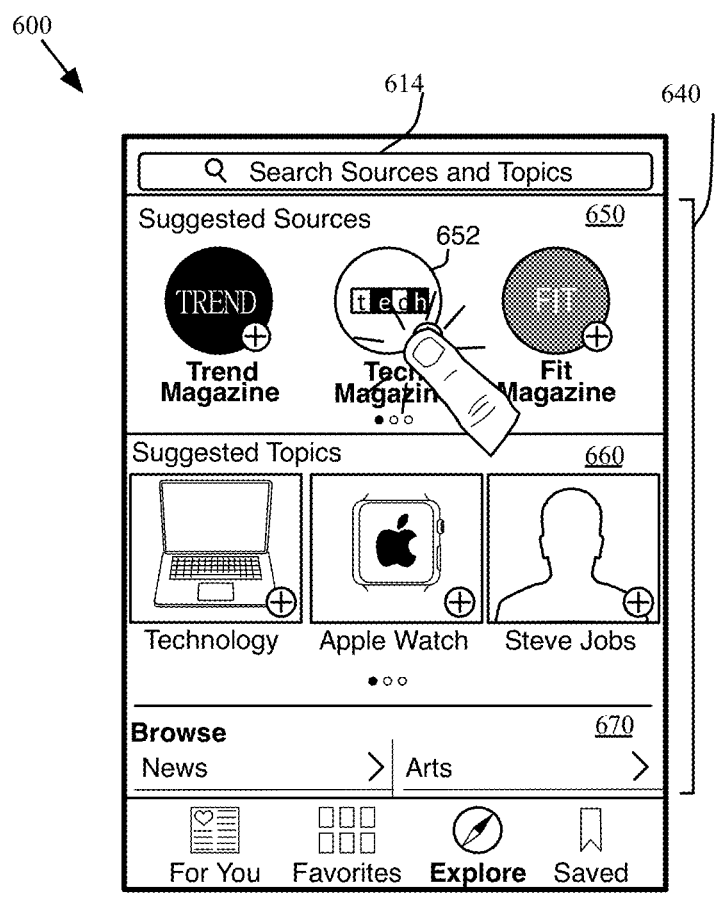
FIG. 6 illustrates an example of an alternative interface for exploring new channels.

FIG. 6 illustrates an example of an alternative interface for exploring new channels. GUI 600 is similar to the GUI 400 of FIGS. 4 and 5, but rather than rectangular tiles, the GUI 600 presents spherical channel selection items for sources in the sources section 650 and rectangular topic selection items for topics in the topics section 660. The GUI 600 may use various different appearances for sources and topics throughout the application.

In addition, rather than a separate screen for search, the GUI 600 provides a search bar 614. The search bar 614 of some embodiments allows a user to search for particular results in the explore view 640, filtering the channel selection items displayed in the explore view 640 based on user input in the search bar 614. The various search and exploration functions allow a user to quickly and efficiently identify interesting channels to add to their collection.

B. Onboarding Animations

Figure 7:
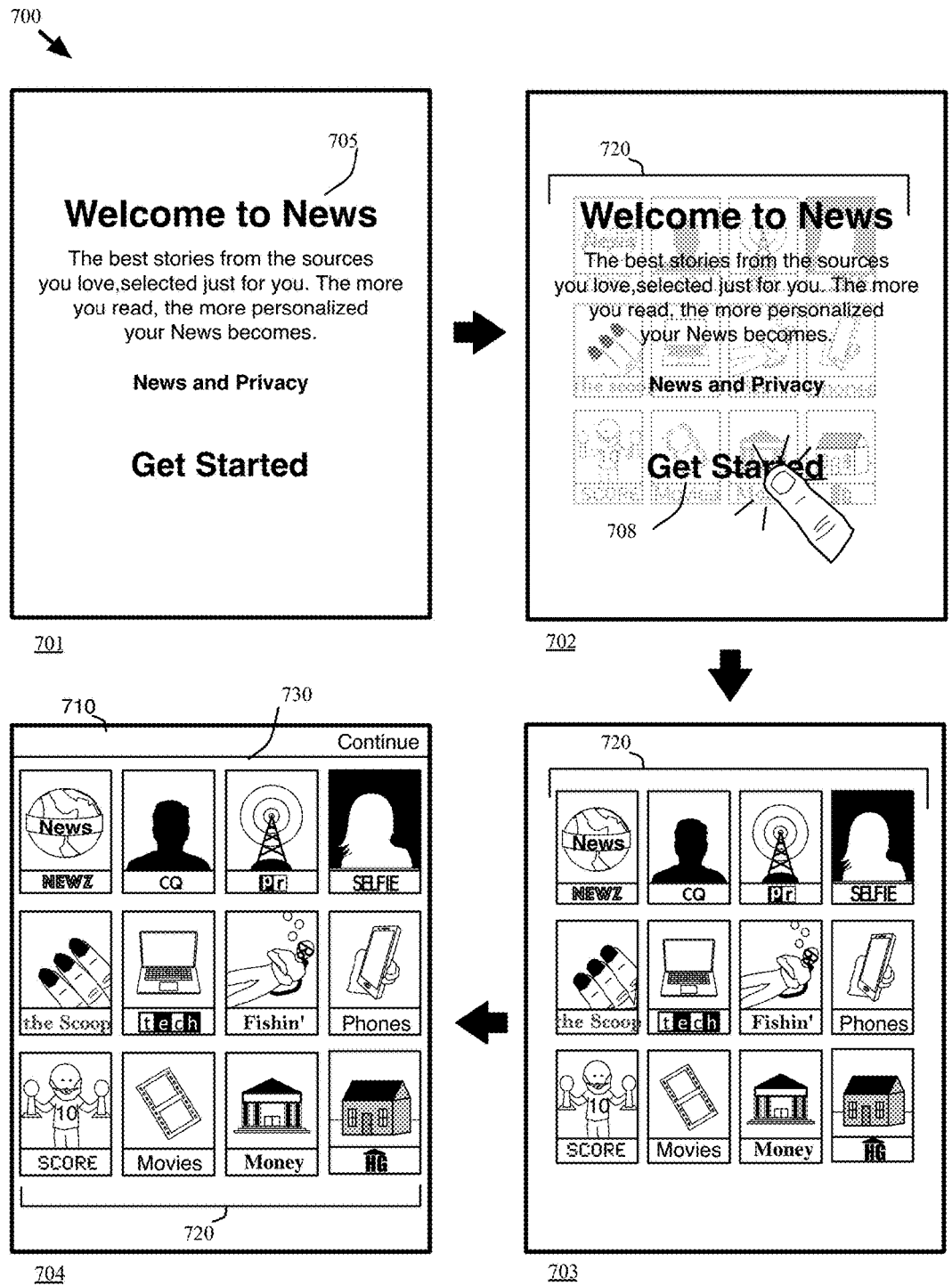
FIG. 7 illustrates an example of an initial animation for an onboarding interface.

The document reader application of some embodiments provides animations during the onboarding process to provide a simple and intuitive interface. FIG. 7 illustrates an example of an initial onboarding animation that is shown when a user first begins the document reader application. In the first stage 701, GUI 700 shows an initial welcome screen with a welcome message 705. As a part of the initial loading animation, the second stage 702 shows a group of blurred, channel selection tiles 720 for a group of channels (sources and topics) that fade in behind the welcome message 705 on the welcome screen. The second stage 702 also shows that the user selects a link 730 to begin adding channels for the document reader application.

The selection in the second stage 702 causes welcome message 705 to fade out as the channel selection tiles 720 come into focus and grow larger, as illustrated in the third stage 703. In the fourth stage 704, the GUI 700 shows status bar 710 and channel selection region 730 with the full-sized channel selection items 720 as described above in FIG. 1. The user is then able to subscribe to channels, adding them to the user's favorite channels list to customize the content provided to the user through the document reader application.

As the user subscribes to channels from the onboarding interface, new channel selection items are added to the channel selection region based on the user's selections. As the channel selection region fills up and more channel selection items are added off-screen, the document reader of some embodiments provides a visual effect to indicate the addition of off-screen items.

Figure 8:
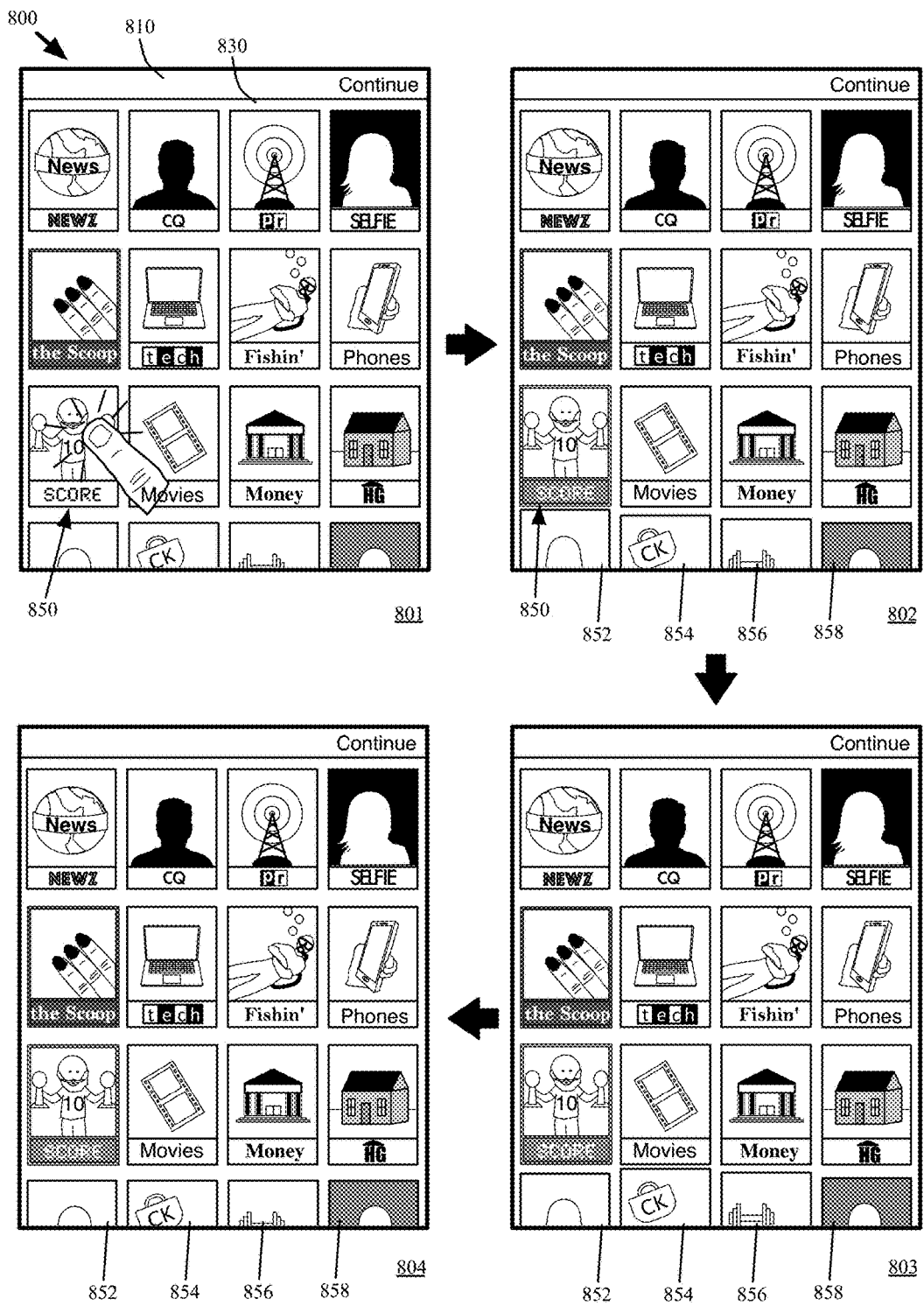
FIG. 8 illustrates an example of a ripple effect to indicate the addition of off-screen items during the onboarding process.

FIG. 8 illustrates an example of a ripple effect to indicate the addition of off-screen items during the onboarding process in four stages 801-804. In the first stage 801, the GUI 800 shows status bar 810 and channel selection region 830. The channel selection region 830 is full of channel selection items. The first stage 801 also shows that a user has selected channel selection item 850. In response to the selection, the document reader adds new channel selection items (not shown) to the channel selection region 830, but the new items are not displayed because the displayed channel selection region 830 is already full. However, to indicate that new channel selection items have been added to the channel selection region 130, GUI 800 provides a visual effect, such as a ripple effect, that indicates that new channel selection items for suggested channels are available.

In some embodiments, the strength or visibility of the visual effect is dependent on the number of channel selection items that are added. Alternatively, or conjunctively, the strength or visibility of the visual effect is dependent on the number of channel selection items that are already available in the group of channel selection items. For example, in some embodiments, when the group of channel selection item already includes several off-screen channel selection items, the visual effect is weaker or more subtle than when the new channel selection items are closer to the bottom of the visible display area of the GUI.

The second stage 802 shows that a ripple effect animation has begun. Channel selection items 852-858 have risen in a staggered fashion from their positions at the bottom of the channel selection region 830. In the third stage 803, channel selection item 852 begins to descend back to its original position as channel selection items 854-858 continue to rise. The staggered movement of the channel selection items 852-858 cause a rippling, wave-like effect at the bottom of the screen, indicating to the user that new channel selection items (not shown) have been made available. Finally, the fourth stage 804 shows that channel selection items 852-858 have returned to their original positions.

II. Document Feed View

A. Feed Layouts

The document reader application of some embodiments provides a document feed view for viewing summaries or excerpts of several documents in a single ordered layout. In some embodiments, the feed layouts are generated based on user preferences in order to provide an aesthetically pleasing display of document summaries. The generation of the feed layouts is further described in the concurrently filed U.S. patent application Ser. No. 14/872,026, filed Sep. 30, 2015 and entitled "Document Summary Feed Generation Method, Apparatus, and System", which is incorporated herein by reference.

Figure 9:
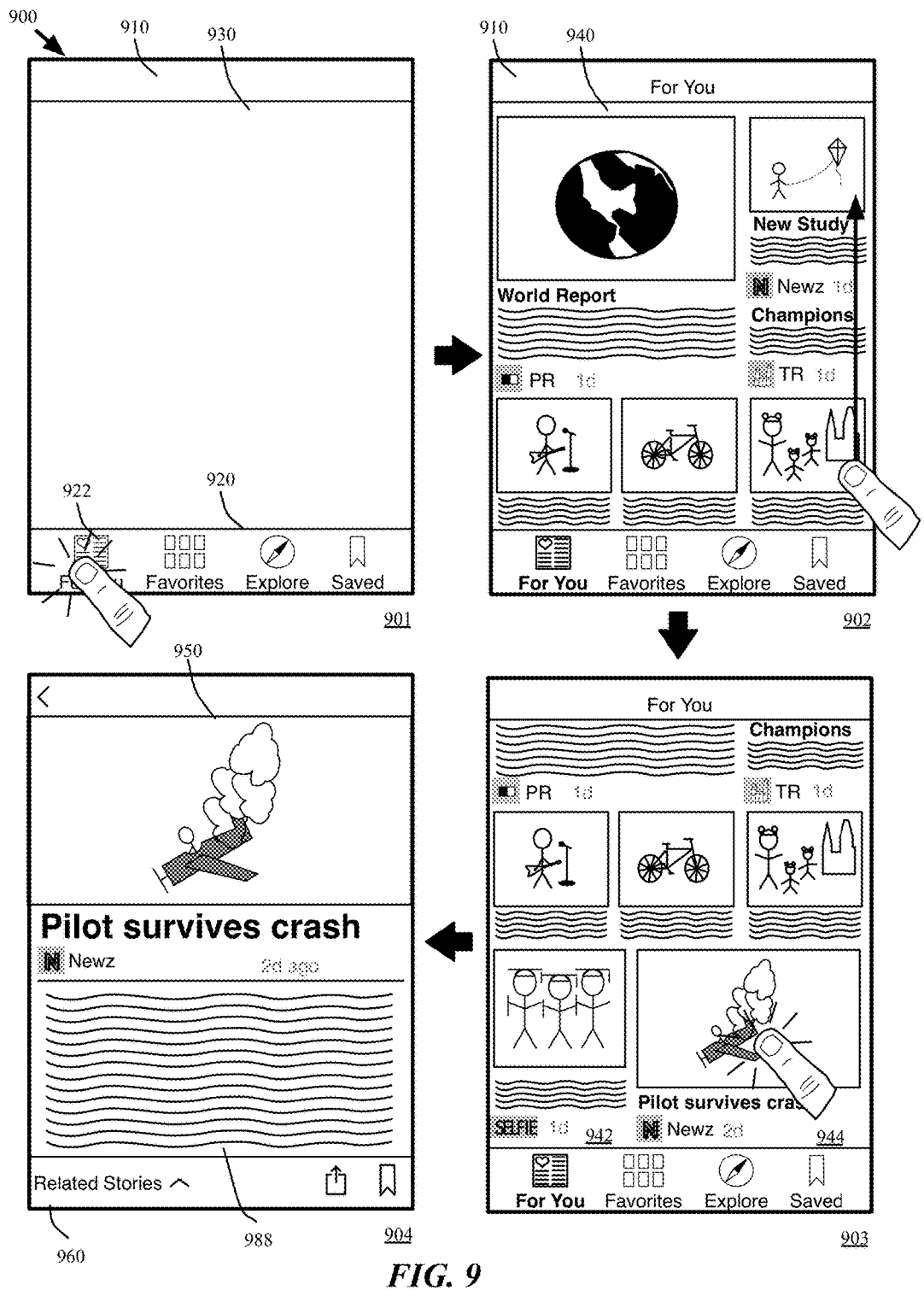
FIG. 9 illustrates an example of displaying a feed view of an aggregated feed and an article view of a particular document from the aggregated feed.

FIG. 9 illustrates an example of displaying a feed view of an aggregated feed and an article view of a particular document from the aggregated feed in four stages 901-904. The first stage 901 shows a GUI 900 that includes a status bar 910, a main display area 930, and a toolbar 914. In the first stage 901, the user selects an icon 922 ("For You") to display a feed layout 940 for an aggregated feed as illustrated in the second stage 902.

The second stage 902 shows the feed layout 940, which displays document panes for each of several documents in the aggregated feed. The document panes are of varying sizes and contain different amounts of information (e.g., some document panes provide an image, while others do not). The document panes of some embodiments may use different internal layouts for the information presented in the document pane, with each internal layout using different aspect ratios, different amounts of text, etc.

Figure 10:
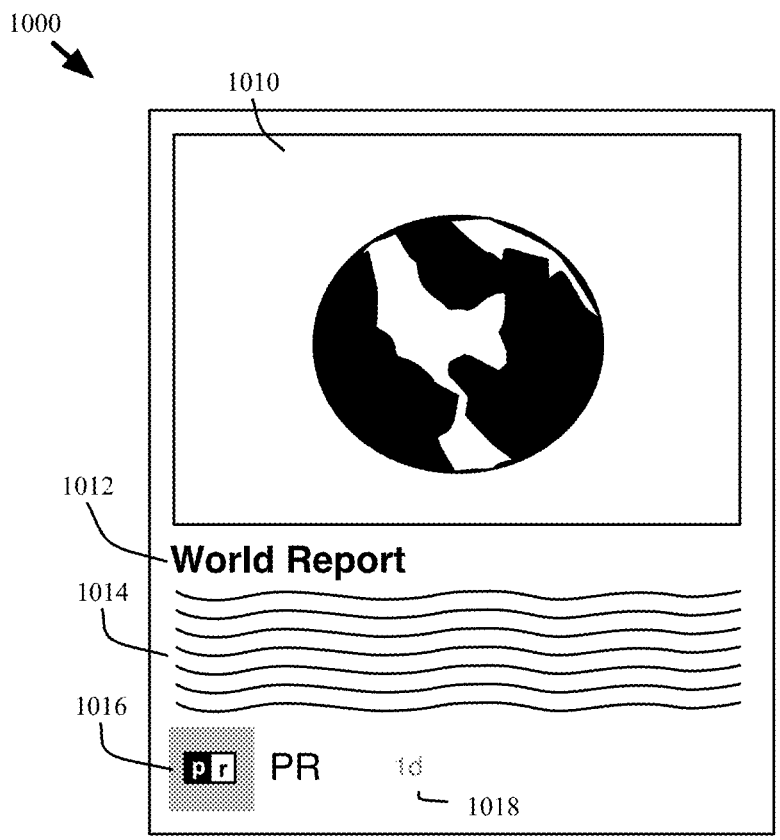
FIG. 10 illustrates an example of different elements of a document pane.

FIG. 10 illustrates an example of different elements of a document pane. The document pane 1000 includes an image

1010, a title 1012, a brief summary or excerpt 1014, source information 1016, and time value 1018. The image 1010 is provided by the source along with the brief summary or excerpt 1014 for the corresponding article. In some embodiments, the document reader application performs a crop on the image received from the source in order to fit the image to the layout of the document pane or to provide a parallax effect when animating from the feed view to an article view, as described below.

Source information 1016 includes a logo and a source name ("PR"). The logo and source name are provided by the source of the article. In some embodiments, when a logo is not available, the document reader generates a logo based on other information (e.g., source name, brand color) retrieved from the source.

Time value 1018 of some embodiments is a time since the article was retrieved for the user. Alternatively, or conjunctively, time value 1018 provides a time since the article was published by the source, or the actual date/time of publication.

Referring back to FIG. 9, the second stage 902 further shows that the user scrolls up through the document panes of the feed layout 940. As a result of scrolling up, the feed layout 940 shows new document panes 942 and 944. The third stage 903 also shows that the user has selected document pane 944.

In response to the selection, GUI 900 shows an article toolbar 990 for interacting with the document and a full article view 950 corresponding to the selected document pane 944 as illustrated in the fourth stage 904. The full article view 950, like the document pane 1000 described above with reference to FIG. 10, includes an image, title, source information, and time value. However, rather than the summary or excerpt text, the full article view 950 includes the full content 988 of the article. The full content of articles may include additional text, images, graphics, videos, and other elements that are not displayed in the document panes.

Figure 11:
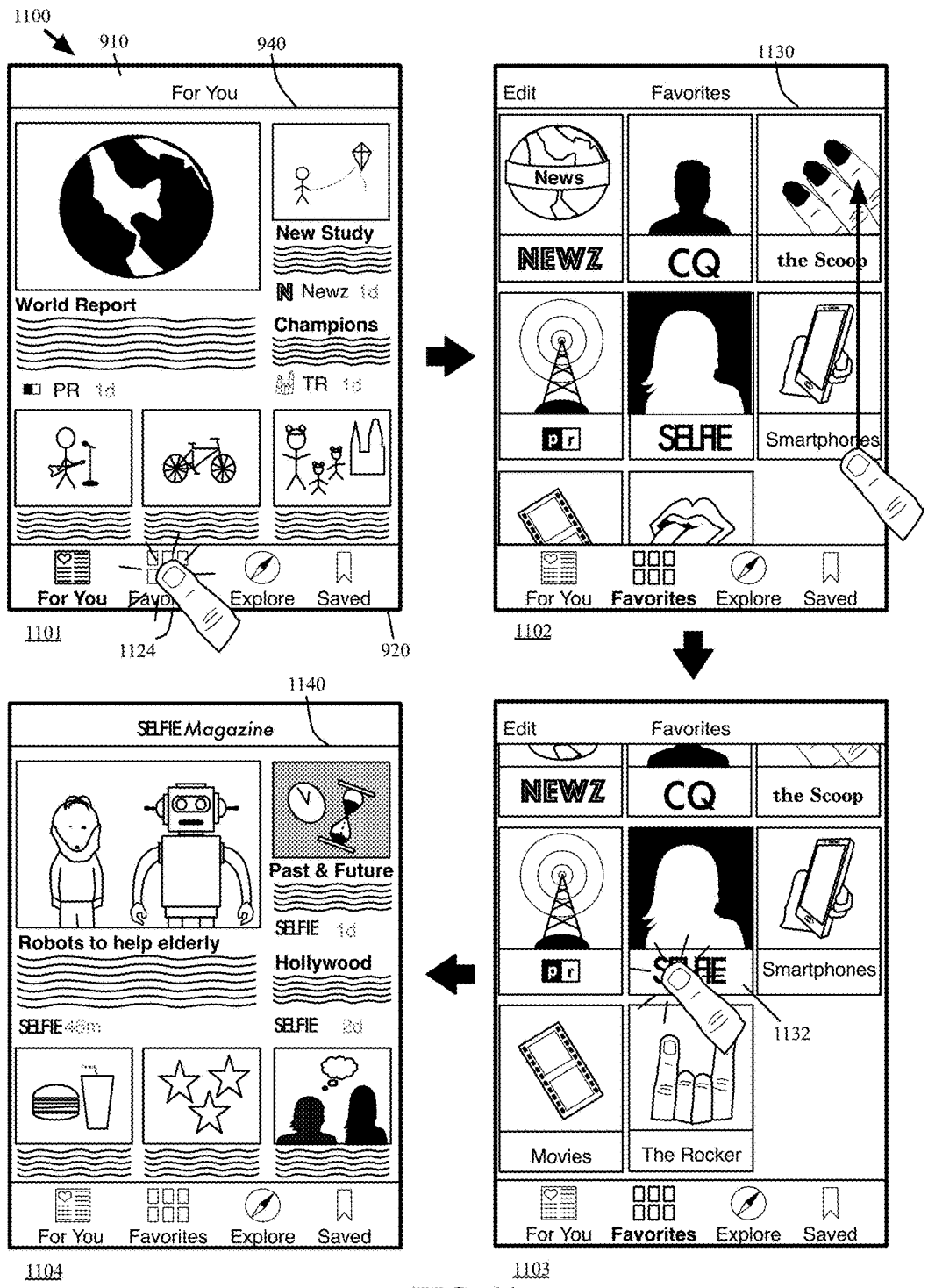
FIG. 11 illustrates an example of displaying a feed layout for a selected channel.

FIG. 11 illustrates an example of displaying a feed layout for a selected channel in four stages 1101-1104. In the first stage 1101, GUI 1100 shows status bar 910, toolbar 920, and an aggregated feed layout 940 as described above. The first stage 1101 also shows that the user selects a favorites icon 1124 to display a favorites view 1130 for the user as illustrated in the second stage 1102.

In this example, favorites view 1130 displays channel tiles that represent different sources (e.g., Newz, CQ, etc.) and topics (e.g., smartphones) that the user has added to their favorite channels list. The favorite channels may be selected by the user during the initial onboarding process or as the user explores for new channels from within the document reader application.

The second stage 1102 also shows that the user scrolls through the favorites view 1130 to display more of the channel tiles. In the third stage 1103, the user has scrolled to the bottom of the favorites view 1130 and selects channel card 1132 (i.e., for Self magazine). In response to the selection, the GUI 1100 shows status bar 910, toolbar 920 and a channel feed view 1140 in the fourth stage 1104. Status bar 910 displays the title of the selected channel (i.e., Selfie magazine), but, unlike the aggregated feed layout 940 of FIG. 9, the channel feed layout 1140 only includes articles from the selected channel (i.e., Selfie magazine). If, rather than selecting a source channel, the user had selected a topic channel in the third stage 1103 (e.g., smartphones), then the channel feed layout 1140 would provide articles from several sources, but would only include articles related to the selected topic.

Figure 12:
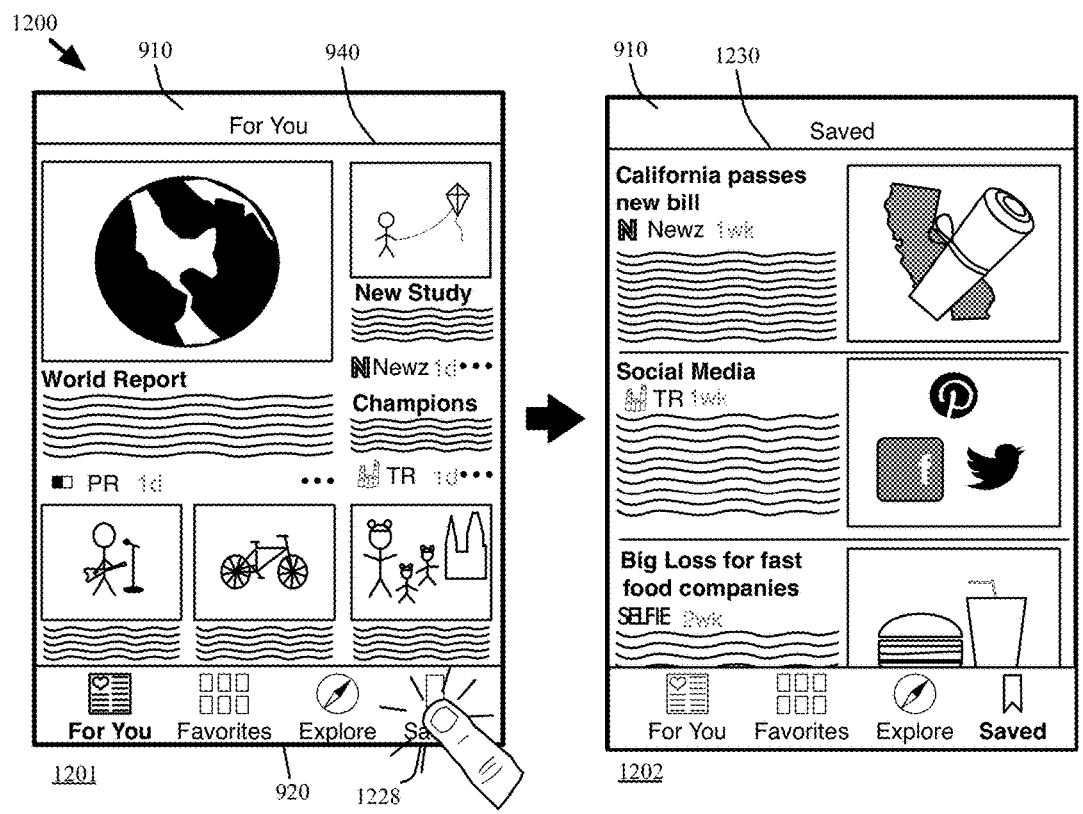
FIG. 12 illustrates an example of displaying saved documents.

While viewing articles in feed layouts or in full article views, the document reader of some embodiments allows a user to save articles for future viewing or reference. FIG. 12 illustrates an example of displaying saved documents in two stages 1201 and 1202. The first stage 1201 shows GUI 1200 displays status bar 910, toolbar 920, and aggregated feed layout 940. In the first stage 1201, the user selects the saved icon 1228 from toolbar 920 to display a saved document layout 1230 as illustrated in the second stage 1202. The saved document layout 1230 includes document panes for articles that were saved in the previous days and weeks. The saved articles are articles that the user has previously marked for saving through various interfaces described below. In some embodiments, the document reader application stores full versions of each of the saved articles for offline viewing.

In the document panes of the various feed layouts (e.g., aggregated feed layout, channel feed layout, saved document layout, etc.), images from the document may be cropped for the document pane to fit within a particular document pane. For example, a document may include a portrait image while the document pane for the document may call for a landscape image. However, simple cropping of an image may have undesirable results, as important portions of the image may be cut off or misaligned.

Figure 13:
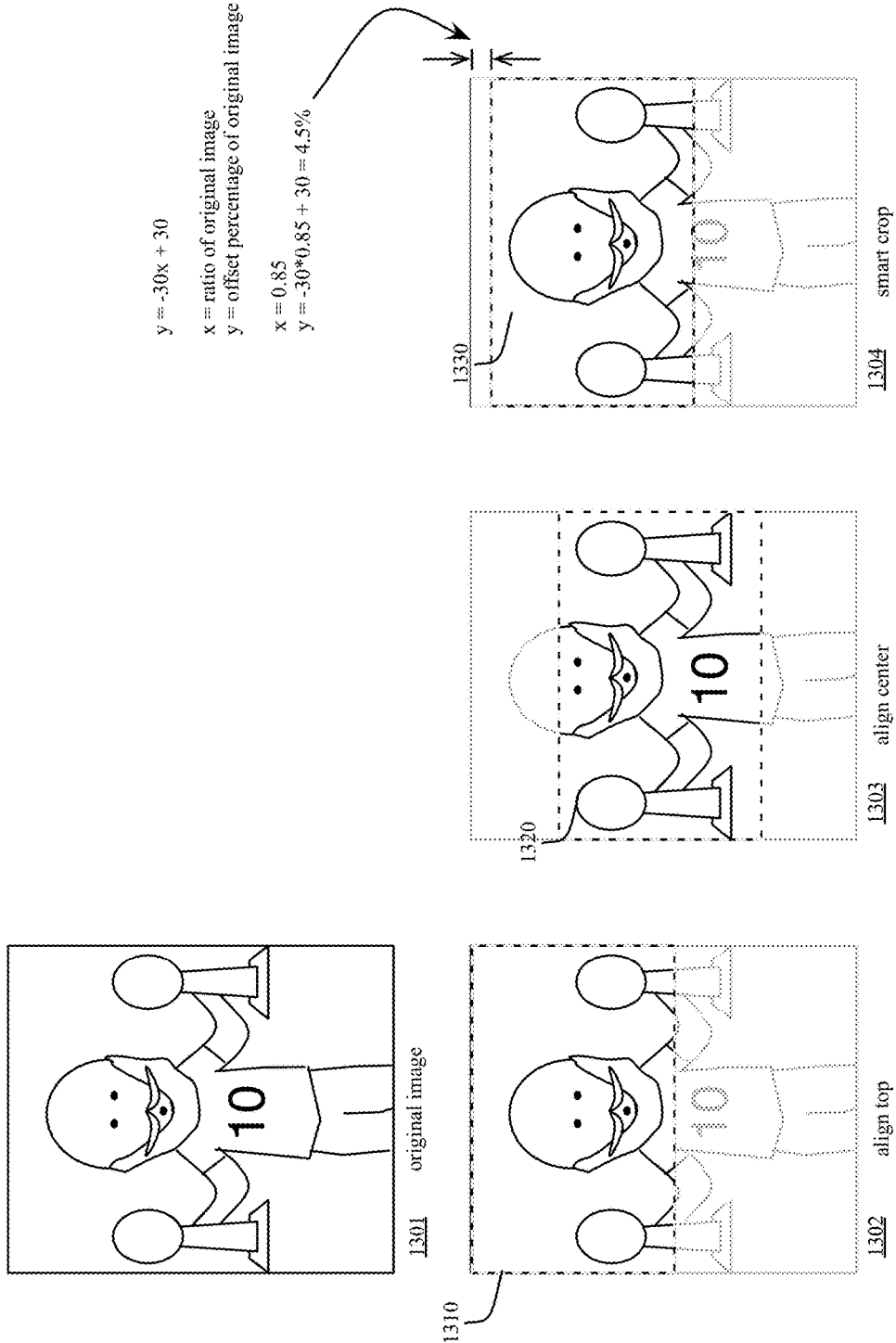
FIG. 13 illustrates an example of intelligent cropping to fit images to a particular aspect ratio.

FIG. 13 illustrates an example of intelligent cropping to fit images to a particular aspect ratio. The first image 1301 illustrates an original image, as received from the source for a particular document. The original image 1301 may be the image that is used within a native article layout or may be an image provided with an article summary in a web feed (e.g., RSS, Atom, etc.). The second image 1302 illustrates a simple top cropping method that takes a portion 1310 of the original image to fit the desired aspect ratio that begins at the top of the original image. In this example, the proportions of the cropped portion 1310 are undesirable, as unnecessary space is left at the top of the player's head and the arms and trophies are cropped awkwardly.

The third image 1303 illustrates a simple centered cropping method that captures a portion 1320 that is vertically centered on the image. In this example, again the proportions of the cropped portion 1320 are undesirable, as the player's head is largely cropped out and the player's eyes are uncomfortably close to the top of the cropped portion 1320. The fourth image 1304 illustrates an intelligent cropping method. The intelligent cropping method begins the cropped portion 1330 at a calculated distance from the top of the image. The distance is calculated based on the aspect ratio of the image and creates a more pleasing effect in most images, providing the most desirable portions of the original image within the cropped portion 1330.

The formula of some embodiments is $y=(1-x)*30$, where x is the aspect ratio (i.e., height/width) and y is the percentage from the top of the image at which to begin the cropped portion. For example, for 480×640 image, the aspect ratio is 0.67, so the formula provides that the cropped portion should begin at $y=(1-0.67)*30=(0.33)*30=10$. Thus, in this example, 10% of the top of the image would be cropped, and the selected portion would begin 64 pixels from the top of the image.

The calculation of some embodiments is based on the rule of thirds, which many photographers use, which places points of interest at intersections of imaginary lines that divide the image into thirds. The intelligent cropping method of some embodiments identifies gravity points at these intersections and is formulated to prominently capture a portion of the image with a desired aspect ratio. The intelligent cropping method is formulated such that the captured portion includes a set of the identified gravity points, regardless of the original aspect ratio of the image.

In some embodiments, while displaying a feed layout, the document reader updates the feed layout periodically or upon receiving instructions from a user to update the particular feed. The document reader of some embodiments retrieves new documents from the various sources and appends them to the currently displayed feed layout.

Figure 14:
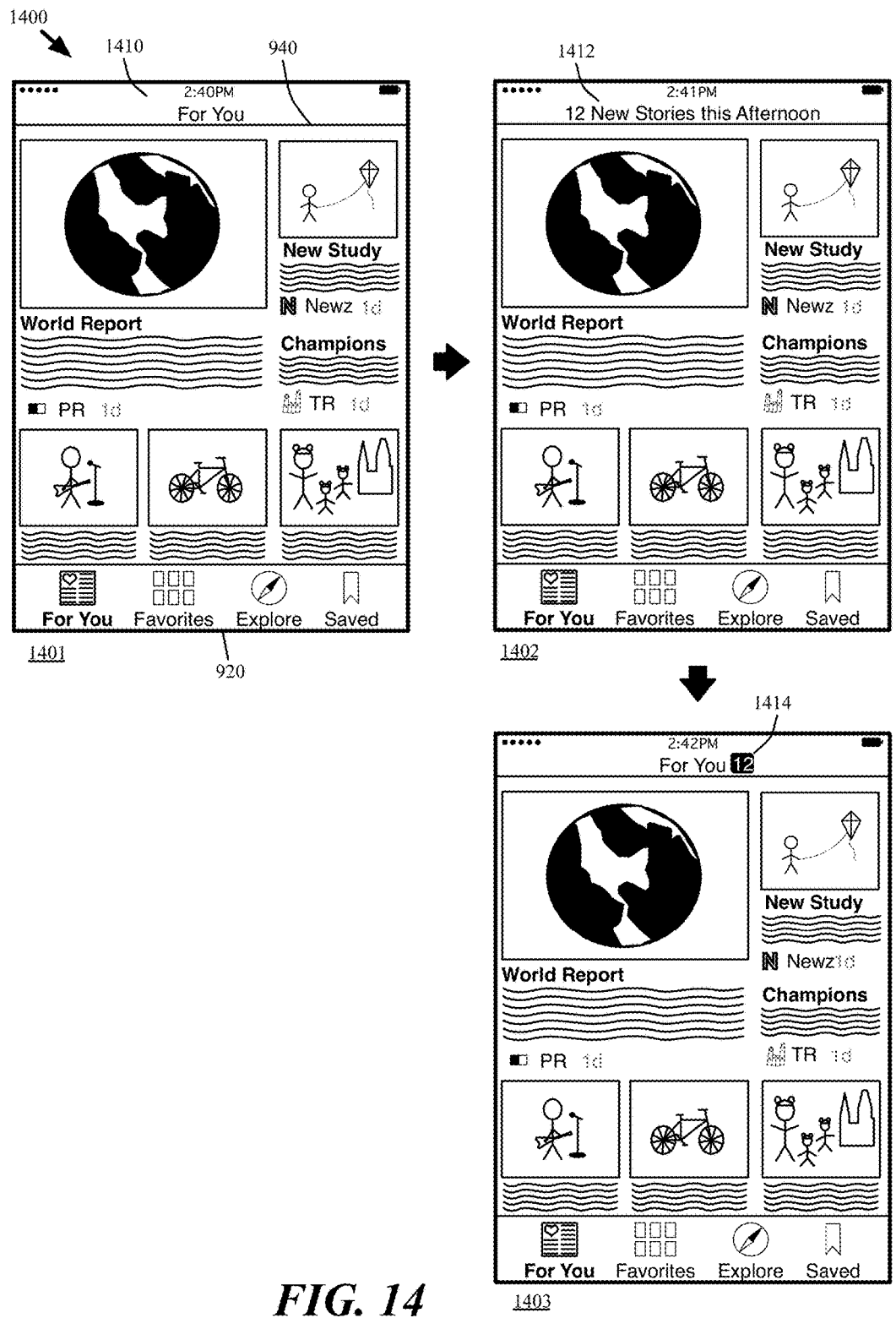
FIG. 14 illustrates an example of receiving updates while displaying a feed layout.

FIG. 14 illustrates an example of receiving updates while displaying a feed layout. In the first stage 1401, the GUI 1400 displays a status bar 1410, toolbar 920, and an aggregated feed layout 940 as described in FIG. 9 above. The status bar 1410, in addition to a title for the aggregated feed, displays a time and other device information.

The second stage 1402 shows that the document reader has received updates to the current feed. In the second stage 1402, the document reader provides a notification 1412 in the status bar 1410 of new documents that have been added to the feed. The notification 1412 indicates the number of new stories retrieved for a time period (e.g., "12 new stories this afternoon"). The aggregated feed layout 940 does not change.

In some embodiments, the notification 1412 appears for a designated period of time before animating back to identify the particular channel or view of the displayed feed. The third stage 1403 shows that after a short period of time, the status bar 1410 displays the title ("For You") and a badge 1414, which indicates the number of new articles that have not yet been seen. In some embodiments, the number in the badge changes as the user views documents by scrolling through the feed layout 940.

B. Alternate Views

The document reader application of some embodiments provides different interfaces for different types and sizes of devices. For example, in some embodiments, the document reader provides a larger interface for tablet type devices and a smaller interface for other mobile devices (e.g., smartphones, etc.).

Figure 15:
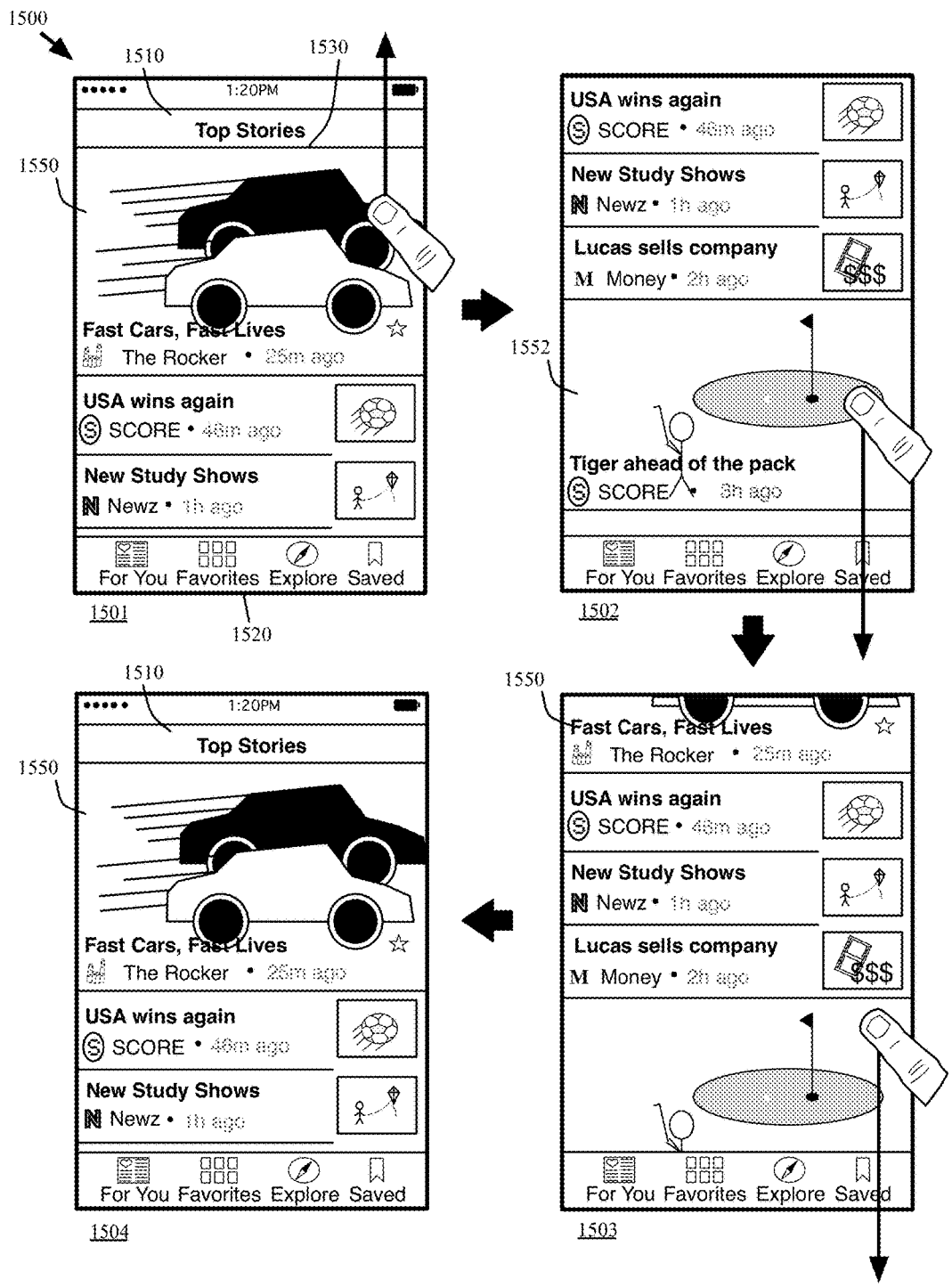
FIG. 15 illustrates an example of a document layout for a mobile device.

FIG. 15 illustrates an example of a document layout for a smaller interface of a mobile device in four stages 1501-1504. The first stage 1501 shows GUI 1500 with status bar 1510, toolbar 1520, and aggregated feed layout 1530. The status bar 1510 and toolbar 1520 are similar to the status bar and toolbar of FIG. 9. In some embodiments, a similar interface is used between a variety of different devices and screen orientations to provide a consistent document reader experience.

Like the document pane 1000 of FIG. 10, the document panes displayed in the aggregated feed layout 1530 include images, titles, source information, and time values for each document. In addition, the different document panes may have different layouts and sizes. However, unlike the aggregated feed layout 940 of FIG. 9, the aggregated feed layout 1530 of some embodiments provides a different layout for the document panes of the aggregated feed.

For example, in the first stage 1501, the document panes in the aggregated feed layout 1530 do not include the brief summary or excerpt of the article in order to save space and increase visibility. Due to the smaller screen size of some mobile devices, the document reader provides a simplified list view for displaying document panes of an article feed rather than using more complicated layouts.

The first stage 1501 also shows that the user scrolls through the aggregated feed layout 1530 to show additional document panes, as illustrated in the second stage 1502. The top article 1550 is no longer displayed in the feed layout 1530. In the second stage 1502, the user scrolls back up toward the top of the feed layout 1530, displaying a portion of the top story 1550.

In some embodiments, the top story 1550 includes a sticky point at which scrolling stops for large articles, such that the title, source information, and a portion of the image is visible, without showing the full size document pane, allowing the feed layout 1530 to show more stories at once. In the third stage 1503, the user scrolls down again in the feed layout 1530 to display the rest of the top story 1550, as illustrated in the fourth stage 1504.

Figure 16:
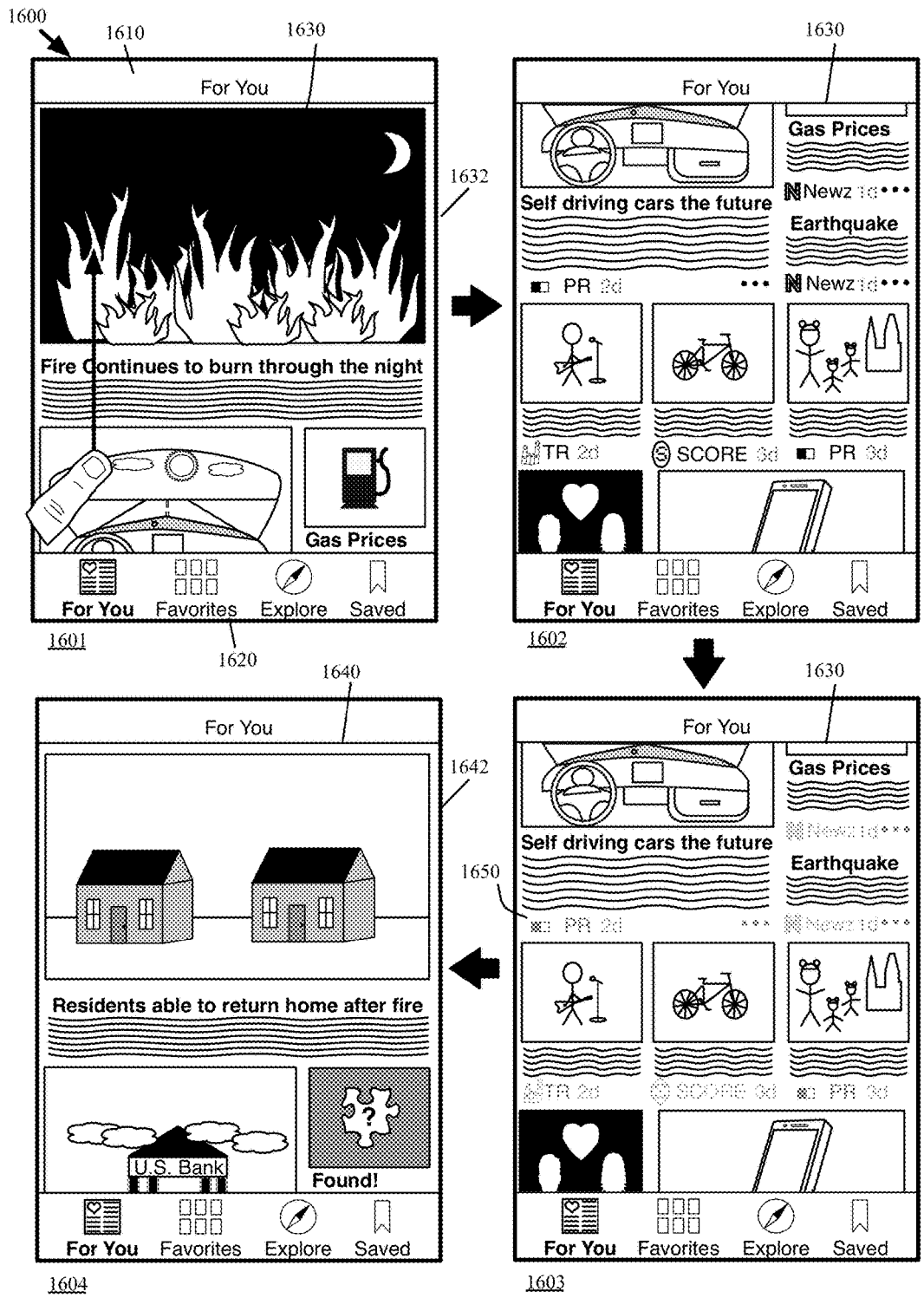
FIG. 16 illustrates an example of a layout for a morning feed at various times.

In some embodiments, in addition to providing different views for different devices, the document reader provides different views throughout the day, even for the same device. FIG. 16 illustrates an example of a layout for a morning feed at various times in four stages 1601-1604. The first stage 1601 shows GUI 1600 with status bar 1610, toolbar 1620, and morning feed layout 1630. In the first stage 1601, the GUI 1600 shows a morning feed layout 1630, which includes a featured story 1632 for the day. In some embodiments, the featured story 1632 is displayed differently (e.g., larger, with different visual styles, etc.) from all of the other stories. In this example, the featured story 1632 is the only story that takes up the entire width of the morning feed layout 1630. The document panes for the remaining articles in the morning feed layout are arranged in a fashion similar to those described above for the different feed layouts (e.g., aggregated feed layout, channel feed layout, etc.).

The featured story of some embodiments is only provided once within a given particular time period (e.g., a calendar day, morning/afternoon/evening, etc.). In some embodiments, the document reader application selects the featured story from a set of stories received from the user's collection of sources. In some embodiments, the publishers designate a set of stories as featured articles and the document reader application selects one of the designated stores based on the user's reading history and interests.

The first stage 1601 also shows that the user scrolls through the feed layout to view additional stories in the aggregated feed, as illustrated in the second stage 1602. In the second stage 1602, the user also closes the document reader.

In the third stage 1603, the user returns to the document reader at a later point during the day. The GUI 1600 shows the feed layout 1630 from the same position as when the user closed the application in the second stage 1602 earlier that day. The available articles in the feed have not changed, as new articles are added at the bottom of the feed. However, articles that the user has viewed, whether from the aggregated feed or through another view (e.g., through the channel views of the favorites screen), are shown differently from new and unviewed articles. In this example, the feed layout 1630 displays the source information (e.g., source information 1650) for articles that were previously viewed as grayed out, to indicate that the user has previously seen these articles.

In some preferred embodiments, the aggregated feed layout 1630 will begin with the first new article. For example, rather than showing the same articles that were shown in the second stage 1602, the document reader application of some embodiments shows the first unseen articles at the top of the feed layout 1630 when the user returns to the document reader application. The user can then scroll back up to view the articles that they have previously seen. In the third stage 1603, as the document reader was opened again during the same day, no new top story is displayed. Only one top story is displayed for a given day.

Finally, the fourth stage 1603 illustrates the GUI 1600 when the document reader is opened for the first time on a subsequent day. The GUI 1600 displays a new feed layout 1640 with a new top story 1642 is presented at the top of the feed layout 1640 with new articles for the day as well. Although not shown, in some embodiments, the user can scroll up to go back to the articles of the previous day, whether they have been seen or not.

Figure 17:
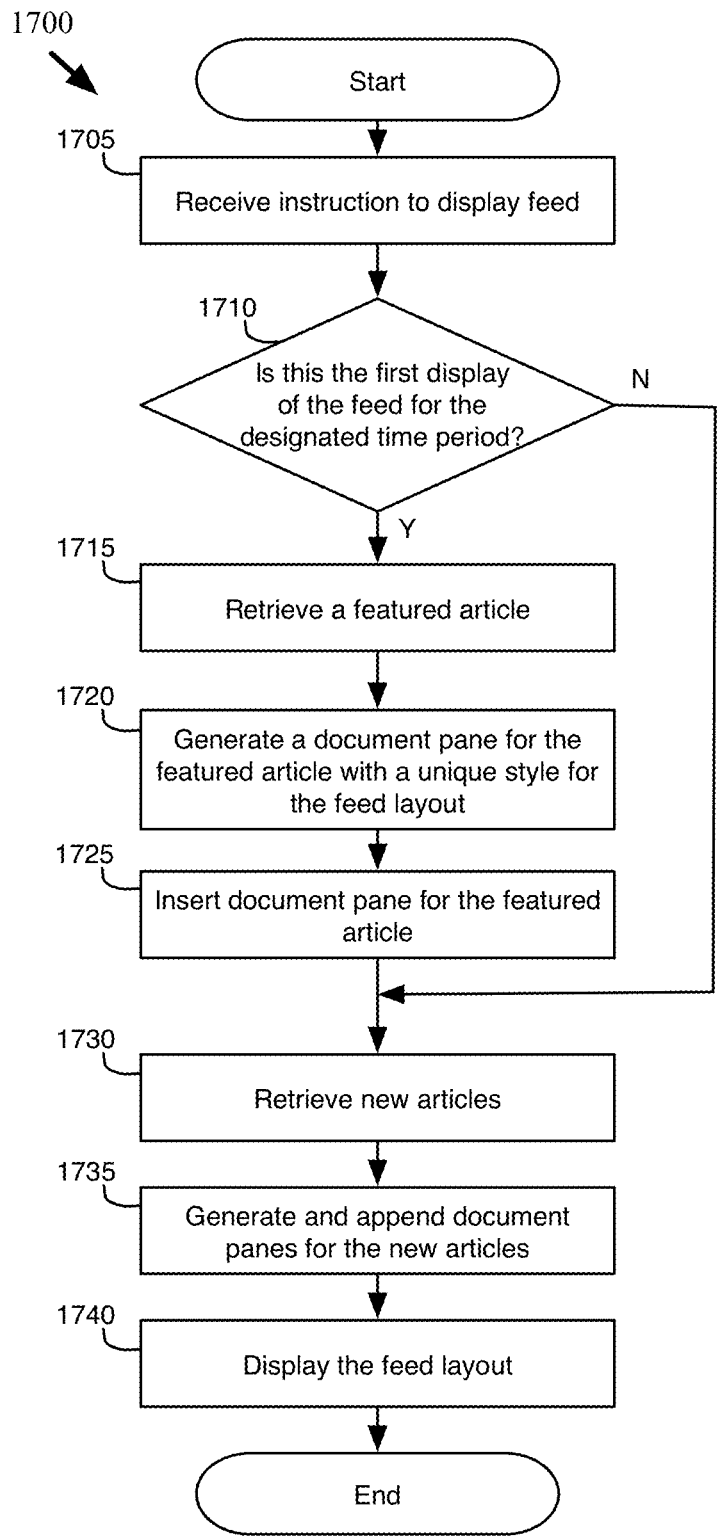
FIG. 17 conceptually illustrates a process for providing a morning feed.

FIG. 17 conceptually illustrates a process for providing a morning feed layout. The process 1700 of some embodiments is performed by a document reader application each time the application is opened on a user's device. The process 1700 receives (at 1705) instructions to display a feed view for a set of documents. These instructions may be based on user input to display a feed (e.g., selecting a channel tile to display a channel feed, selecting an icon to display the aggregated feed, etc.) or may be automatically generated when the document reader application begins (i.e., a default feed view).

The process 1700 determines (at 1710) whether this is the first display of the feed layout for a designated time period. The designated time period of some embodiments is a calendar day, a set number of hours, morning/afternoon/evening, etc. When the process 1700 determines (at 1710) that this is not the first time that the feed layout is being displayed, the process 1700 proceeds to step 1730 to display a normal feed layout as described below.

When the process determines (at 1710) that this is the first display of the feed for a given time period, the process 1700 retrieves (at 1715) a featured article. In some embodiments, the process chooses the featured article to be retrieved by receiving a set of documents from a set of sources from the user's collection and identifying a top story based on the user's reading history and interests. In some embodiments, each source of the set of sources specially designates a particular story as a feature story for the particular time period.

The process 1700 then generates (at 1720) a document pane for the featured article with a unique style to be displayed in the feed layout. The process 1700 then inserts (at 1725) the generated document pane into the feed layout. In some embodiments, the process 1700 inserts (at 1725) the generated document pane at the top (or at some other prominent location) of the displayed feed layout.

Once the featured article has been placed in the feed layout, the process 1700 retrieves (at 1730) any new articles for the feed. The process 1700 generates and appends (at 1735) document panes for the new articles to the feed layout. In some embodiments, the process 1700 inserts (at 1725) the generated document pane for the featured article immediately before the document panes for the new articles. In other embodiments, the process 1700 inserts (at 1725) the generated document pane at another location in the feed layout (e.g., immediately before the document panes for any unseen articles). The process 1700 then displays (at 1740) the feed layout.

C. Document Marking Menu

Figure 18:
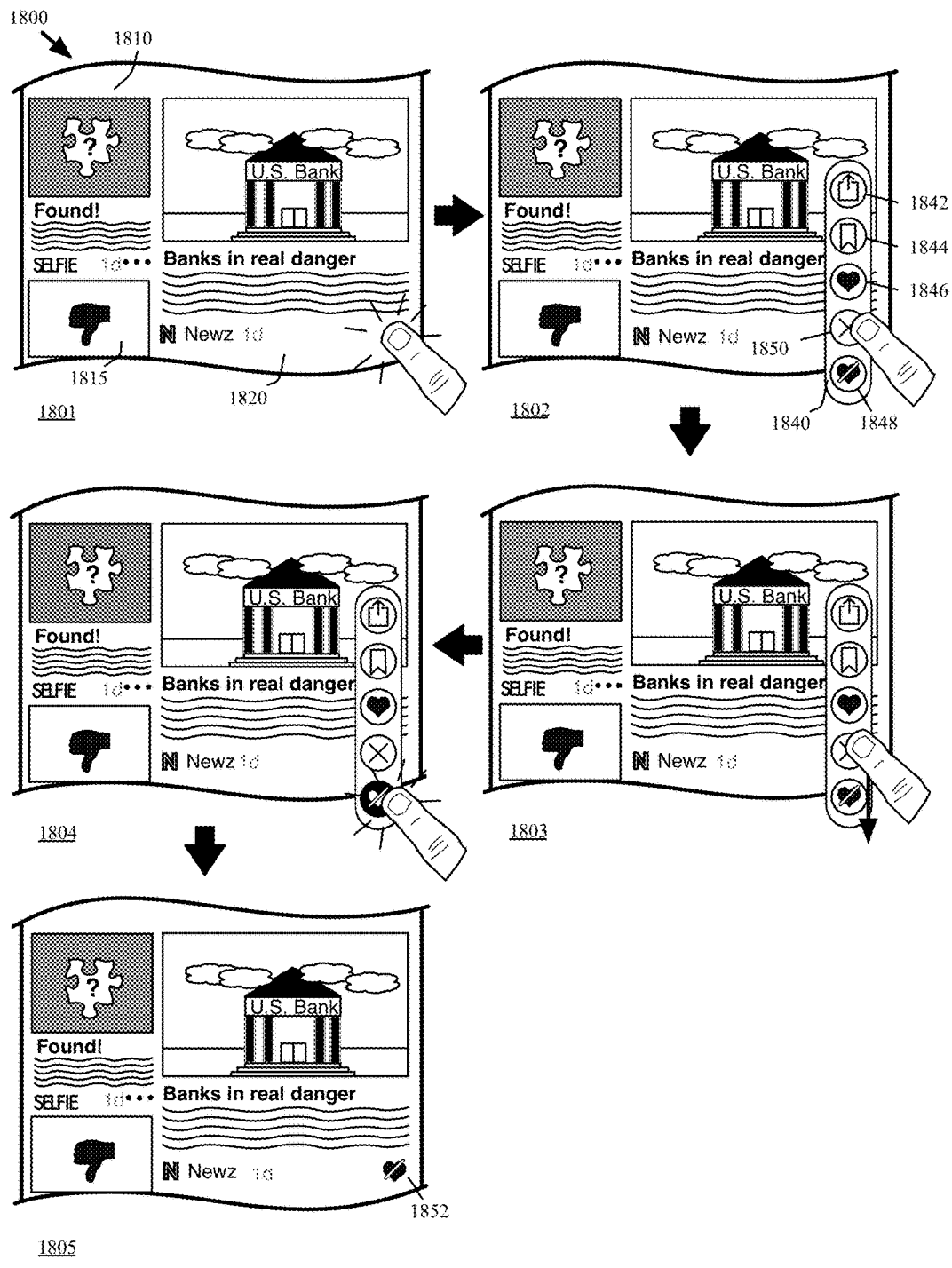
FIG. 18 illustrates an example of a document marking menu for performing different operations on articles in a feed layout.

FIG. 18 illustrates an example of a document marking menu for performing different operations on articles in a feed layout in five stages 1801-1805. The first stage 1801 illustrates a portion of a feed 1800. The portion 1800 includes three document panes 1810, 1815, and 1820. In the first stage 1801, the user holds a position to bring up a document marking menu 1840 on document pane 1820, as illustrated in the second stage 1802. In some embodiments, the user holds a button for bringing up the document marking menu 1840, while in other embodiments a user can hold a location anywhere within the document pane to bring up the document marking menu 1840.

The second stage 1802 shows the document marking menu 1840 has been displayed at the location held by the user. The document marking menu 1840 includes four UI items 1842, 1844, 1846, and 1848 for performing different operations on the particular document pane 1820, as well as a placeholder icon 1850. In this example, UI item 1842 is for sharing the article of the document pane 1820 using different services (e.g., email, social networks, etc.). UI item 1844 is for saving the article for future viewing.

UI items 1846 and 1848 are for liking and disliking the article. In some embodiments, liking and disliking various articles provides additional data for the document reader to provide more specific recommendations, both in terms of channels and topics, as well as in ranking articles for the user in the various feeds.

Placeholder icon 1850 indicates the held location in the document pane. In some embodiments, selection of the different UI items 1842-1848 is performed by sliding from the placeholder icon 1850 to a particular UI item.

In the third stage 1803, the user slides from placeholder icon 1850 down to the UI item 1848 to dislike the article. The UI items of the toolbar 1840 are placed such that, if the user wanted to like the article, the user would slide in the opposite direction. In some embodiments, opposing actions (e.g., like/dislike) are placed in opposing directions relative to the placeholder icon 1850 of the toolbar 1840, such that opposing actions can be performed by sliding in opposing directions.

The fourth stage 1804 shows that UI item 1848 has been highlighted to indicate that the user has selected UI item 1848 (e.g., by lifting their finger from the UI item). The fifth stage 1805 shows that once the user selects UI item 1848, the toolbar 1840 is no longer displayed. However, to indicate that the user has disliked the article for document pane 1820, icon 1852 is displayed in the lower right corner of the document pane 1820.

Figure 19:
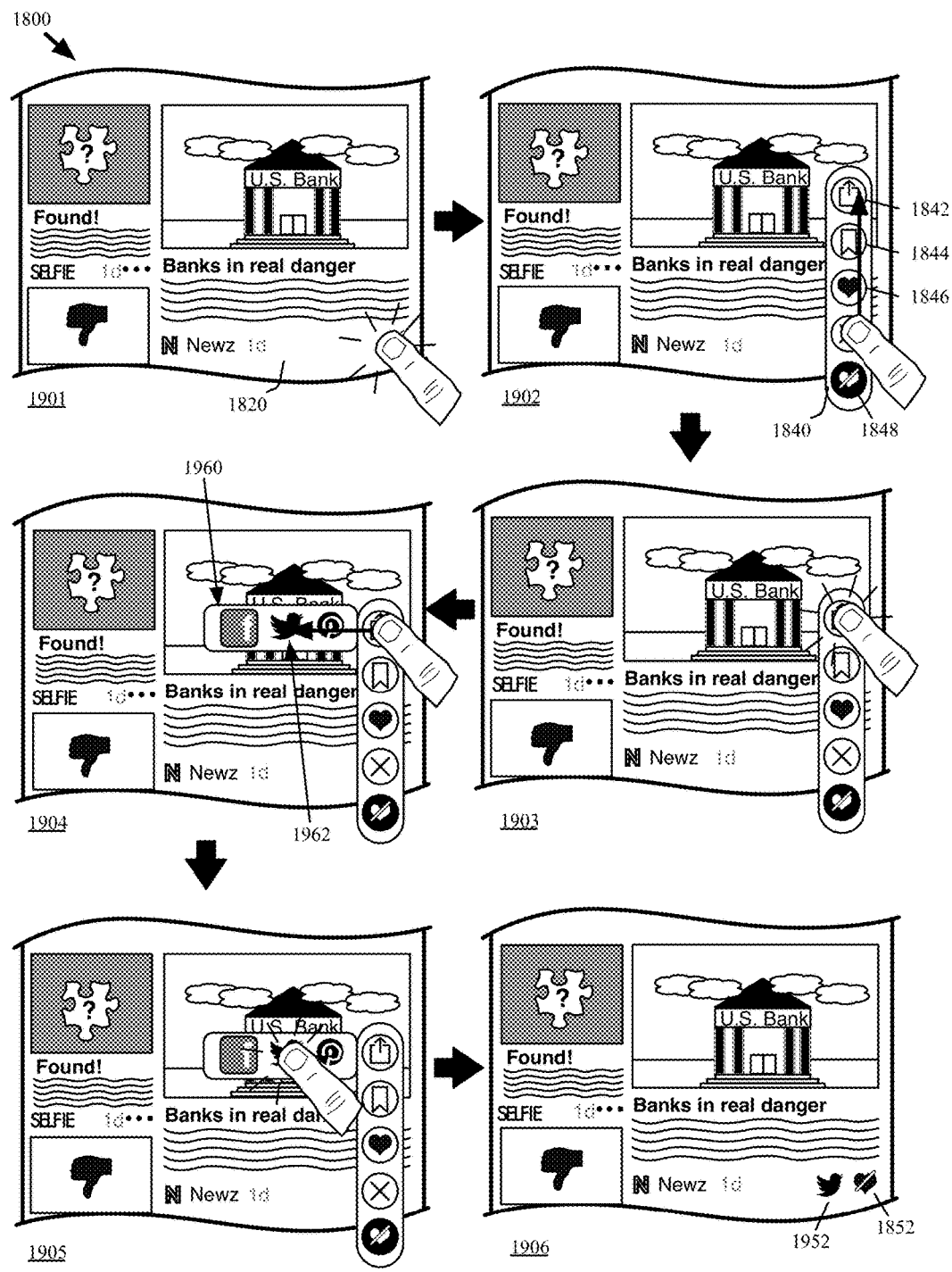
FIG. 19 illustrates an example of using the document marking menu to share a document in a document feed.

In some embodiments, the UI items of the toolbar are for performing other operations on the article for a document pane. FIG. 19 illustrates an example of using the UI item to share a document in a document feed in six stages 1901-1906. The first three stages 1901-1903 show that the user holds down a location in document pane 1820 to bring up toolbar 1840 and slides up from the placeholder icon 1850 to select UI item 1842 in order to share the article associated with document pane 1820.

In the fourth stage 1904, the user has selected UI item 1842 to share the article, which brings up a secondary toolbar 1960 with UI items for three separate sharing services (e.g., social networking sites, image sharing sites, etc.). The fourth stage 1904 shows that the user slides from the selected UI item 1842 to select UI item 1962.

In the fifth stage 1905, the user selects UI item 1962 to share the article. In some embodiments, the UI item 1962 opens another display area (not shown) to share the article through a third party API. The sixth stage 1906 shows that the document pane 1820 now shows icons 1852 and 1952 to indicate that the article for document pane 1820 has been disliked and shared by the user.

Figure 20:
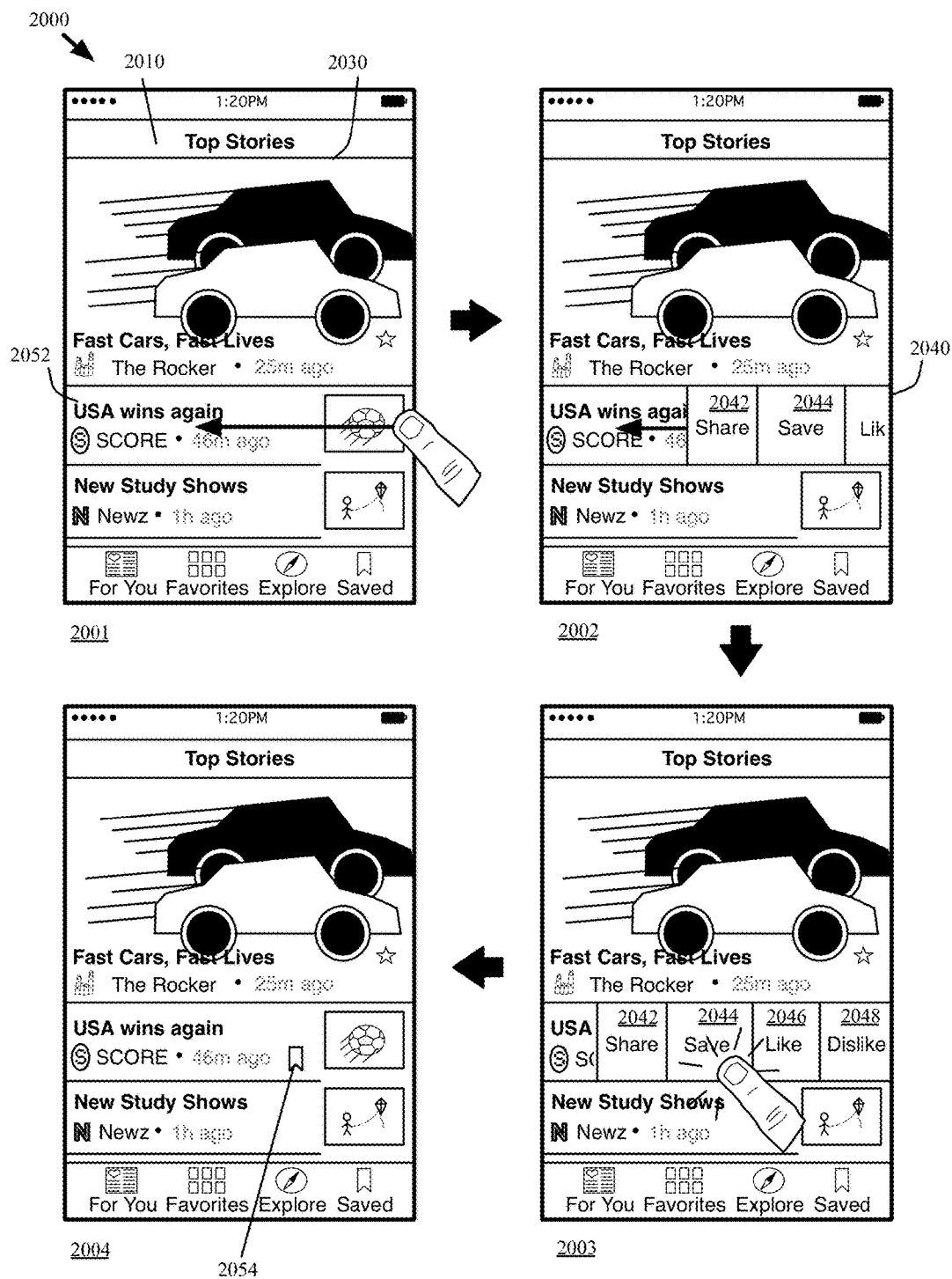
FIG. 20 illustrates an example of an alternative UI for performing different operations on articles in a feed layout.

FIG. 20 illustrates an example of an alternative UI for performing different operations on articles in a feed layout. In the first stage 1901, GUI 2000 shows a feed layout for a mobile device, similar to the one described above with reference to FIG. 15. In the first stage 2001, the user slides across document pane 2052.

The second and third stages 2002 and 2003 show that when the user slides across document pane 2052, a menu 2040 slides into the display area. The menu 2040 includes UI item 2042 to share the article, UI item 2044 to bookmark (or save) the article, and UI items 2046 and 2048 to like and dislike the article respectively, as illustrated in the third stage 2003. In the third stage 2003, the user selects UI item 2044 to save the article for future viewing.

Finally, the fourth stage 2004 shows that document pane 2052 now shows icon 2054 to indicate that the article for document pane 2052 has been bookmarked by the user.

III. Document View

The document reader of some embodiments provides a document view for content from various sources. Some sources provide the content in a native format that provides rich formatting and placement data that can be used to provide a dynamic and aesthetically pleasing layout. Other sources may provide content (i.e., web content) in a standardized, but less rich format (e.g., RSS, Atom, etc.) The document reader of some embodiments provides different presentations for the different types of articles.

A. Web Documents

Figure 21:
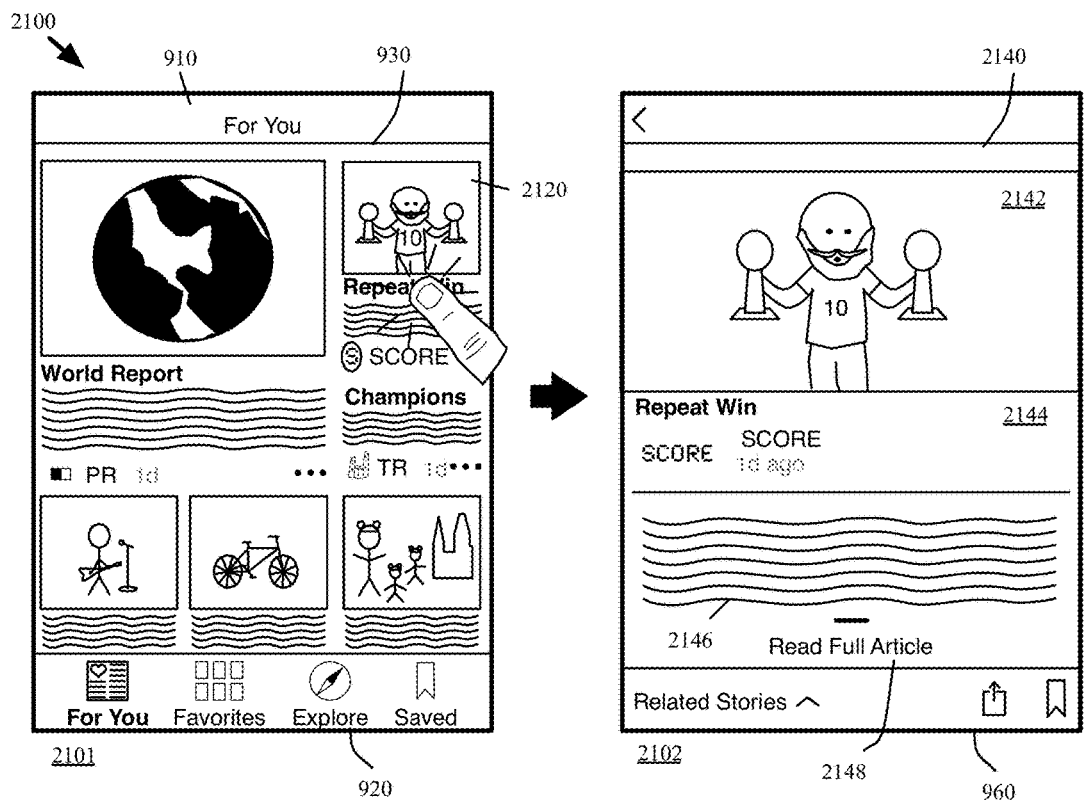
FIG. 21 illustrates an example of displaying a web document.

For web content, the source may not immediately provide a full article, but rather an excerpt view of the article. The document reader then provides access to the full article view from the excerpt view (e.g., through gestures, links, buttons, etc.). The excerpt view may include a limited number of images and an excerpt or summary of the full content of the web article. When the web content is received in a non-native format (e.g., RSS, etc.), some embodiments generate the intermediate excerpt view and/or the full article view using a templating scheme that matches the received web content to a template and applies styling and/or formatting to the content according to the template in order to generate an aesthetically pleasing layout for the web content. FIG. 21 illustrates an example of displaying a web document from a feed layout in two stages 2101-2102. In the first stage 2101, the GUI 2100 shows the aggregated feed layout 930. The first stage 2101 also shows that the user has selected document pane 2120 for a web article from the aggregated feed layout 930.

The second stage 2102 shows an article toolbar 960 and an excerpt view 2140 of the web article. The article toolbar 960 includes different affordances for interacting with the article (e.g., displaying related articles, sharing the article, bookmarking the article, etc.).

The excerpt view 2140 includes an enlarged image 2142, title pane 2144, excerpted text 2146, and an affordance 2148 to display a full version of the article. The title pane 2144 displays the title of the article, a logo and name for the source of the article and a time value (e.g., the publication date, time since the article was added to the user's feed, etc.) for the article. The affordance 2148 in some embodiments is a link that opens a full version of the web content in a browser object for displaying web content within the document reader application. In some embodiments, the document reader applies a set of styles to the web content to provide a consistent view of the different articles from the various sources.

Figure 22:
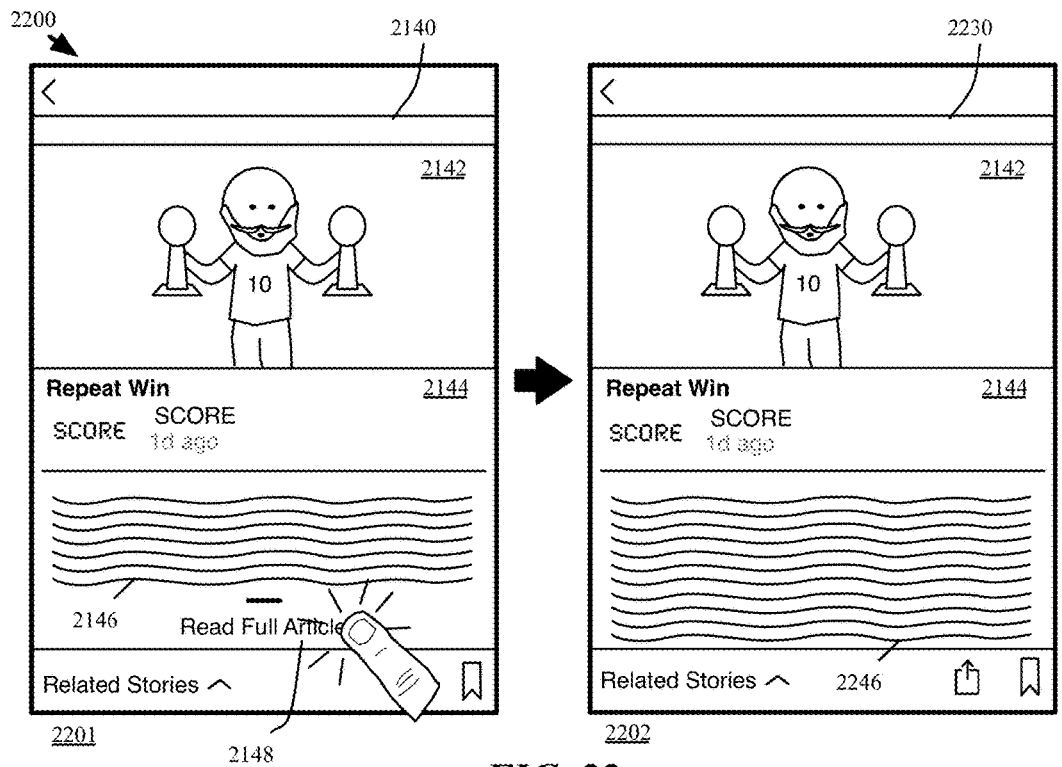
FIGS. 22 and 23 illustrate examples of displaying a full article from an excerpt view of a web document.
Figure 23:
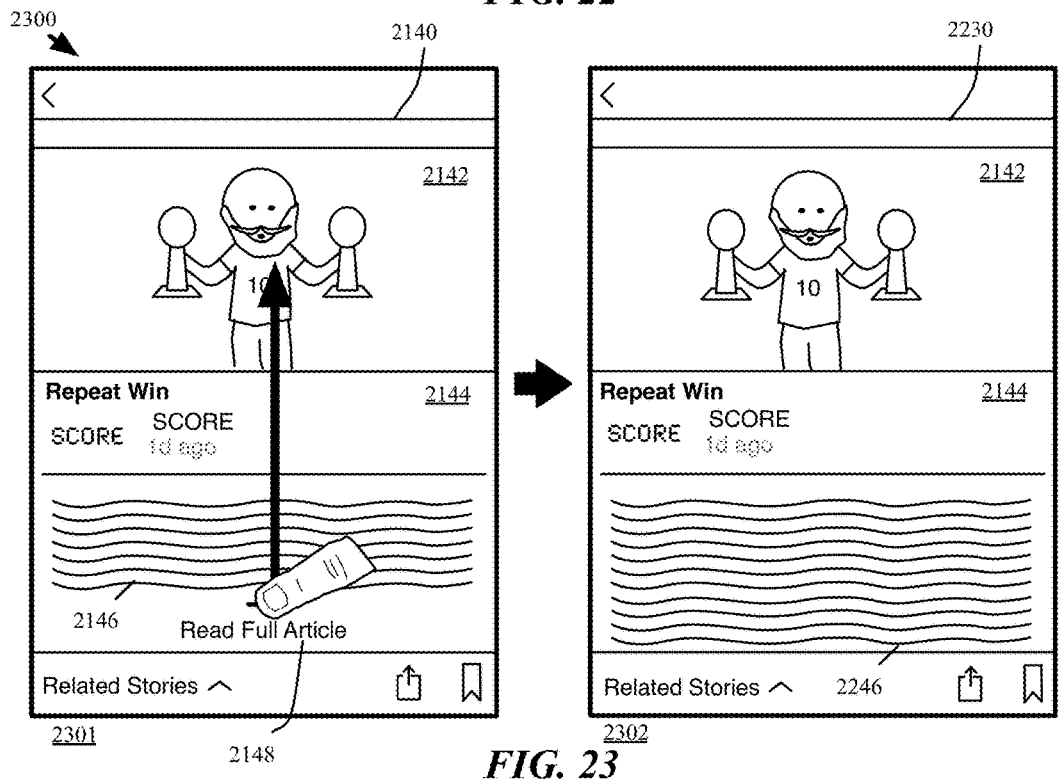

FIGS. 22 and 23 illustrate examples of displaying a full document from an excerpt view of a web document. FIG. 22 shows an example of displaying a full document from an excerpt view in two stages 2201-2202. In the first stage 2201, a user selects an affordance 2148 that is provided in the excerpt view of a web document. In some embodiments the affordance 2148 to the full article is provided after the content, but before an end-of-article interface that is described in Section D below.

The second stage 2202 shows that the GUI 2200 displays a full view 2230 of the article. In this example, the full view 2230 of the article is formatted similarly to the excerpt view 2140, but rather than the affordance 2148 and the excerpted text 2146, the full view 2230 displays the full text 2248 of the article. In some embodiments, the document reader provides customized styles (e.g., through custom css style sheets) to provide a consistent experience for the different types of documents from different sources. Alternatively, or conjunctively, the document reader of some embodiments provides the full article view for a web document through a browser object, allowing the document reader to treat the web article as a native article with interesting layouts and styles to improve readability and user experience.

FIG. 23 illustrates another example of displaying a full web document from an excerpt view in two stages 2301-2302. The example in this figure is similar to the example of FIG. 22, however, rather than selecting the affordance 2148, the first stage 2301 shows that the user performs a gesture (i.e., a swipe up) through the excerpt view 2140. In response to the swiping past the end of the excerpt view 2140, the second stage 2302 illustrates that the GUI 2300 loads the full view 2230 of the web document in the browser object as described above.

Figure 24:
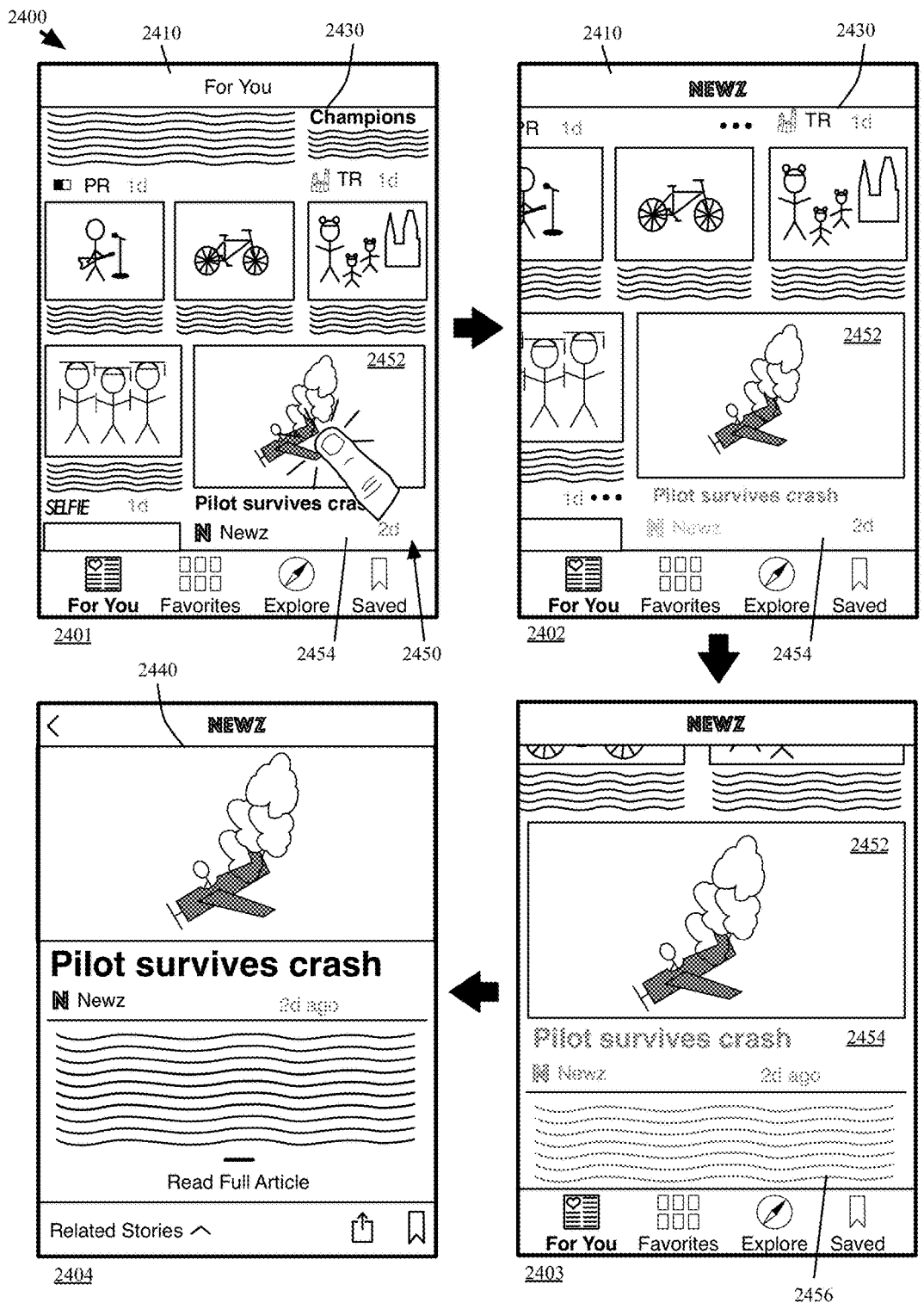
FIG. 24 illustrates an example of the animation of a document pane for a web document in a feed to a full document view.

In some embodiments, in providing the different presentations for web and native articles, the document reader of some embodiments provides animations between the layout view and the article views for the web and native documents. FIG. 24 illustrates an example of the animation of a document pane in a feed layout to an excerpt document view for a web article. The first stage 2401 shows GUI 2400 with status bar 2410 and feed layout 2430. The status bar 2410 displays a name for the feed.

In the first stage 2401, a user selects article 2450, with image 2452, from the feed layout 2430. In response to the selection, the GUI 2400 zooms into the selected article 2450 as the neighboring articles expand and are pushed out of the display area, as illustrated in stages 2402 and 2403. The third stage 2403 shows that the image 2410 and title are scaled to grow and move toward their final places within the excerpt view of the web article, shown in the fourth stage 2404. The document reader of some embodiments recrops the image to expose portions of the image that were previously cropped to fit the image to the layout of the document pane. In some embodiments, only the image 2410 and the title 2412 grow during the animation, while the summary text of the document pane fades out and the full article text fades in.

In some embodiments, the document reader application performs operations to recrop, rescale, and recenter image 2452 to animate the image 2452 into a specified location in the full article view 2440, creating a parallax effect to provide a sense of depth in a flat image. The operations of the document reader application on the image 2452 create the appearance that the frame of the image 2452 moves independently of the image 2452, creating an illusion of depth and motion within the transition animation.

Alternatively, or conjunctively, the document reader application uses cinemagraphs to animate the image 2452 into a specified location in the full article view 2440. Cinemagraphs are still photographs in which a minor and repeated movement occurs. Cinemagraphs, which in some embodiments are published in either animated GIF format or as video, can give the illusion of motion related to the animation to the specified location.

B. Native Documents

Figure 25:
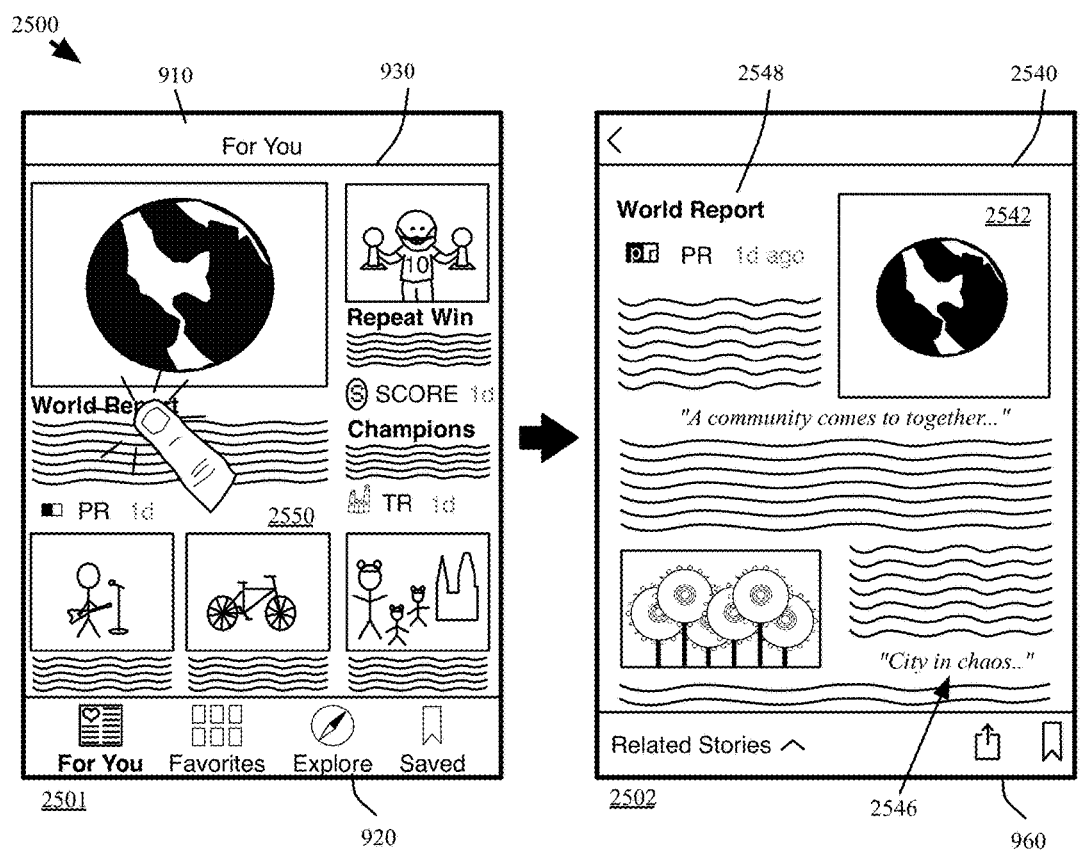
FIG. 25 illustrates an example of displaying a native document.

FIG. 25 illustrates an example of displaying a native document in two stages 2501-2502. In the first stage 2501, GUI 2500 shows the aggregated feed layout 930 and shows the user has selected document pane 2550 for a native article. In response to the selection, the second stage 2502 shows a full view 2540 of the native article. In some embodiments, native articles are provided by the publishers in a special format that allows for flexible placement and styling of images and text, with rich formatting and animations to provide an enhanced multimedia experience. The second stage 2502 shows that the full view 2540 of a native article includes multiple images placed at various locations within the full view 2540, as well as specially formatted text (e.g., quote text 2546). Native articles some embodiments have more sophisticated layouts, placing images, text and other multimedia objects at various locations within the article layout.

Figure 26:
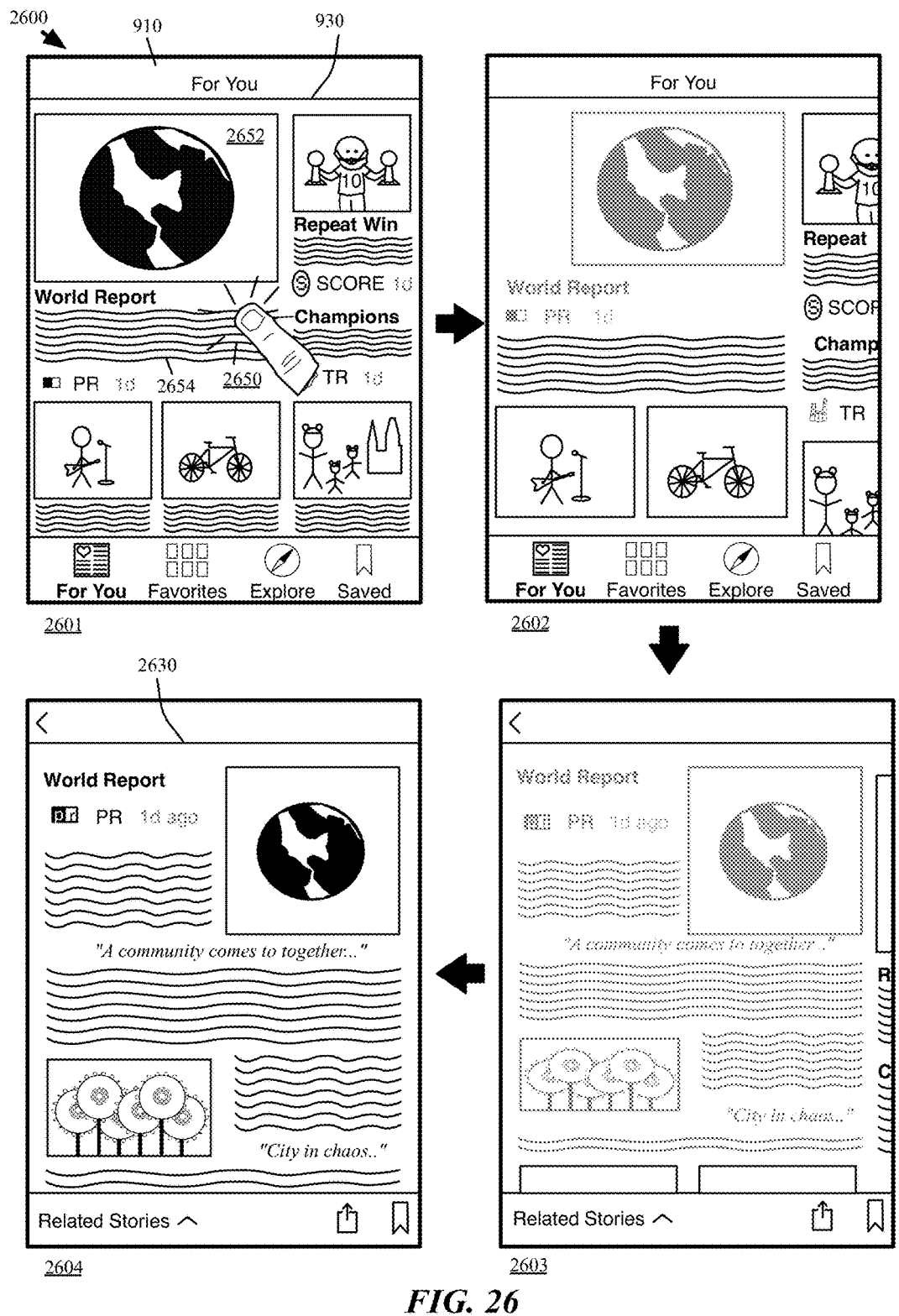
FIG. 26 illustrates an example of the animation of a document pane for a native document in a feed to a full document view.

FIG. 26 illustrates an example of the animation of a document pane in a feed to a full document view for a native article in four stages 2601-2604. In the first stage 2601, the user selects a document pane 2650 for a native article from the aggregated feed layout 930. Selection of document pane 2650 begins an animation for elements (e.g., image 2652, excerpt text 2654, etc.) in the document pane 2650 to a full view 2630, as illustrated in stages 2602-2603. Like the animation for a web article described above, the other document panes of the feed layout 930 are pushed out of the display area as image 2652 is recropped, rescaled and moved from the document pane to a location within the full view 2630 of the article. Stages 2603 and 2604 show that the full text of the native article, along with other elements such as images and quote text, fade into the full view 2630 of the article.

C. Preloading

Figure 27:
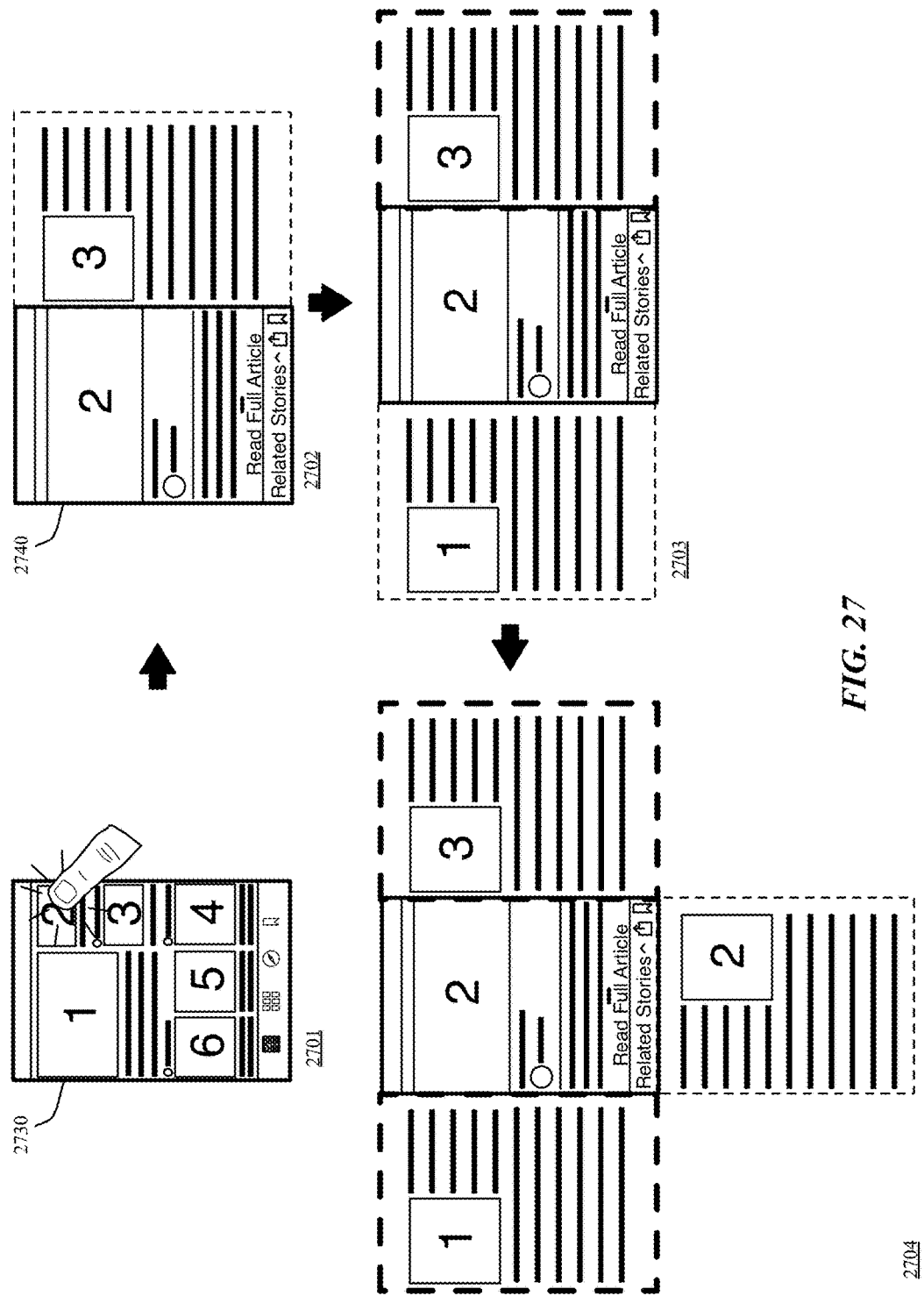
FIG. 27 illustrates an example of preloading neighboring articles when a particular document is selected.

In order to provide a smoother, uninterrupted experience when displaying documents, the document reader of some embodiments performs a set of preloading operations to load neighboring articles once a particular article has loaded. FIG. 27 illustrates an example, in four stages 2701-2704, of preloading neighboring articles when a particular article is selected.

The first stage 2701 shows a sequence of articles 1-6 displayed in a feed layout. The sequence of articles may be ordered based on a variety of factors, including time order, user rank, placement within a particular layout, etc. In the first stage 2701, a user selects a web article 2 from a feed layout 2730 in the GUI 2700. In response the selection, the second stage 2702 shows an excerpt view 2740 of article 2 has been loaded in the display.

In addition, the second stage 2702 shows that the next article in the sequence (i.e., article 3) is being preloaded (as indicated by a dashed line) into memory. In some embodiments, rather than unnecessarily loading the entirety of an article the user may not be interested in, the document reader only loads a minimal portion of article 3, such that an initial screen for article 3 can be loaded immediately when the user navigates to article 3. The remainder of the article can then be loaded once the user decides to view article 3 (e.g., by swiping to the next article).

The third stage 2703 shows that article 3 (or a portion of the article) has been preloaded (as indicated by a thick dashed line) and the previous article 1 within the sequence of articles is now being preloaded into memory.

In some embodiments, when an excerpt view 2740 of a web article is shown in GUI 2700, the document reader preloads a full version of the web article. In the fourth stage 2704, once the neighboring articles 1 and 3 have been preloaded into memory, the document reader of some embodiments preloads a full version of the web article to be displayed if the user decides to view the full web article (e.g., by selecting a link or swiping up through the excerpt view).

This example describes a particular order for preloading the full version of the article along with the neighboring articles, but this is not intended to limit the invention. One skilled in the art will recognize that the preloading of related articles may be performed in different orders without departing from the invention.

Figure 28:
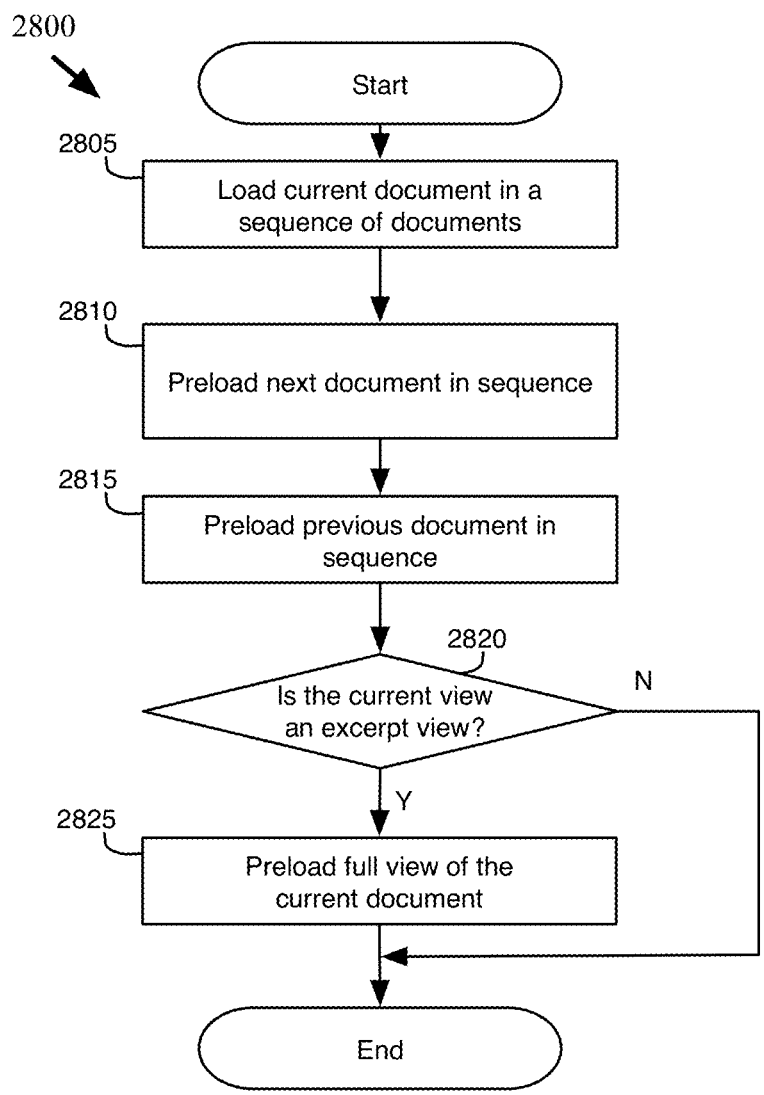
FIG. 28 conceptually illustrates an example of preloading documents in a document reader application.

FIG. 28 conceptually illustrates a process 2800 of some embodiments for preloading documents in a document reader application. The process 2800 of some embodiments is performed by a document reader whenever a full article view is displayed (e.g., when an article is selected from a feed view, when a user navigates (e.g., by swiping) to a new article, etc.). The process 2800 loads (at 2805) a document in a sequence of documents (e.g., documents within a feed, linked documents embedded in a document, etc.). The process 2800 preloads (at 2810) the next document in the sequence before preloading (at 2815) the previous document in the sequence as well.

The process 2800 then determines (at 2820) whether the current view of the document is an excerpt view. When the process 2800 determines (at 2820) that the current view is not an excerpt view, the process 2800 ends. When the process 2800 determines (at 2820) that the current view is an excerpt view, the process 2800 preloads (at 2825) the full view of the current document. In some embodiments, the process 2800 preloads (at 2825) the full view by caching a mobile or desktop version of the article from the originating website of the excerpted article and preparing a set of styles to apply to the cached version of the article.

D. End of Article

Figure 29:
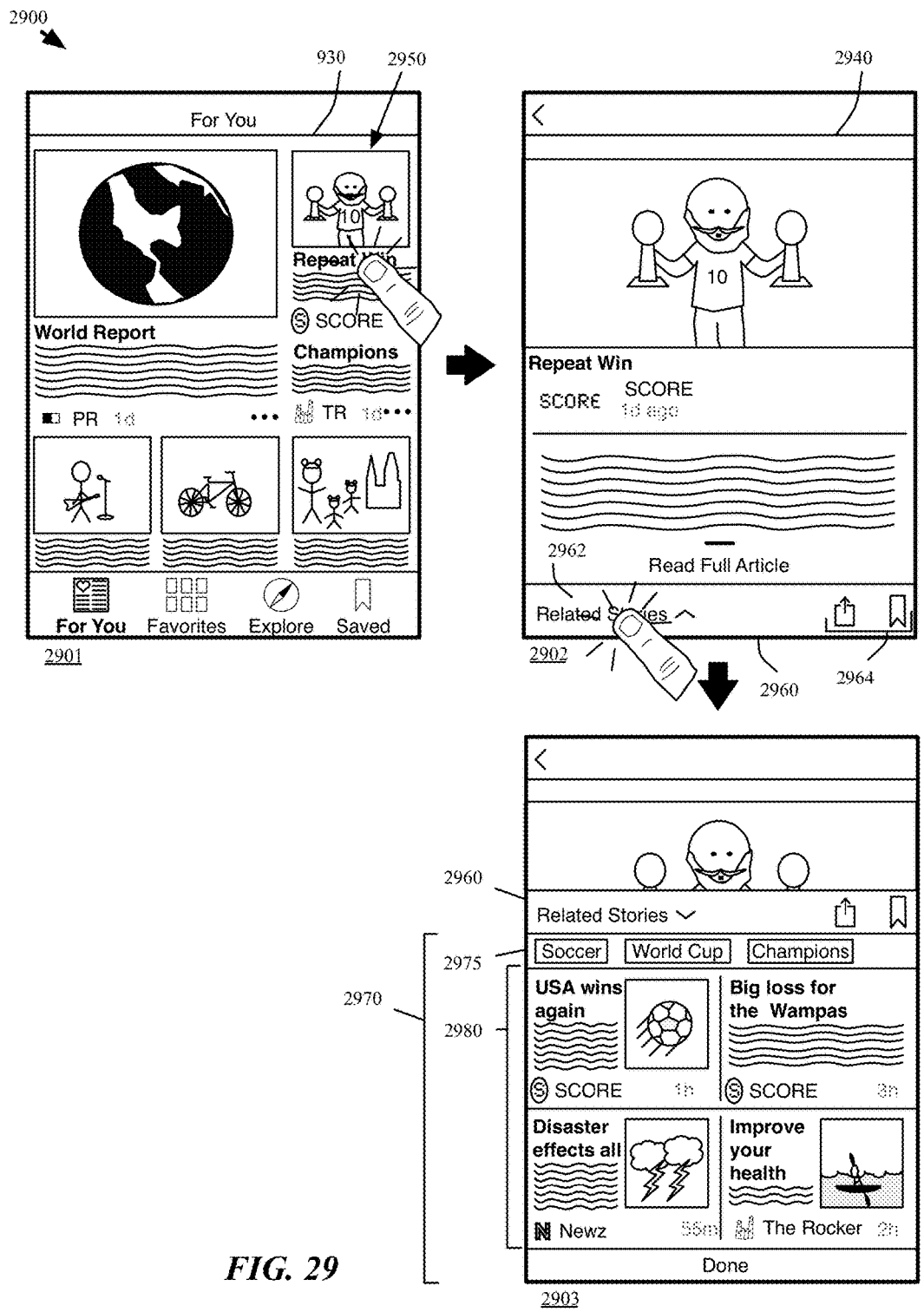
FIG. 29 illustrates another example of providing an end-of-article display region with related documents.

In some embodiments, the document reader also provides an end of article UI for providing access to additional articles related to a particular article that is viewed in the document reader. FIG. 29 illustrates an example of providing an end-of-article display region with related articles in three stages 2901-2903. The first stage 2901 shows a feed layout view 930 with several document panes. The first stage 2901 shows that a user selects document pane 2950. In the second stage 2902, the GUI 2900 displays an excerpt view 2940 of the selected article and a document toolbar 2960.

The document toolbar 2960 includes several icons for performing different operations on the current article, much like those described above with reference to FIGS. 18-20. Specifically, the document toolbar 2960 also includes an affordance 2962 for displaying articles related to the current article. In the second stage 2902, the user selects affordance 2962. In the third stage 2903, the GUI 2900 moves the document toolbar 2960 up to display an end of article section 2970.

In this example, the end of article section 2970 includes a tag bar 2975. The tag bar 2975 includes tags, or keywords, that the article has been tagged with. In some embodiments, the tags are selectable UI items, where selection of one of the tags displays (e.g., in one of the layouts described above) additional articles that are tagged with the selected tag.

The end of article section 2970 also displays document pane area 2980, which displays document panes for articles related to the current article. The related articles of the document pane area 2980 include other stories from the same source as the current article, as well as stories related to the current article, but from different sources. In some embodiments, the other sources are sources that the user has selected for their favorites collection (e.g., through the onboarding and explore options described above).

Figure 30:
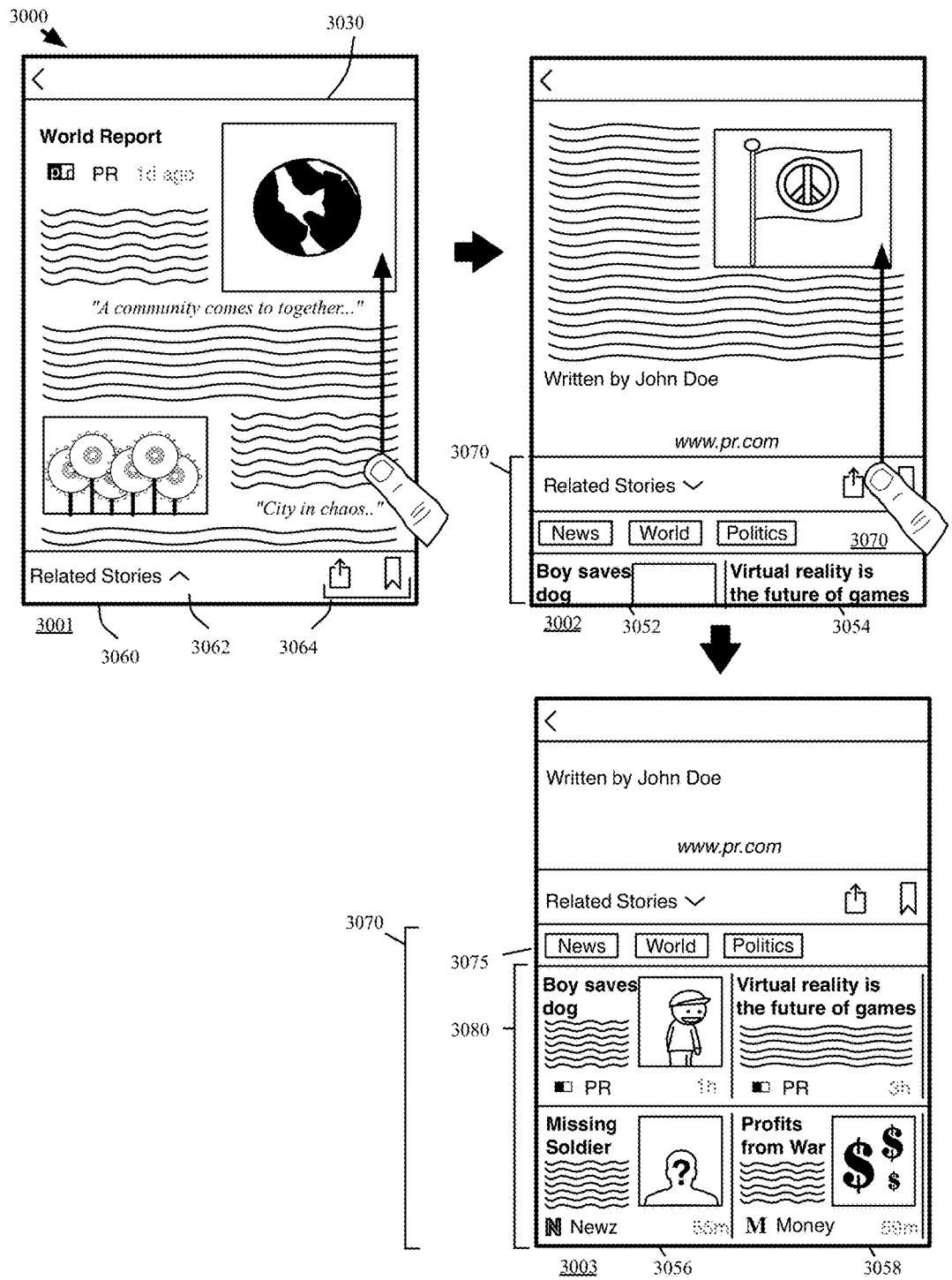
FIG. 30 illustrates an example of providing an end-of-article display region with related documents.

FIG. 30 illustrates an example of providing an end-of-article display region with related articles using gestures in three stages 3001-3003. The first stage 3001 shows a GUI 3000 with a full view 3030 of a native article. In the first stage 3001, the user scrolls toward the end of the article. The GUI 3000 also displays toolbar 3020, much like the toolbar 2920 described with reference to FIG. 29, with icon 3022 for displaying an end of article section. However, in this example, the user uses a gesture to display an end of article section.

In the second stage 3002, the user has scrolled to the end of the article. The second stage 3002 also shows that when the user swipes up past the end of the article, the toolbar 3020 scrolls up to reveal a portion of the related articles section 3070 as it is being scrolled into view.

In the third stage 3003, GUI 3000 shows the full view 3030 of the native article and the end of article section 3070 overlaid above the native article. The end of article section 3070 includes a tag bar 3075 and document pane area 3080, similar to the tag bar and document pane described above with reference to FIG. 29.

Figure 31:
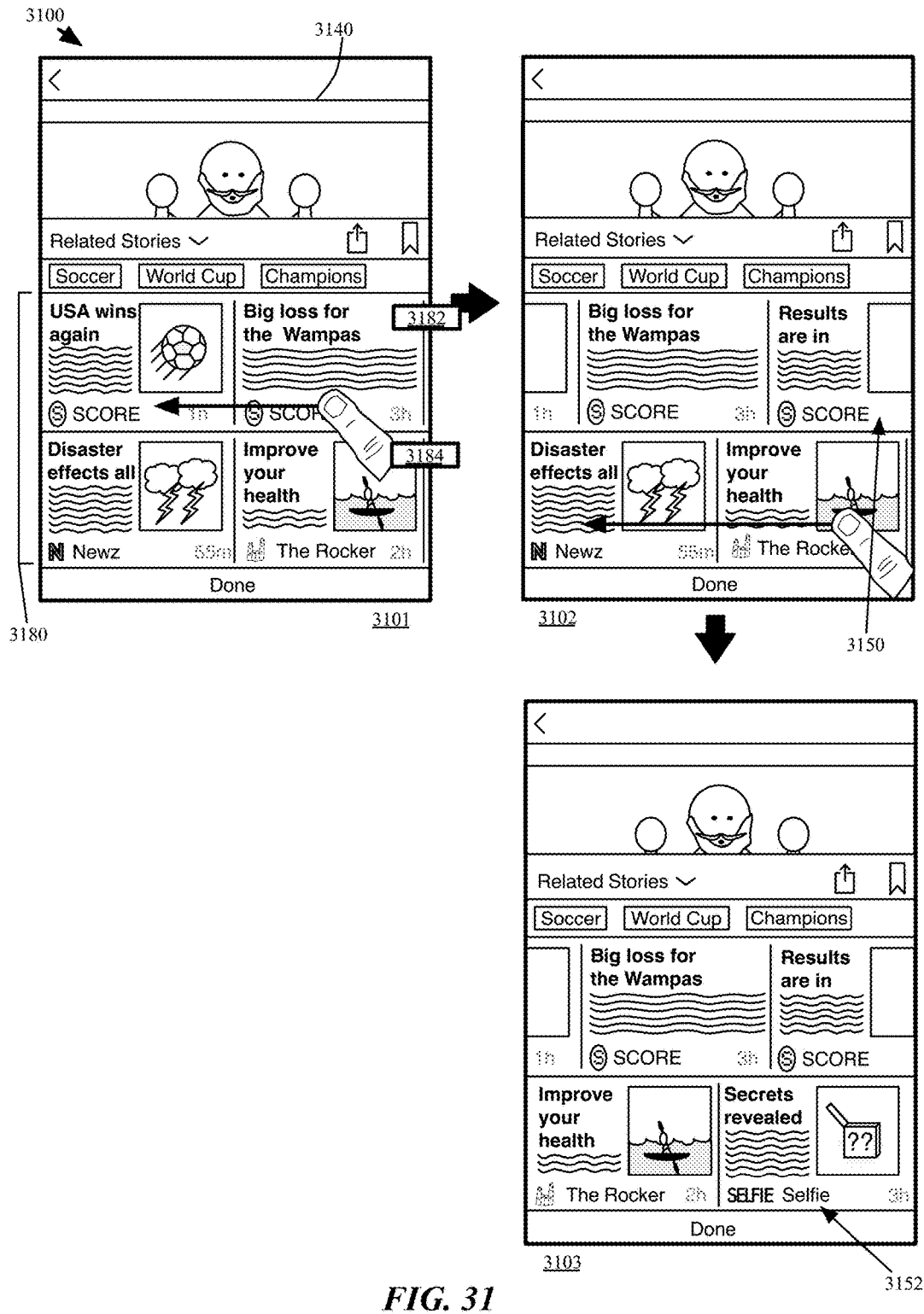
FIG. 31 illustrates an example of interacting with the end-of-document display region.

In some embodiments, the document pane area includes UI tools for displaying document panes for additional related documents. FIG. 31 illustrates an example of interacting with an end of article section in three stages 3101-3103. The first stage 3101 shows GUI 3100 with an excerpt view 3140 of a web article and a document pane area 3180. The document pane area 3180 includes two scrolling elements 3182 and 3184.

The first scrolling element 3182 provides a set of articles that are from the same source as the displayed article. In some embodiments, the first scrolling element 3182 only includes related articles from the same source, while in other embodiments, the first scrolling element includes articles from the same source that are not directly related to the displayed article.

The second scrolling element 3184 includes articles that are related to the topic from other sources. In some embodiments, the related articles only include related articles from sources identified as favorites by the user.

In the first stage 3101, the user slides through the first scrolling element 3182. The second stage 3102 shows that the first scrolling element 3160 has moved to show a portion of a new document pane 3150 for another article from the same source (i.e., "Score"). In some embodiments, the scrolling elements 3182 and 3184 scroll to fixed points so that edges of the document panes align at the edges of the scrolling elements, while in other embodiments, the scrolling elements 3182 and 3184 scroll freely to any point.

The second stage 3102 also shows that the user swipes the second scrolling element 3184 to show a new document pane 3152 for a related article from another source (i.e., Self Magazine). In some embodiments, the related articles are all selected from sources in the favorites collection of the user.

Figure 32:
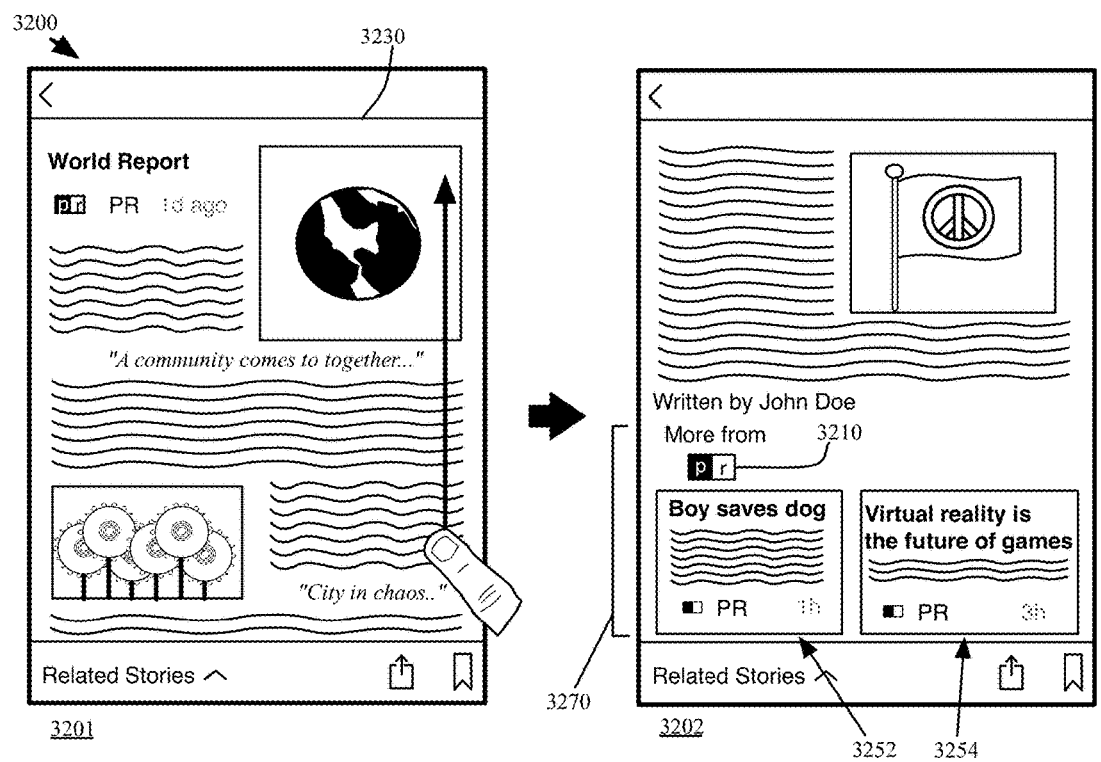
FIG. 32 illustrates an example of embedding related document panes at the end of a document.

FIG. 32 illustrates another example for providing related document panes at the end of a document in two stages 3201 and 3202. The first stage 3201 shows the GUI 3200 displaying a full document view 3230 for a native document. In the first stage 3201, the user swipes up on the full document view 3230 to scroll to the end of the document. In the second stage 3202, the user has reached the end of the document. In some embodiments, the end of the document is indicated by a user logo 3210. In addition, the full document view 3230 shows document panes 3252 and 3254, which have been embedded at the end of the native article in an end of article section 3270.

The document reader provides embedded document panes, end of document regions, or both in different embodiments. In some embodiments, the different regions (i.e., the embedded document panes and each scrollable region of the end of document region) provide different sets of documents. For example, one set of documents may include documents that are identified by the publisher as being related to the article. Another set of documents may also include documents from the same publisher, but these documents may be identified by the document reader (or a server communicating with the document reader) through a search of stored archives for the particular publisher. Yet another set of documents may include documents from other sources.

Figure 33:
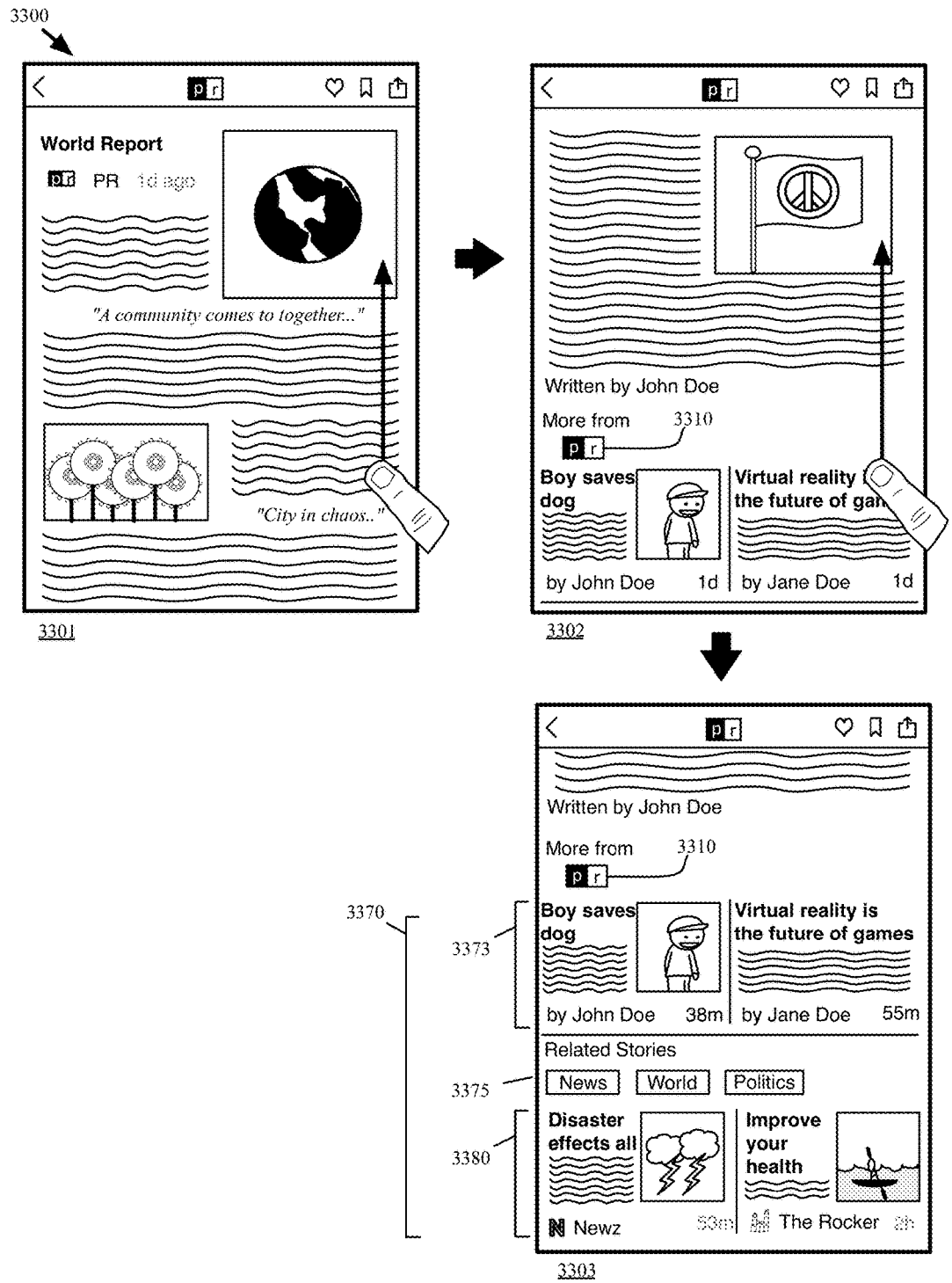
FIG. 33 illustrates yet another example for providing related document panes at the end of a document.

FIG. 33 illustrates yet another example for providing related document panes at the end of a document in three stages 3301-3303. The first stage 3301 shows the GUI 3300 displaying a full document view 3330 for a native document. In the first stage 3301, the user swipes up on the full document view 3330. The second stage 3302 shows that the GUI 3300 displays the end of the document. The second stage 3302 also shows that the user scrolls up beyond the end of the article.

In the third stage 3303, the GUI 3300 shows an end of article section 3340. The end of article section, like the end of article section 3270 of FIG. 32, is embedded into the end of the article, rather than displayed as an overlay. The end of article section 3370 includes a source article section 3373, a tag section 3375, and a related articles section 3380, similar to the corresponding sections described above.

IV. Document Navigation

The document reader of some embodiments provides various methods for a user to navigate through the documents of the application. In some embodiments, the navigations can be viewed as operations within a hierarchy of documents and views. In the examples below, the navigations are shown as a series of normal swipes (i.e., swipes beginning within the display area) and edge swipes (i.e., swipes beginning at the edge of the display area) in a touch interface of a device. However, one skilled in the art will recognize that the different methods of navigating through the hierarchy may be applied with other methods of input.

The document reader of some embodiments models the documents and the history of a user as a hierarchy of documents. Each level of the hierarchy is composed of a sequence of documents that are related (e.g., a set of related documents in an end of document region, a feed view of a set of documents in a channel, etc.). The different levels of the hierarchy are connected through various relationships (e.g., links from a document, embedded document panes at the end of a document, end of article sections, a full version of an excerpt view, etc.).

Figure 34:
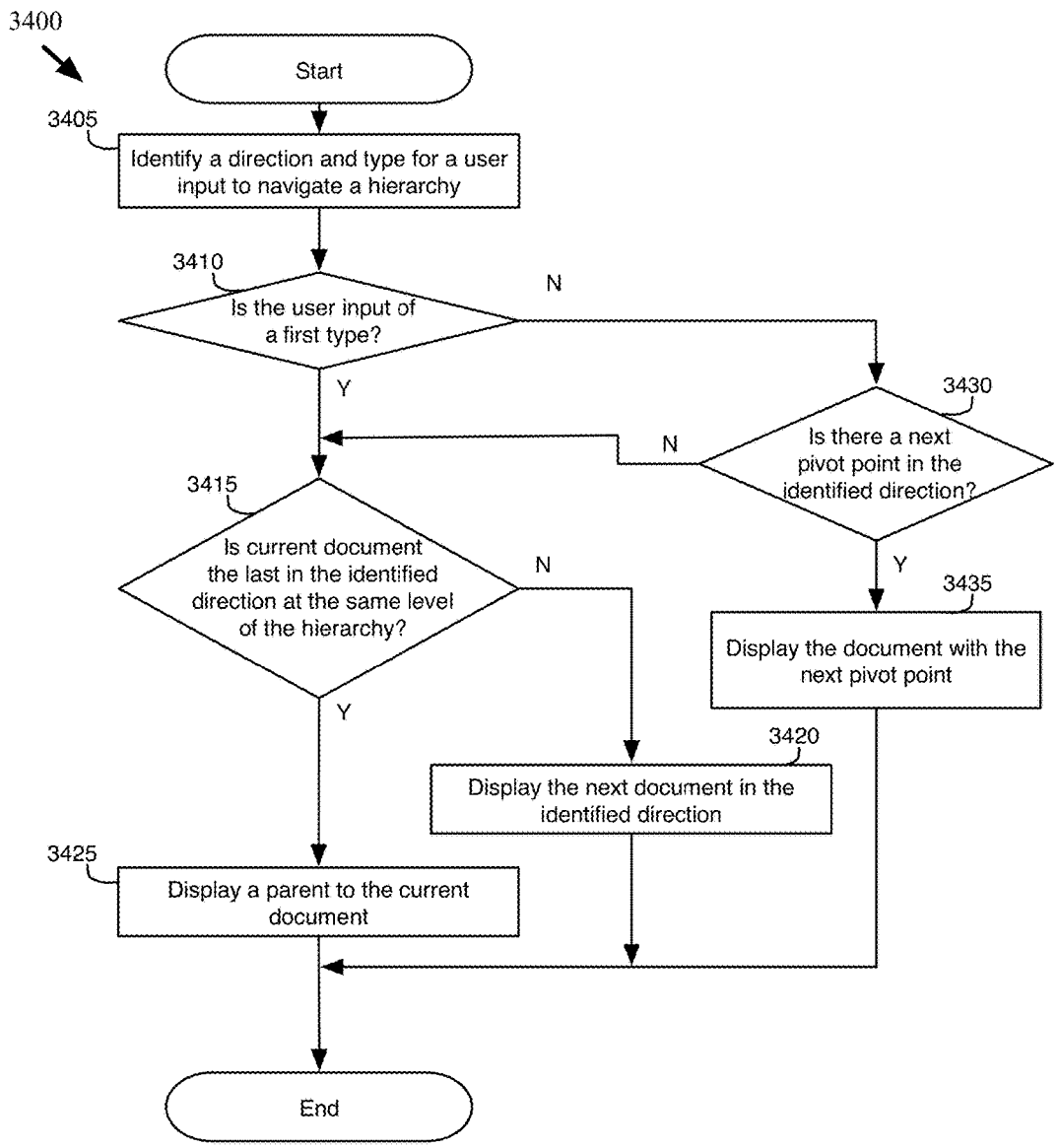
FIG. 34 conceptually illustrates a process for navigating a hierarchy of documents.

FIG. 34 conceptually illustrates a process for navigating a hierarchy of documents. The process 3400 of some embodiments is performed by a document reader to provide an interface for navigating documents in the document reader. The process 3400 identifies (at 3405) a direction and a type for a received user input for navigating a hierarchy of documents.

The process 3400 determines (at 3410) whether the user input is of a first type or a second type. One of ordinary skill in the art will recognize that devices provide the ability to differentiate between various types of interactions (e.g., taps, double taps, press and hold, separate simultaneous interactions, multi-finger interactions, swipes, edge swipes, etc.) In the examples of FIGS. 35-42 below, the first type of interaction is a normal swipe (i.e., one occurring within a display region), whereas the second type of interaction is an edge swipe (i.e., a swipe that begins at the edge of the display region). When the process 3400 determines (at 3410) that the user input is of a first type (e.g., a normal swipe), the process 3400 determines whether the current document is the last document in the identified direction at the same level of the hierarchy.

When the process 3400 determines (at 3415) that the current document is not the last document in the identified direction, then the process displays (at 3420) the next document in the identified direction of the sequence of documents at the particular level of the hierarchy. When the process 3400 determines (at 3425) that the current document is the last document in the identified direction, then the process displays (at 3425) a parent to the current document. In some embodiments, the parent to the current document is a feed view that displays all of the documents in the sequence of documents at the particular level of the hierarchy.

When the process 3400 determines (at 3410) that the user input is not of the first type (e.g., is an edge swipe), the process determines (at 3430) whether there is a next pivot point in the identified direction. The next pivot point identifies a document in the user's history from which the current document was reached. Pivot points are identified in a user's history as a user moves between documents (e.g., from document A to document B), views of a document (e.g., from an excerpt view of a document to a full view of the document), or portions of a document (e.g., from the top of a document to an end of article section of the document). Navigations through a user history move between the identified pivot points, allowing a user to quickly return to previous views or documents.

When the process 3400 determines (at 3430) that there are no more pivot points in the identified direction (e.g., when the user is at the beginning or end of their history), the process 3400 proceeds to step 3415 and treats the user input as a user input of the first type. When the process 3400 determines (at 3430) that there is a next pivot point in the identified direction, the process 3400 displays (at 3435) the document with the next pivot point. The process 3400 then ends.

Figure 35:
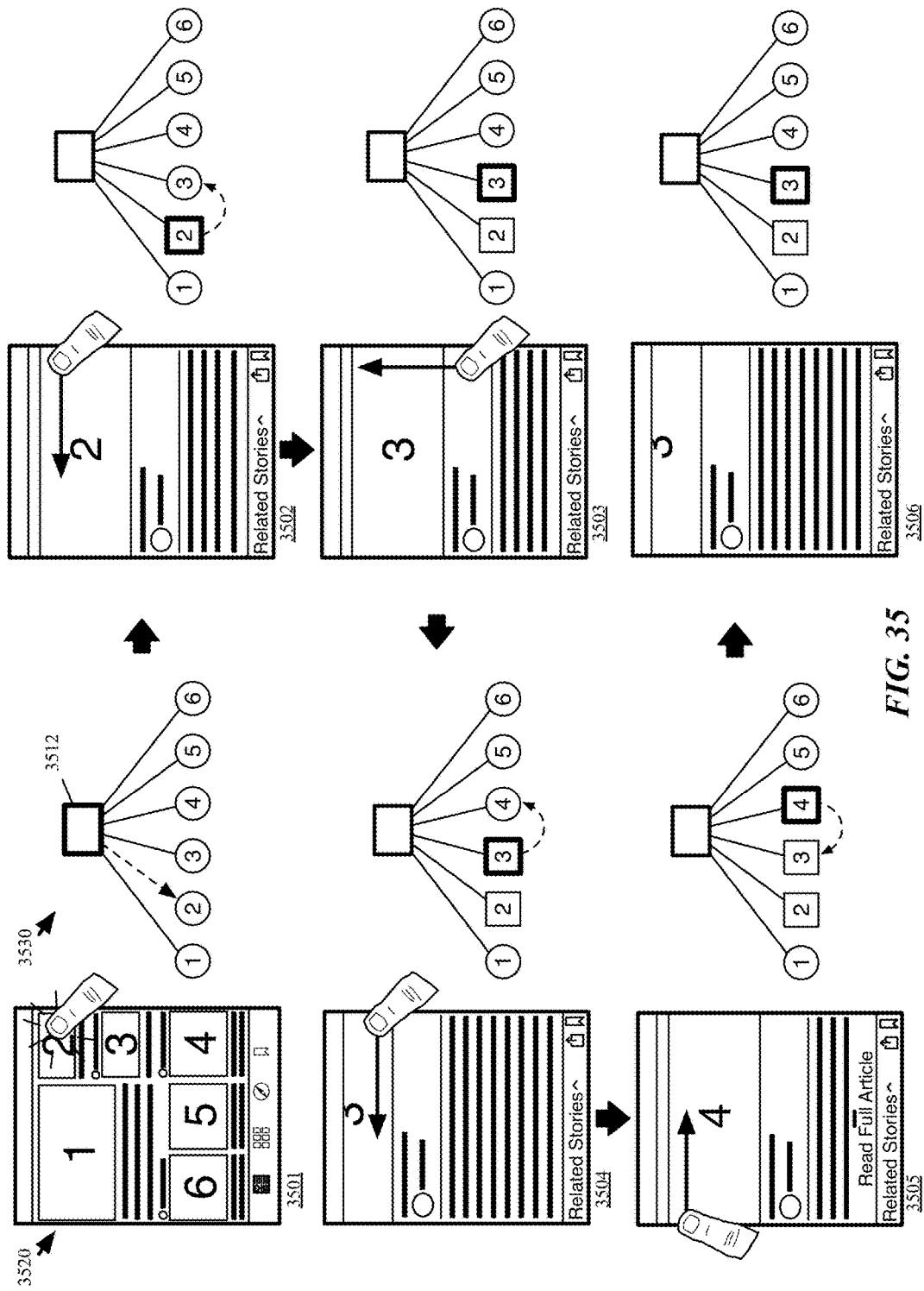
FIG. 35 illustrates an example of navigating between documents at a particular level of a hierarchy of documents.

FIGS. 35-42 illustrate examples of various navigations through a hierarchy of documents. FIG. 35 illustrates an example of navigating between documents at a particular level of a hierarchy of documents in six stages 3501-3506. The first stage 3501 shows GUI 3520 that displays a simplified feed layout, and a corresponding tree view 3530 of the document hierarchy. The feed layout in the GUI 3520 shows a sequence of articles 1-6. In the tree view 3530, the different nodes of the tree view 3530 represent articles or views of the document reader. The root node 3512 represents the feed layout view of articles 1-6. Nodes 1-6 represent articles 1-6 respectively.

In the first stage 3501, the root node 3512 is shown in bold to indicate that it corresponds to the view displayed in the GUI 3520. The root node 3512 is also represented as a square to indicate that it is a pivot point in the user's navigation history. Pivot points are identified at various stages of the user's navigation through the document hierarchy. In the first stage 3501, the user selects article 2.

The second stage 3502 shows that the GUI 3520 shows a full article view for article 2. The tree view 3530 shows node 2 in bold, indicating that it is displayed in the GUI 3520. Node 2 has also changed to a square shape to indicate that a new pivot point has been identified. The second stage 3502 shows that the user swipes to a next article 3 at the particular level of the hierarchy. The effect of this gesture is shown as a dotted line from node 2 to node 3 in the tree view 3530.

In the third stage 3503, the GUI 3520 shows article 3 and the tree view 3530 shows that a new pivot point is identified at node 3. The third stage 3503 also shows that the user scrolls through the displayed article 3. The document reader identifies a specific location with document 3 as a pivot point, so that the user can return to the same point in the document. The fourth stage 3504 shows that the user has scrolled down through the article 3 and swipes to the next article 4. The tree view 3530 shows the same pivot point at 3, but also shows that the user is navigating to node 4.

In the fifth stage 3505, the user performs a right edge swipe. In some embodiments, an edge swipe is used to move between pivot points in a user's history, rather than moving between nodes at a particular level of the hierarchy. The sixth stage 3506 shows that the user has returned to the saved location in document 3.

Figure 36:
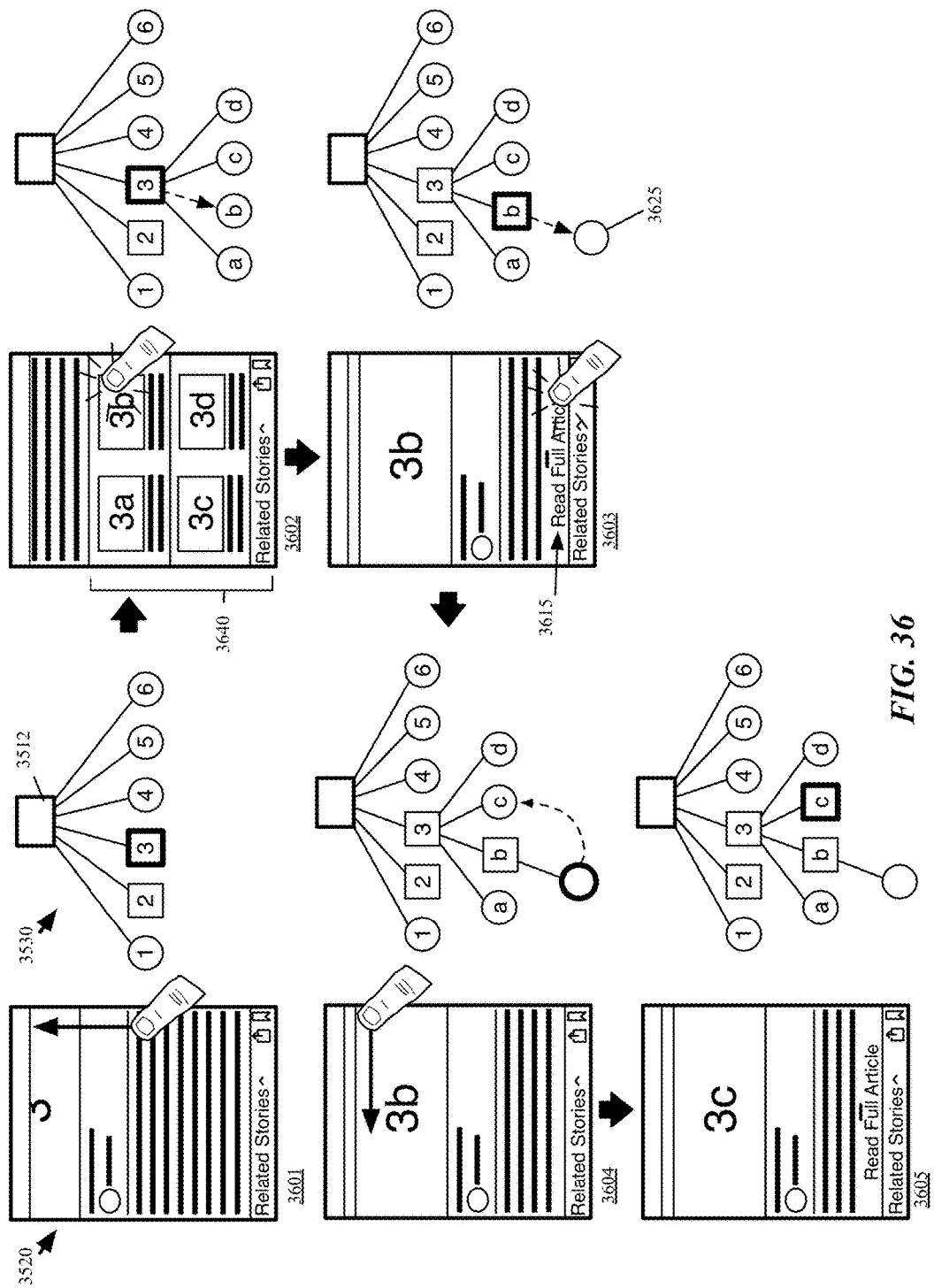
FIG. 36 illustrates an example of navigating to different levels of the hierarchy of documents.

In addition to navigating between documents at a particular level of the hierarchy, the document reader of some embodiments creates additional levels of the hierarchy based on user navigations. FIG. 36 illustrates an example of navigating to different levels of the hierarchy of documents. This figure continues the example of FIG. 35. The first stage 3601 shows that the user scrolls through document 3. The tree view 3530 shows that document 3 is shown in the GUI 3520 and pivot points are stored at the root node 3512 and nodes 2-4. The second stage 3602 shows an end of article section 3640 with related articles 3a-3d. The tree view 3530 shows that the related articles add new corresponding nodes a-d at a new level of the hierarchy. The second stage 3602 also shows that the user selects a web article 3b.

In some embodiments, a particular node may have several different options for a next level in the hierarchy. The article view for a native document may include links to multiple sets of documents. For example, in some embodiments, a single document may include a set of documents related to the document from the same source, a set of documents related to the document from different sources, a set of documents tagged with a particular tag in the tag bar, etc. Each set of documents could provide different nodes at the new level of the hierarchy.

In the third stage 3603, the GUI 3520 shows an excerpt view for web article 3b. The excerpt view also includes a link 3615 to a full article view. The full article view is represented as a new node 3625 at a new level of the hierarchy. The third stage 3603 also shows that the user selects the link 3615 to view the full article view of article 3b.

In the fourth stage 3604, the GUI 3520 shows the full article view of article 3b. The tree view 3530 shows that node 3625 that represents the full article view of article 3b is in bold. However, node 3625 is not represented as a square because in some embodiments, the document reader does not generate a new pivot point for the full article view of a web article to avoid having to re-download the full article from the web. In other embodiments, the document reader generates a new pivot point for the full article view and stores a cached version of the full article to avoid re-downloading the article.

The fourth stage 3604 shows that the user swipes from the full version of the web article. Even while the user is viewing external content from a webpage, the document reader of some embodiments allows the user to continue navigating within the hierarchy. The full view of the web article and the excerpt view of some embodiments act as parallel levels of the hierarchy, such that a user can navigate between the different levels for the web article, but navigating from the either the excerpt view or the full view has the same result. The fifth stage 3605 shows that when the user swipes from the full version of the web article 3*b*, the GUI 3520 shows article 3*c*, which is the next article at the particular level of the hierarchy in the tree view 3530.

Figure 37:
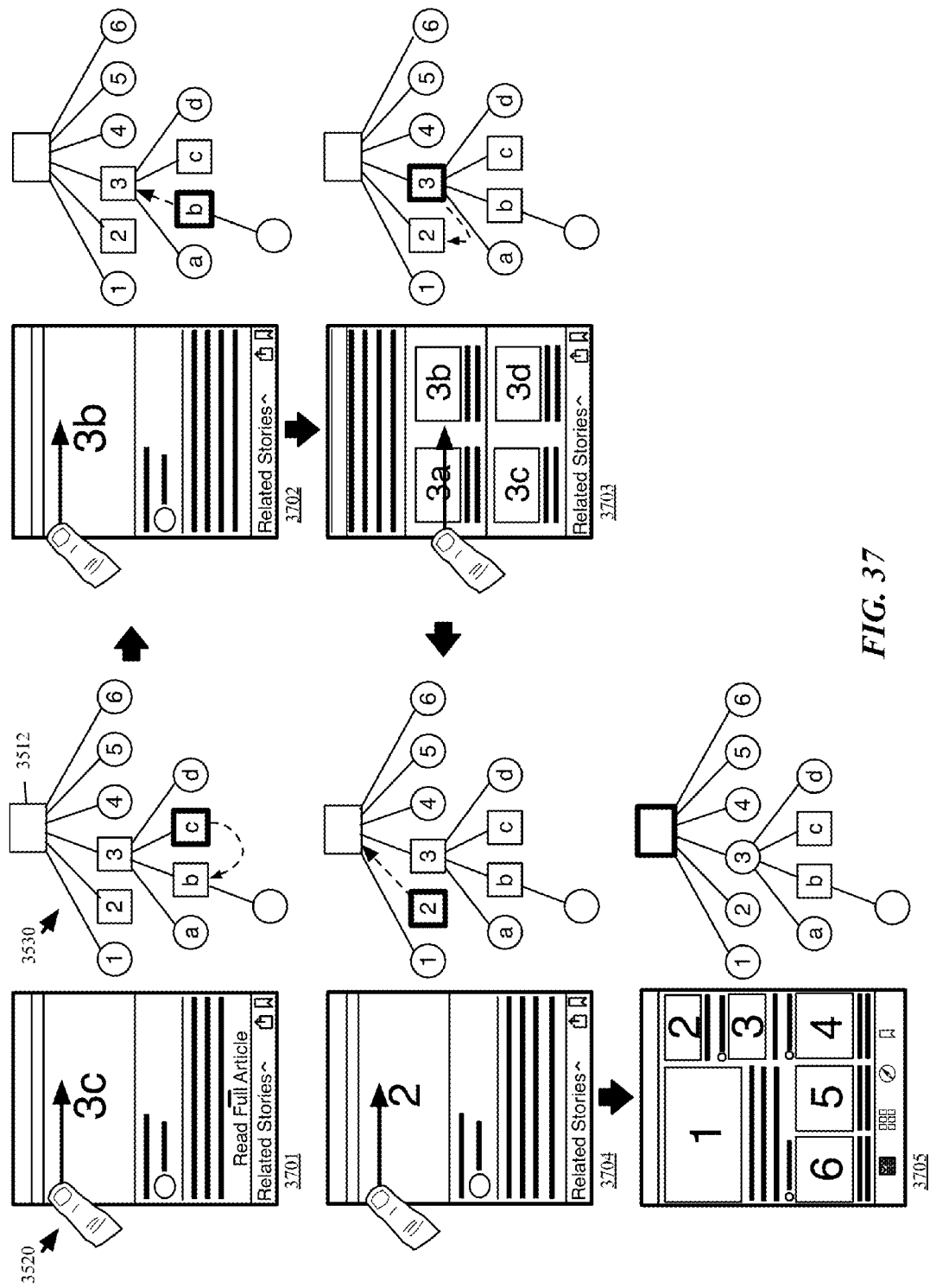
FIG. 37 illustrates an example of navigating back through pivot points of the navigation.

The document reader of some embodiments allows the user to navigate through the pivot points that were identified as the user traversed the hierarchy. FIG. 37 illustrates an example of navigating back through pivot points of the navigation. The example of this figure continues from the example of FIG. 36. In the example of this figure, the user performs an edge swipe at each stage to traverse the pivot points of the user's history.

The first stage 3701 shows that the user navigates back from article 3*c*. The tree view 3530 shows that since the previous pivot point is identified at the excerpt view of 3*b*, the navigation back returns to the node b, which represents the excerpt view of article 3*b*.

In the second stage 3702, the GUI 3520 shows that the user performs an edge swipe from the displayed excerpt view of article 3*b*. The tree view 3530 of the second stage 3702 shows that the previous pivot point is at article 3, at the previous level of the hierarchy.

The third stage 3703 show that the GUI 3520 shows the end of article section of article 3 based on a pivot point identified for article 3 when navigating from article 3 to article 3*b*. The user edge swipes back through the history to article 2, as indicated in the tree view 3530. The fourth stage 3704 shows that the GUI 3520 shows article 2, and that another edge swipe takes the user back to the feed layout, indicated by the root node 3612 in the tree view 3530.

In the example of FIG. 37, an edge swipe was performed at each stage. The differences between the edge swipe and the normal swipe of some embodiments will be described with reference to FIGS. 38-42. Although this example is described with reference to edge and non-edge swipes, one skilled in the art will recognize that the different methods of navigating through the hierarchy may be applied with other methods of input.

FIGS. 38 and 39 illustrate different examples of navigating back from a particular document. FIG. 38 illustrates an example of navigating back from an article using a non-edge swipe (i.e., a gesture to navigate to a previous document within a particular level of the hierarchy). The first stage 3801 shows the GUI 3520 at article 3*b*, indicated by node b in the tree view 3530. In the first stage 3801, the user performs a non-edge swipe to the right, to navigate to a previous article within the level of the hierarchy. The second stage 3802 shows that rather than going back to the previous pivot point, the GUI 3520 now shows article 3*a*. As described above, article 3*a* is the article within the sequence of articles that were presented to the user in the end of article section of article 3.

FIG. 39 illustrates an example of navigating back from an article using an edge swipe in order to navigate to a previous pivot point in the hierarchy. The first stage 3901 shows the same article 3*b* as shown in the first stage 3801 of FIG. 38. However, in this example, the user performs an edge swipe to navigate to the previous pivot point at node 3 in the tree view 3530. The second stage 3902 shows that rather than going to the previous article 3*a* within the sequence of articles, the GUI 3520 now shows the full article view of article 3.

Figure 40:
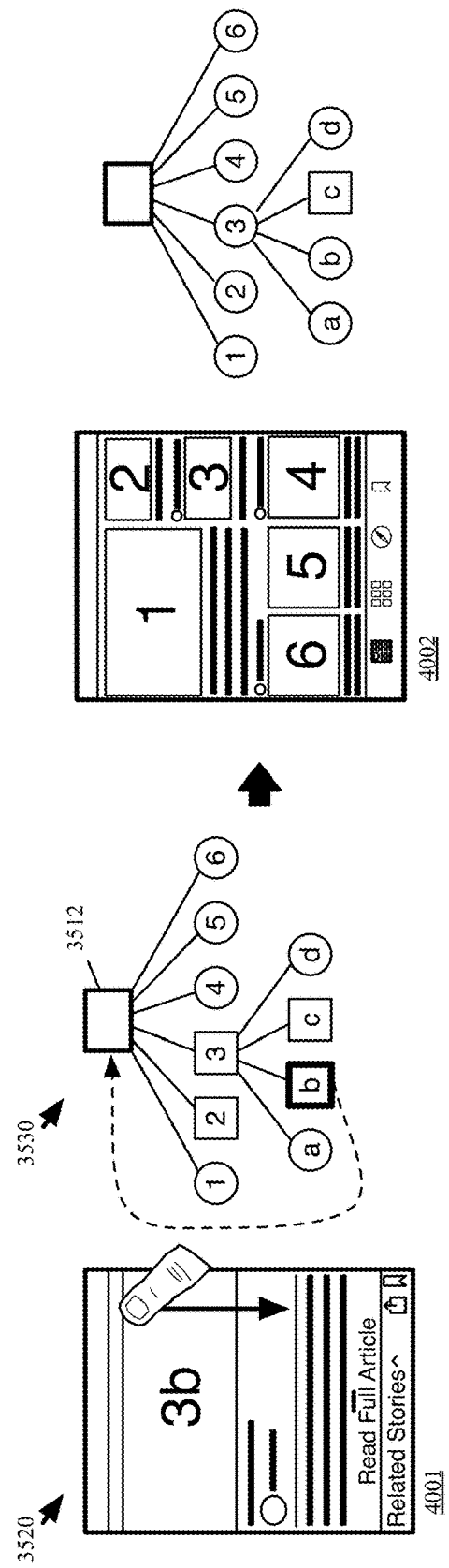
FIG. 40 illustrates an example of navigating back to a parent feed from a document in the hierarchy.

FIG. 40 illustrates an example of another gesture for navigating directly to a parent feed view of a current article in two stages 4001 and 4002. The first stage 4001 illustrates the GUI 3520, which displays the excerpt view for article 3*b* in the hierarchy as described above. The article 3*b* was reached through the end of article region of article 3, which was selected from a parent feed view. In the first stage 4001, the user swipes down in the excerpt view to return directly to the parent feed view, as indicated in the tree view 3530. In the second stage 4002, the GUI 3520 and the tree view 3530 show that the parent feed view is now the active view. In some embodiments, the document reader maintains a pivot point at 3*b*, allowing the user to edge swipe back to 3*b*, while in other embodiments, the gesture to return to a parent feed removes the pivot points in the hierarchy, as shown in the tree view 3530.

Figure 41:
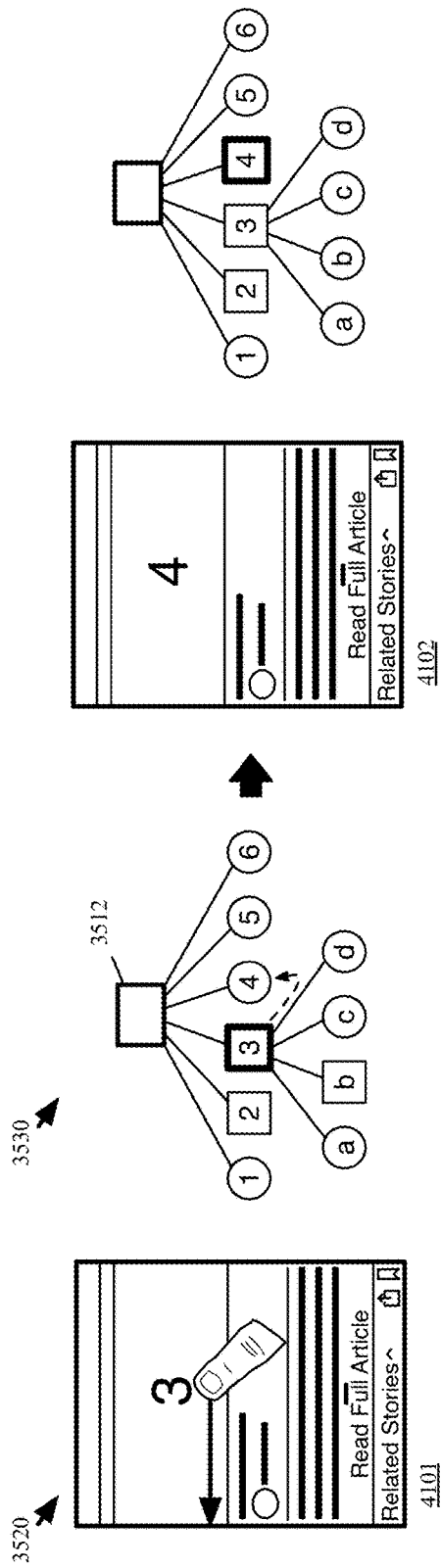
FIGS. 41 and 42 illustrate different examples of navigating forward from a particular document.
Figure 42:
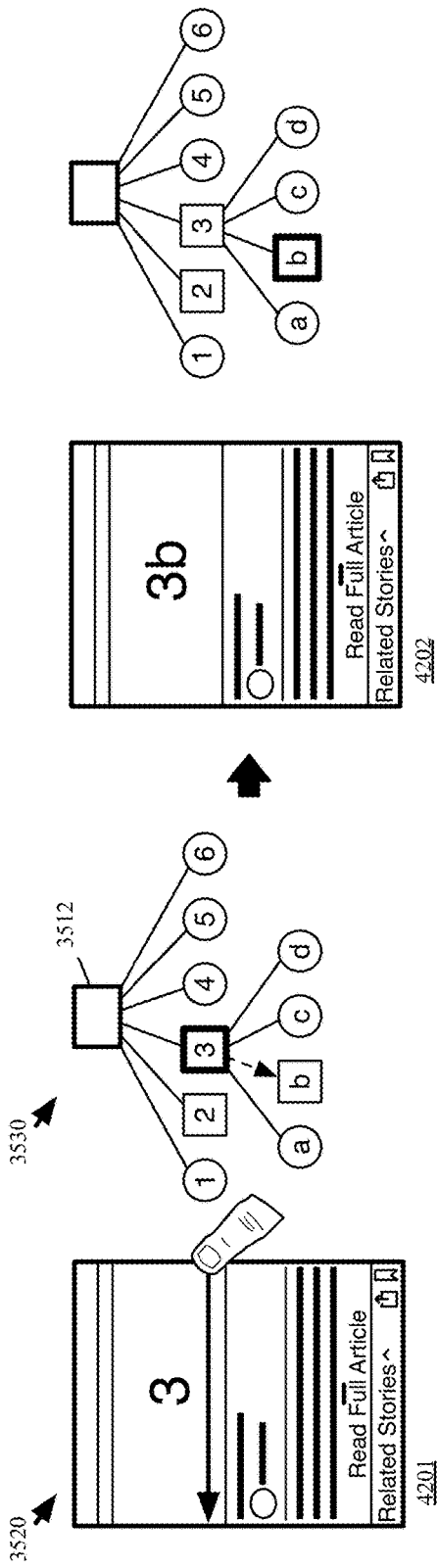

FIGS. 41 and 42 illustrate different examples of navigating forward from a particular document. FIG. 41 illustrates an example of navigating forward from an article using a non-edge swipe (i.e., a gesture to navigate to a next document within a particular level of the hierarchy). The first stage 4101 shows the GUI 3520 at article 3, indicated by node 3 in the tree view 3530. In the first stage 4101, the user performs a non-edge swipe to the left, to navigate to the next article within the level of the hierarchy (i.e., article 4). The second stage 4102 shows that the GUI 3520 now displays article 4.

FIG. 42 illustrates an example of navigating forward from an article using an edge swipe in order to navigate to a next pivot point in the hierarchy. The first stage 4201 shows the same article 3 as shown in the first stage 4101 of FIG. 41. However, in this example, the user performs an edge swipe to navigate to the next pivot point at node 3*b* in the tree view 3530. In this example, the user created a pivot point at 3*b* by navigating to 3*b* before returning to article 3. Until the user navigates to a different article (e.g., article 4) to remove the forward history, a forward edge swipe will navigate to the forward pivot points. The second stage 4202 shows that rather than going to the next article 4 within the sequence of articles, the GUI 3520 now shows the excerpt article view of article 3*b*.

In some embodiments, when no pivot points are available (e.g., at the end of a user's history), the edge swipe performs the same action as a non-edge swipe (i.e., navigates to a neighboring document in the particular level of the hierarchy). When no more documents are available at a particular level of the hierarchy (e.g., at the last document in a sequence of documents), a non-edge swipe in some embodiments navigates to the parent document of the particular sequence of documents.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 43:
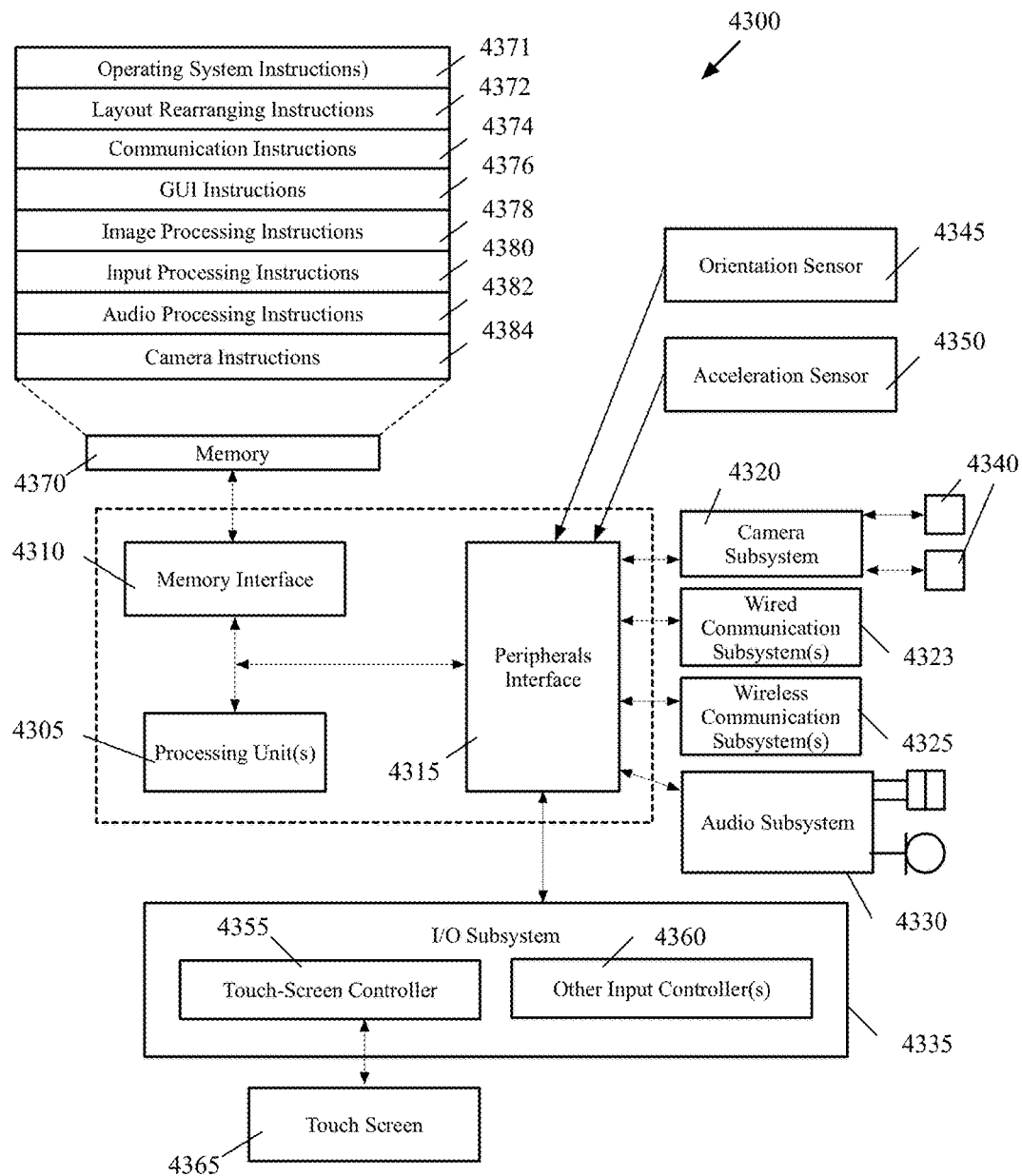
FIG. 43 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 43 is an example of an architecture 4300 of such a mobile computing device. As shown, the mobile computing device 4300 includes one or more processing units 4305, a memory interface 4310 and a peripherals interface 4315.

The peripherals interface 4315 is coupled to various sensors and subsystems, including a camera subsystem 4320, a wired communication subsystem(s) 4323, a wireless communication subsystem(s) 4325, an audio subsystem 4330, an I/O subsystem 4335, etc. The peripherals interface 4315 enables communication between the processing units 4305 and various peripherals. For example, an orientation sensor 4345 (e.g., a gyroscope) and an acceleration sensor 4350 (e.g., an accelerometer) is coupled to the peripherals interface 4315 to facilitate orientation and acceleration functions.

The camera subsystem 4320 is coupled to one or more optical sensors 4340 (e.g., a charged coupled device (CCD) optical sensor, a complementary metal-oxide-semiconductor (CMOS) optical sensor, etc.). The camera subsystem 4320 coupled with the optical sensors 4340 facilitates camera functions, such as image and/or video data capturing. The wired communication subsystem 4323 and wireless communication subsystem 4325 serve to facilitate communication functions.

In some embodiments, the wireless communication subsystem 4325 includes radio frequency receivers and transmitters, and optical receivers and transmitters (not shown in FIG. 43). These receivers and transmitters of some embodiments are implemented to operate over one or more communication networks such as a GSM network, a Wi-Fi network, a Bluetooth network, etc. The audio subsystem 4330 is coupled to a speaker to output audio (e.g., to output voice navigation instructions). Additionally, the audio subsystem 4330 is coupled to a microphone to facilitate voice-enabled functions in some embodiments.

The I/O subsystem 4335 involves the transfer between input/output peripheral devices, such as a display, a touch screen, etc., and the data bus of the processing units 4305 through the peripherals interface 4315. The I/O subsystem 4335 includes a touch-screen controller 4355 and other input controllers 4360 to facilitate the transfer between input/output peripheral devices and the data bus of the processing units 4305. As shown, the touch-screen controller 4355 is coupled to a touch screen 4365. The touch-screen controller 4355 detects contact and movement on the touch screen 4365 using any of multiple touch sensitivity technologies. The other input controllers 4360 are coupled to other input/control devices, such as one or more buttons. Some embodiments include a near-touch sensitive screen and a corresponding controller that can detect near-touch interactions instead of or in addition to touch interactions.

The memory interface 4310 is coupled to memory 4370. In some embodiments, the memory 4370 includes volatile memory (e.g., high-speed random access memory), non-volatile memory (e.g., flash memory), a combination of volatile and non-volatile memory, and/or any other type of memory. As illustrated in FIG. 43, the memory 4370 stores an operating system (OS) 4371. The OS 4371 includes instructions for handling basic system services and for performing hardware dependent tasks. The memory 4370 additionally includes layout rearranging instructions 4372 in order for the device 4300 to perform the layout rearranging process of some embodiments. In some embodiments, these instructions 4372 may be a subset of the operating system instructions 4371, or may be part of the instructions for an application.

The memory 4370 also includes communication instructions 4374 to facilitate communicating with one or more additional devices (e.g., for peer-to-peer data sharing, or to connect to a server through the Internet for cloud-based data sharing); graphical user interface instructions 4376 to facilitate graphic user interface processing; image processing instructions 4378 to facilitate image-related processing and functions; input processing instructions 4380 to facilitate input-related (e.g., touch input) processes and functions; audio processing instructions 4382 to facilitate audio-related processes and functions; and camera instructions 4384 to facilitate camera-related processes and functions. The instructions described above are merely exemplary and the memory 4370 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 43 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 43 may be split into two or more integrated circuits.

B. Computer System

Figure 44:
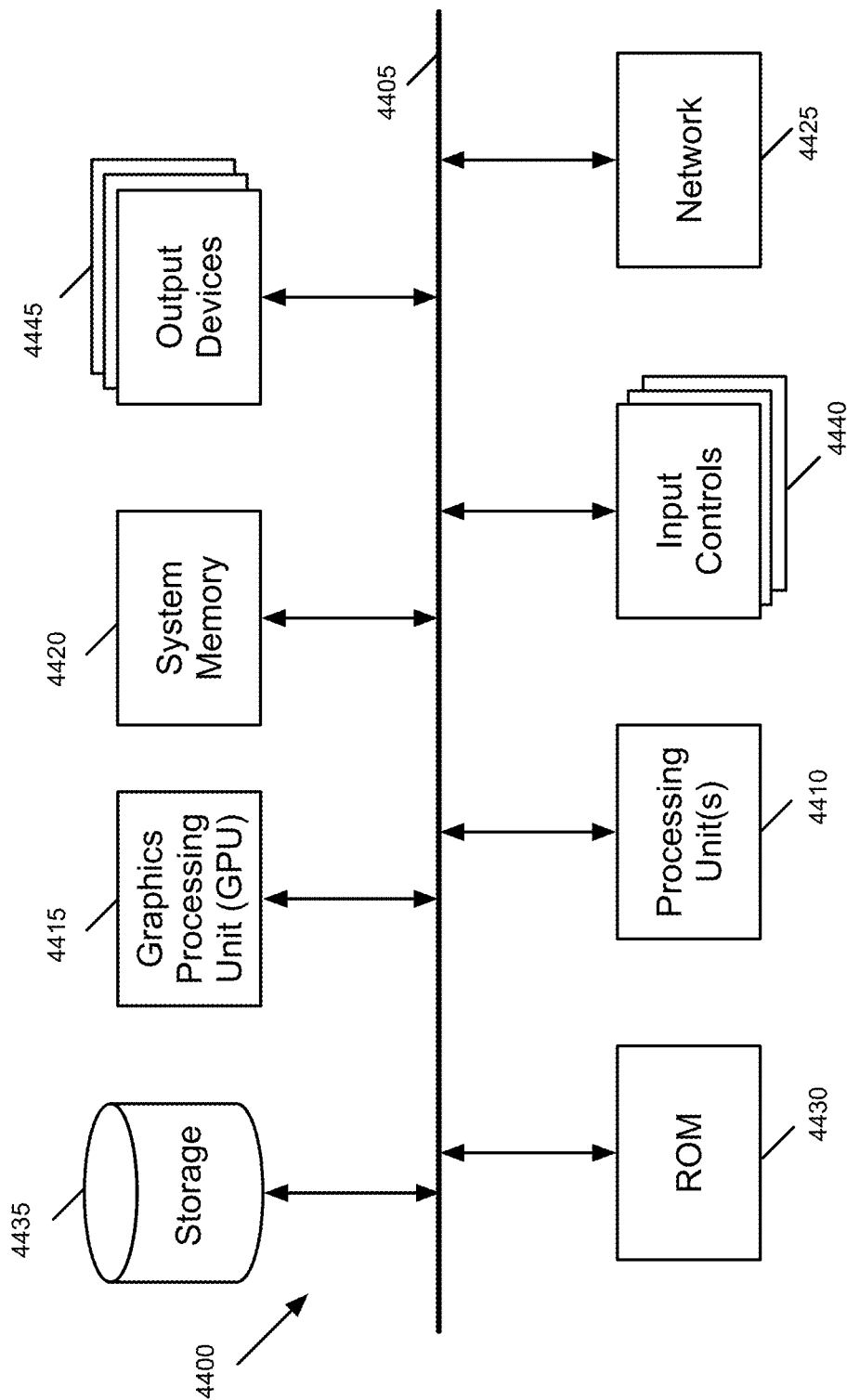
FIG. 44 conceptually illustrates another example of an electronic system with which some embodiments of the invention are implemented.

FIG. 44 conceptually illustrates another example of an electronic system 4400 with which some embodiments of the invention are implemented. The electronic system 4400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 4400 includes a bus 4405, processing unit(s) 4410, a graphics processing unit (GPU) 4415, a system memory 4420, a network 4425, a read-only memory 4430, a permanent storage device 4435, input devices 4440, and output devices 4445.

The bus 4405 collectively represents all system, peripheral, and chipset buses that communicatively connect the numerous internal devices of the electronic system 4400. For instance, the bus 4405 communicatively connects the processing unit(s) 4410 with the read-only memory 4430, the GPU 4415, the system memory 4420, and the permanent storage device 4435.

From these various memory units, the processing unit(s) 4410 retrieves instructions to execute and data to process in order to execute the processes of the invention. The processing unit(s) may be a single processor or a multi-core processor in different embodiments. Some instructions are passed to and executed by the GPU 4415. The GPU 4415 can offload various computations or complement the image processing provided by the processing unit(s) 4410. In some embodiments, such functionality can be provided using CoreImage's kernel shading language.

The read-only-memory (ROM) 4430 stores static data and instructions that are needed by the processing unit(s) 4410 and other modules of the electronic system. The permanent storage device 4435, on the other hand, is a read-and-write memory device. This device is a non-volatile memory unit that stores instructions and data even when the electronic system 4400 is off. Some embodiments of the invention use a mass-storage device (such as a magnetic or optical disk and its corresponding disk drive, integrated flash memory) as the permanent storage device 4435.

Other embodiments use a removable storage device (such as a floppy disk, flash memory device, etc., and its corresponding drive) as the permanent storage device. Like the permanent storage device 4435, the system memory 4420 is a read-and-write memory device. However, unlike storage device 4435, the system memory 4420 is a volatile read-and-write memory, such a random access memory. The system memory 4420 stores some of the instructions and data that the processor needs at runtime. In some embodiments, the invention's processes are stored in the system memory 4420, the permanent storage device 4435, and/or the read-only memory 4430. For example, the various memory units include instructions for processing multimedia clips in accordance with some embodiments. From these various memory units, the processing unit(s) 4410 retrieves instructions to execute and data to process in order to execute the processes of some embodiments.

The bus 4405 also connects to the input and output devices 4440 and 4445. The input devices 4440 enable the user to communicate information and select commands to the electronic system. The input devices 4440 include alpha-numeric keyboards and pointing devices (also called "cursor control devices"), cameras (e.g., webcams), microphones or similar devices for receiving voice commands, etc. The output devices 4445 display images generated by the electronic system or otherwise output data. The output devices 4445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 44, bus 4405 also couples electronic system 4400 to a network 4425 through a network adapter (not shown). In this manner, the computer can be a part of a network of computers (such as a local area network ("LAN"), a wide area network ("WAN"), or an Intranet), or a network of networks, such as the Internet. Any or all components of electronic system 4400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 3, 17, 28, and 34) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a document viewing application, a method comprising:
   providing a first document channel browsing mode in a first graphical user interface for displaying a plurality of selectable document channel items corresponding to document channels, the document channels comprising sources to obtain document channels from, topics of documents to obtain, or both, wherein selection of a particular document channel item causes the application to (i) add the corresponding selected document channel to a set of selected document channels from which to retrieve documents for presentation within the first graphical user interface and (ii) dynamically add document channel items corresponding to document channels related to the selected document channel to the plurality of selectable document channel items for display in the first document channel browsing mode;

displaying the added document channel items and the plurality of selectable document channel items within the first graphical use interface in the first document channel browsing mode;

providing a second document channel browsing mode in a second graphical user interface for displaying a first set of selectable document channel items corresponding to sources of documents and a second set of selectable document channel items corresponding to document topics, wherein selection of a document channel item in the second browsing mode causes the application to (i) add the corresponding document channel to the set of selected document channels from which to retrieve documents for presentation within the second graphical user interface and (ii) modify the selectable document channel items presented in the second document channel browsing mode a next time the second document channel browsing mode is entered; and displaying the modified selectable channel items related to the selected document channel item within the second graphical user interface in the second document channel browsing mode.

2. The method of claim 1, wherein the selectable document channel items in the first document channel browsing mode are displayed in a grid format.

3. The method of claim 2, wherein document channel items corresponding to document sources and document channel items corresponding to document topics are interspersed in the grid format.

4. The method of claim 1, wherein the first set of selectable document channel items in the second document channel browsing mode are arranged in a first scrolling element and the second set of selectable document channel items in the second document channel browsing mode are arranged in a second scrolling element.

5. The method of claim 1 further comprising providing a document browsing mode for displaying documents related to the set of selected document channels.

6. The method of claim 1 further comprising providing a document browsing mode for displaying UI items for each of the selected document channels, wherein selection of a UI item for a particular document channel in the document browsing mode causes the application to display documents for the particular document channel.

7. The method of claim 1, wherein the first document channel browsing mode is displayed when the document viewing application is initially opened.

8. A non-transitory machine readable medium storing a document viewing application for execution by a set of processing units, the document viewing application comprising set of instructions for:

providing a first document channel browsing mode in a first graphical user interface for displaying a plurality of selectable document channel items corresponding to document channels, the document channels comprising sources to obtain document channels from, topics of documents to obtain, or both, wherein selection of a particular document channel item causes the application to (i) add the corresponding selected document channel to a set of selected document channels from which to retrieve documents for presentation within the first graphical user interface and (ii) dynamically add document channel items corresponding to document channels related to the selected document channel to the plurality of selectable document channel items for display in the first document channel browsing mode;

displaying the added document channel items and the plurality of selectable document channel items within the first graphical user interface in the first document channel browsing mode;

providing a second document channel browsing mode in a second graphical user interface for displaying a first set of selectable document channel items corresponding to sources of documents and a second set of selectable document channel items corresponding to document topics, wherein selection of a document channel item in the second browsing mode causes the application to (i) add the corresponding document channel to the set of selected document channels from which to retrieve documents for presentation within the second graphical user interface and (ii) modify the selectable document channel items presented in the second document channel browsing mode a next time the second document channel browsing mode is entered; and displaying the modified selectable channel items related to the selected document channel item within the second graphical user interface in the second document channel browsing mode.

9. The non-transitory machine readable medium of claim 8, wherein the selectable document channel items in the first document channel browsing mode are displayed in a grid format.

10. The non-transitory machine readable medium of claim 9, wherein the document channel items corresponding to document sources and document channel items corresponding to document topics are interspersed in the grid format.

11. The non-transitory machine readable medium of claim 8, wherein the first set of selectable document channel items in the second document channel browsing mode are arranged in a first scrolling element and the second set of selectable document channel items in the second document channel browsing mode are arranged in a second scrolling element.

12. The non-transitory machine readable medium of claim 8, further comprising providing a document browsing mode for displaying UI items for each of the selected document channels, wherein selection of a UI item for a particular document channel in the document browsing mode causes the application to display documents for the particular document channel.

13. The non-transitory machine readable medium of claim 8, wherein previously presented-the first document channel browsing mode is displayed when the document viewing application is initially opened.

* * * * *